(12) United States Patent
Li et al.

(10) Patent No.: US 12,477,514 B2
(45) Date of Patent: Nov. 18, 2025

(54) METHOD AND APPARATUS FOR PAGING IN WIRELESS COMMUNICATION SYSTEM

(71) Applicant: SAMSUNG ELECTRONICS CO., LTD., Suwon-si (KR)

(72) Inventors: Fuyuan Li, Beijing (CN); Lixiang Xu, Beijing (CN); Bin Wang, Beijing (CN); Weiwei Wang, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 18/004,026

(22) PCT Filed: Jun. 16, 2021

(86) PCT No.: PCT/KR2021/007531
§ 371 (c)(1),
(2) Date: Dec. 30, 2022

(87) PCT Pub. No.: WO2022/005055
PCT Pub. Date: Jan. 6, 2022

(65) Prior Publication Data
US 2024/0031984 A1 Jan. 25, 2024

(30) Foreign Application Priority Data

Jul. 3, 2020 (CN) .......................... 202010635816.7

(51) Int. Cl.
*H04W 68/02* (2009.01)
*H04W 36/08* (2009.01)
(Continued)

(52) U.S. Cl.
CPC ........... *H04W 68/02* (2013.01); *H04W 36/08* (2013.01); *H04W 56/0015* (2013.01); *H04W 74/0833* (2013.01)

(58) Field of Classification Search
CPC .. H04W 36/08; H04W 56/0015; H04W 68/02
(Continued)

(56) References Cited

U.S. PATENT DOCUMENTS

| 2011/0201330 A1 | 8/2011 | Kubo et al. |
| 2019/0182800 A1 | 6/2019 | Park et al. |

(Continued)

FOREIGN PATENT DOCUMENTS

| CN | 109756924 A | 5/2019 |
| CN | 111328462 A | 6/2020 |
| WO | 2020033648 A1 | 2/2020 |

OTHER PUBLICATIONS

Office Action issued Dec. 11, 2024, in connection with Chinese Patent Application No. 202010635816.7, 18 pages.
(Continued)

*Primary Examiner* — Joel Ajayi

(57) ABSTRACT

A method and an apparatus for paging in a wireless communication system are provided. The method includes determining, by a radio access network (RAN) node, information for paging, where the information for paging includes information for paging a User Equipment (UE) which is related to a synchronization signal block (SSB) beam; and paging, by the RAN node, the UE in an idle state or inactive state, based on the information for paging. The method can page a UE more accurately.

8 Claims, 31 Drawing Sheets

(51) Int. Cl.
*H04W 56/00* (2009.01)
*H04W 74/0833* (2024.01)

(58) Field of Classification Search
USPC .......................................................... 455/458
See application file for complete search history.

(56) References Cited

U.S. PATENT DOCUMENTS

2020/0120634 A1    4/2020   Lee et al.
2020/0169446 A1    5/2020   Chen et al.

OTHER PUBLICATIONS

International Search Report and Written Opinion of the International Searching Authority dated Sep. 7, 2021, in connection with International Application No. PCT/KR2021/007531, 8 pages.
Supplementary European Search Report dated Nov. 2, 2023, in connection with European Patent Application No. 21833531.3, 9 pages.
Office Action issued May 31, 2024, in connection with Chinese Patent Application No. 202010635816.7, 26 pages.
MediaTek Inc. "NR Paging Overhead Reduction with Localized Paging," 3GPP TSG-RAN WG2 Meeting #101bis, Sanya, China, Apr. 2018, R2-1805116, 3 pages.
Office Action issued Apr. 3, 2025, in connection with European Patent Application No. 21833531.3, 5 pages.
Office Action issued May 30, 2025, in connection with Chinese Patent Application No. 202010635816.7, 12 pages.

METHOD AND APPARATUS FOR PAGING IN WIRELESS COMMUNICATION SYSTEM

This application is a 371 of International Application No. PCT/KR2021/007531 filed Jun. 16, 2021, which claims priority to Chinese Patent Application No. 202010635816.7, filed Jul. 3, 2020, the disclosures of which are herein incorporated by reference in their entirety.

BACKGROUND

1. Field

The disclosure relates to wireless communication technologies, and in particular to a method, a radio access network (RAN) node and a core network (CN) node for paging in a wireless communication system.

2. Description of Related Art

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

5G communication systems are implemented in higher frequency (millimeter, mmWave) bands, e.g., 60 GHz bands to achieve a higher data rate. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in order to further meet the demand for wireless data communication services, B5G (beyond 5G) or 6G communication systems are being developed.

SUMMARY

According to some embodiments of the disclosure, a method for paging in a wireless communication system is provided. The method includes: determining, by a radio access network (RAN) node, information for paging (in the disclosure, also referred to as "paging assistance information"), where the information for paging includes information related to a synchronization signal block (SSB) beam for paging a User Equipment (UE); and paging, by the RAN node, the UE in an idle state or inactive state, based on the information for paging.

For example, in some implementations, determining the information for paging includes: reporting, by the RAN node to an Operations Administration and Maintenance (OAM) entity, all query assistance information and information for paging obtained before context release of the UE is completed; and querying, in the OAM, the information for paging at a time corresponding to the paging, where the query assistance information includes Global Navigation Satellite System (GNSS) position (location) information of the UE and information related to motion of the UE, and the information related to motion of the UE includes at least one of a UE type related to a motion capability, a motion direction or a motion speed.

For example, in some implementations, the query assistance information is reported to the RAN node by the UE through one of the following: reporting, by the UE, the query assistance information to the RAN node, in a case where obtained location information meets preset or predefined conditions, after entering a connected state; reporting, by the UE, the query assistance information to the RAN node at the latest time before the UE is about to enter an idle state or inactive state; or reporting, by the UE, the query assistance information to the RAN node, in a case where the UE receives an indication to report the query assistance information.

According to some embodiments of the disclosure, a method for paging in a wireless communication system is further provided. The method includes: determining, by a core network (CN) node, information for paging, where the information for paging includes information related to a synchronization signal block (SSB) beam for paging a User Equipment (UE); and transmitting a paging message including the information for paging to a radio access network (RAN) node to page the UE in an idle state or inactive state.

For example, in some implementations, determining the information for paging includes: reporting, by the CN node to an Operations Administration and Maintenance (OAM) entity, all query assistance information and information for paging obtained before context release is completed; and querying, in the OAM, information for paging at a time corresponding to the paging, where the query assistance information includes Global Navigation Satellite System (GNSS) position information of the UE and information related to motion of the UE, and the information related to motion of the UE includes at least one of a UE type related to motion capability, a motion direction or a motion speed.

According to some embodiments of the disclosure, a method for paging in a wireless communication system is further provided. The method includes: determining, by a Distributed Unit (DU) in a RAN node, information for paging, where the information for paging includes information related to a synchronization signal block (SSB) beam for paging a UE; and paging, by the DU, the UE in an idle state or inactive state, based on the information for paging.

For example, in some implementations, the information for paging includes at least one of: identification information of one or more cells; information related to time stayed in each of the one or more cells; identification information of one or more SSB beams that have been accessed in each of the one or more cells, or information related to time stayed in each of the one or more accessed SSB beams.

For example, in some implementations, the identification information of the one or more cells includes at least one of: identification information of a cell of the DU visited by the UE; or identification information of a cell of another DU in the RAN node visited by the UE that is received by a Central Unit (CU) of the RAN node from the other DU in an inter-DU handover procedure of the UE.

For example, in some implementations, the identification information of the one or more SSB beams includes at least one of: identification information of an accessed SSB beam in a cell of the DU visited by the UE; or identification information of an accessed SSB beam in a cell of another DU in the RAN node visited by the UE that is received by a Central Unit (CU) of the RAN node from the other DU in an inter-DU handover procedure of the UE.

For example, in some implementations, determining the information for paging includes receiving the information for paging from a CN node or the CU in the RAN node, where the information for paging is transmitted to the CN node through a UE context release complete message over an NG interface or is transmitted to the CU through a UE context release complete message over an F1 interface in a context release procedure of the UE.

For example, in some implementations, determining the information for paging includes: querying the information for paging in an Operations Administration and Maintenance (OAM) entity based on query assistance information, where the query assistance information includes Global Navigation Satellite System (GNSS) position information of the UE and information related to motion of the UE, and querying the information for paging in the Operations Administration and Maintenance (OAM) entity, where the information related to motion of the UE includes at least one of a UE type related to motion capability, a motion direction or a motion speed, and where the information for paging and the query assistance information are transmitted to the OAM before the paging.

For example, in some implementations, the GNSS location information and the information related to motion of the UE are information at the latest time before the UE is about to enter the idle or inactive state.

For example, in some implementations, the information for paging further includes cell-related information for paging a User Equipment (UE), and the method further includes paging the UE again based on the cell-related information in a case where the paging fails.

For example, in some implementations, the query assistance information is reported to the DU by the UE through one of the following: reporting, by the UE, the query assistance information to the DU, in a case where obtained location information meets preset or predefined conditions, after entering a connected state; reporting, by the UE, the query assistance information to the DU at the latest time before the UE is about to enter an idle state or inactive state; or reporting, by the UE, the query assistance information to the DU, in a case where the UE receives an indication to report the query assistance information.

According to some embodiments of the disclosure, a method for paging in a wireless communication system is further provided. The method includes: determining, by a Central Unit (CU) in a RAN node, information for paging, where the information for paging includes information related to a synchronization signal block (SSB) beam for paging a User Equipment (UE); and transmitting, by the CU, a paging message including the information for paging to a Distributed Unit (DU) in the RAN node to page the UE in an idle state or inactive state, based on the information for paging.

For example, in some implementations, the information for paging includes at least one of: identification information of one or more cells; information related to time stayed in each of the one or more cells; identification information of one or more SSB beams that have been accessed in each of the one or more cells; or information related to time stayed in each of the one or more accessed SSB beams.

For example, in some implementations, the identification information of the one or more cells includes at least one of: identification information of a cell of the DU visited by the UE; or, identification information of a cell of another DU in the RAN node visited by the UE that is received by the CU from the other DU in an inter-DU handover procedure of the UE.

For example, in some implementations, the identification information of the one or more SSB beams includes at least one of: identification information of an accessed SSB beam in a cell of the DU visited by the UE; or, identification information of an accessed SSB beam in a cell of another DU in the RAN node visited by the UE that is received by the CU from the other DU in an inter-DU handover procedure of the UE.

For example, in some implementations, determining the information for paging includes receiving the information for paging from a CN node, where the information for paging is transmitted to the CN node through a UE context release complete message over an NG interface or is transmitted to the CU through a UE context release complete message over an F1 interface in a context release procedure of the UE.

For example, in some implementations, determining the information for paging includes: querying the information for paging in an Operations Administration and Maintenance (OAM) entity based on Global Navigation Satellite System (GNSS) position information of the UE and information related to motion of the UE, where the information related to motion of the UE includes at least one of a UE type related to motion capability, a motion direction or a motion speed, and where the information for paging, the GNSS location information and the information related to motion of the UE are transmitted to the OAM before the paging.

For example, in some implementations, the GNSS location information and the information related to motion of the UE are information at the latest time before the UE is about to enter the idle or inactive state.

For example, in some implementations, the information for paging further includes cell-related information for paging a User Equipment (UE), and the method further includes determining that the DU pages the UE again based on the cell-related information in a case where the paging fails.

According to some embodiments of the disclosure, a RAN node is further provided, including: a transceiver configured to transmit and receive signals, and a controller configured to perform the methods of some embodiments described above.

For example, in some implementations, determining the information for paging includes: reporting, by the CU to an Operations Administration and Maintenance (OAM), all query assistance information and information for paging obtained before context release of the UE is completed; and querying the information for paging at a time corresponding to the paging in the OAM, where the query assistance information includes Global Navigation Satellite System (GNSS) position information of the UE and information related to motion of the UE, and the information related to motion of the UE includes at least one of a UE type related to motion capability, a motion direction or a motion speed.

According to some embodiments of the disclosure, in an NTN LEO satellite communication system, a UE covered by both a source cell and a target cell simultaneously, in a feeder link switch-over procedure, accesses the target cell by one of the following: transmitting first configuration information for reducing wireless signal quality of the source cell, improving wireless signal quality of the target cell or adjusting a selection threshold of the source cell and/or the target cell, so that the UE selects the target cell for access; transmitting second configuration information for configuring the source cell and the target cell to have a neighboring cell relationship, and setting suitable cell reselection priority and/or cell reselection sub-priority of intra-frequency or inter-frequency carrier, so that the UE selects the target cell for access; transmitting third configuration information for configuring a type of the source cell as a Barred type, so as to prevent an unregistered UE or a UE in an idle state or inactive state from accessing the source cell; in a case where the UE in the idle state or inactive state initiates uplink access actively, transmitting first indication information for indicating a time period during which the UE will perform a feeder link switch-over, so that if the UE performs uplink access in the time period, the target cell is selected instead of the source cell for access; or in a case where the UE in the idle state or inactive state initiates paging access passively, transmitting second indication information for indicating a time period during which the UE will perform feeder link switch-over, so that if the UE performs passive paging access in the time period, even if a paging message is successfully received in the source cell, the source cell is not selected for access, but the target cell is reselected for random access.

According to some embodiments of the disclosure, a CN node is further provided. The CN node includes: a transceiver configured to transmit and receive signals; and a controller configured to perform the methods of some embodiments described above.

According to some embodiments of the disclosure, a computer-readable storage medium having one or more computer programs stored thereon is further provided, where the one or more computer programs, when executed by one or more processors, implement the methods of some embodiments described above.

BRIEF DESCRIPTION OF THE DRAWINGS

In order to explain the technical scheme of the embodiments of the disclosure more clearly, the drawings of the embodiments will be briefly introduced below. Apparently, the drawings in the following description only refer to some embodiments of the disclosure, and do not limit the disclosure. In the drawings.

DETAILED DESCRIPTION

Figure 1:
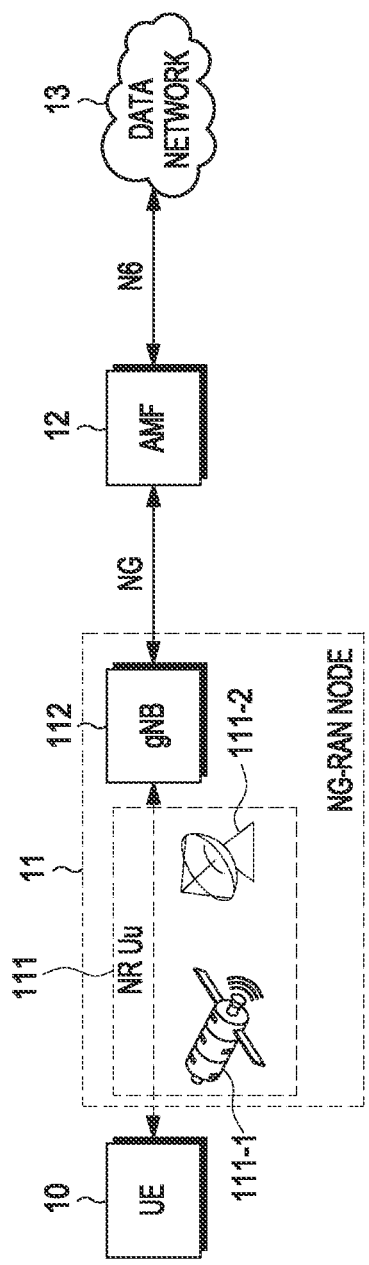
FIG. 1 illustrates a schematic diagram of a satellite transparent transmission system architecture according to some embodiments of the disclosure.

The following description with reference to the accompanying drawings is provided to assist in a comprehensive understanding of various embodiments of the disclosure as defined by claims and their equivalents. The following description includes various specific details to assist understanding, but these are merely example. Accordingly, those skilled in the art will recognize that various changes and modifications may be made to the various embodiments described herein without departing from the scope of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Therefore, it will be apparent to those skilled in the art that the following descriptions of the various embodiments of the disclosure are provided for illustrative purposes only and are not intended to limit the disclosure as defined by the appended claims and their equivalents.

Unless otherwise defined, the technical or scientific terms used in the disclosure shall have the ordinary meanings understood by those having ordinary skills in the field to which the invention belongs. The terms "first", "second", and the like used in this disclosure do not indicate any order, quantity, or importance, but are only used to distinguish different components. Similarly, "a", "an", or "the" and the like do not indicate a limit on quantity, but rather indicate that there is at least one. Words such as "include", "including", "comprise" or "comprising" mean that the element or item appearing before the word encompasses the element or item appearing after the word and the equivalent thereof without excluding other elements or items. Words such as "connected" or "interconnected" are not limited to physical or mechanical connections, but may include electrical connections, whether direct or indirect. "Upper", "lower", "left", "right", etc. are only used to indicate the relative positional relationship, and in a case where the absolute position of the object to be described is changed, the relative positional relationship may also be changed accordingly.

The advantages and features of one or more embodiments of the disclosure and implementation methods thereof can be more easily understood by referring to the following detailed description of the embodiments and the accompanying drawings. In this regard, the embodiments may have different forms and should not be construed as being limited to the descriptions set forth herein. Rather, these embodiments are provided so that this disclosure will be thorough and complete, and will fully convey the concept of the embodiments to those skilled in the art, and the scope of protection of this disclosure will be limited only by the appended claims.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description throughout the specification.

In the following description, terms indicating access nodes, terms indicating network entities, terms indicating messages, terms indicating interfaces between network entities, and terms indicating various types of identification information are only examples and should not be interpreted as limitations. Other terms with equivalent technical meanings may also be used.

In a communication system such as a 5G NR (New Radio) network, when a UE is in an IDLE state, if there is downlink control signaling or user data transmitted to the UE, a Core network (CN) side needs to page the UE in the idle state. A mechanism is that the CN pages the UE in a plurality of cells on one Tracking Area (TA) or multiple TAs (e.g., a TA List) based on a configured Registration Area of the UE. Or, when the UE enters a CM-IDLE state, a RAN node transmits identity (ID) information of recommended RAN nodes and recommended cells for subsequent paging of the UE to the CN, and when the CN needs to page the UE next time, the CN selects the recommended RAN node(s) and transmits the ID information of recommended cells to the RAN node(s) to page the UE.

When the UE is in an INACTIVE state, if there is downlink control signaling or user data transmitted to the UE, the RAN node needs to page the UE. A mechanism is that the RAN node pages the UE in all cells on a configured RAN-based Notification Area (RNA) of the UE. If a certain cell belongs to a neighboring RAN node, the current RAN node will also transmit a paging message such as an Xn RAN PAGING message to the neighboring RAN node, which carries target cell ID information or target RAN Area ID information for paging the UE, and then the neighboring RAN node pages the UE in the target cell of the corresponding RNA.

In the implementations of the above schemes, the mechanism of paging the UE is only accurate to a cell level. However, in a 5G communication system, since a large-scale antenna array is adopted at radio frequency, beamforming technology may be realized, so multiple Synchronization Signal/PBCH Blocks (SSB) may be configured in the same NR cell and mapped to different beams for transmission. At B6G (Below 6 GHz), the current specification supports that the same NR cell may be configured with up to 4 or 8 SSBs and utilize different beams to transmit the SSBs. At A6G (After 6 GHz), the current specification supports that the same NR cell may be configured with up to 64 SSBs and transmit the SSBs with different beams (however, the embodiments of the disclosure are not limited to this, for example, a cell may be configured with N different beams, where N is a natural number). Each SSB is mapped to different time slots and periodically transmitted on beams in different directions, so as to expand a coverage of the cell and better ensure wireless signal quality when a UE accesses the cell. However, since the mechanism of paging the UE in the above schemes is only accurate to the cell level without considering beams used to transmit SSBs, it may not be possible to accurately page the UE.

In order to at least solve the above problems, embodiments of the disclosure provide an optimization mechanism for paging a UE in an IDLE or INACTIVE state.

When a UE in a certain orientation in a cell accesses the cell, a beam with the best signal quality may be first selected, and then random access is initiated. When the UE enters the idle state, if a CN pages the UE, even though an existing paging mechanism can be used, the CN may indicate that the UE is paged on one or more recommended cells. However, a RAN node still needs to utilize multiple beams configured for a cell to periodically transmit paging time slots on each beam of the cell. For a 5G NR cell configured with multiple beams, if the RAN node knows that the UE often stays on one or more specific beams of one or more cells, when the UE enters the idle state, the RAN node may recommend assistance information such as cell IDs and beam IDs of these cells where the UE stays, and the stay durations to the CN. The CN may store the information and use it for subsequent paging of the UE. When the CN pages the UE, by utilizing these pieces of assistance information, the CN may determine that the RAN node pages the UE on a specific beam or beams of the one or more cells, so as to page the UE more accurately.

Similarly, when a RAN node pages a UE in the INACTIVE state, if the RAN node knows that the UE often stays on a specific beam or beams of one or more cells, then when the UE enters the inactive state, the RAN node stores the information and uses it for subsequent paging of the UE. When the RAN pages the UE, by utilizing these pieces of assistance information, the RAN may determine to page the UE on a specific beam or beams of the one or more cells. Therefore, compared with paging the UE in all cells on a configured RNA of the UE, the paging range is reduced to page more accurately, thereby saving radio resources and power consumption when the RAN node pages the UE.

Particularly, the methods according to the embodiments of the disclosure may be suitable for an NR communication system supporting a non-terrestrial network (NTN) architecture, in which a satellite is introduced as a part of a RAN node. Even if a UE moves, the UE may still be on the same SSB beam or several neighboring SSB beams, because a beam transmitted by the satellite covers a larger range than that in the NR communication system. Therefore, the UE may be accurately paged on an SSB beam configured by the cell, a and thus paging range is reduced to page more accurately, and radio resources of the satellite and power consumption when paging the UE can be saved.

Therefore, in some embodiments of the disclosure, compared with paging a UE at the cell level in current NR system, it is possible to page the UE more accurately on one or more beams in one or more recommended cells. Therefore, some embodiments of the disclosure do not need to utilize all beams configured by the cell to transmit in each paging time slot, thereby saving radio resources and power consumption of the RAN node when paging the UE. For example, some embodiments of the disclosure are particularly applicable to an NTN network or a UE with weak mobility. Examples of the UE with weak mobility include a static or low mobility UE of Internet of Things type including, for example, a sensor (such as a temperature sensor, a humidity sensor, a sound sensor, a motion sensor, a proximity sensor, a gas sensing sensor or a heat sensing sensor), smart home appliances (such as a TV, a refrigerator and a washing machine), a lights, an alarm, a smart water meter, a smart electricity meter, and/or a smart gas meter, among others.

In order to facilitate the description and presentation of various embodiments of the disclosure, some terms or message names are defined. It should be noted that the terms or message names defined here are only examples, and other terms or message names may be adopted. In various embodiments, information transmitted between interfaces may be realized by separately defining new messages. Or, the information transmitted between interfaces may be realized by a new added Information Element (IE) to existing messages in existing corresponding interface specifications (such as 3GPP TS 38.473, 3GPP TS38.413 or 3GPP TS 38.331).

In embodiments of the disclosure, a UE may be a terminal or a mobile device (for example, it may be used interchangeably), and may include a mobile station (MS), a mobile phone, a smart phone, a computer, or a multimedia system capable of performing a communication function.

In embodiments of the disclosure, a base station may be at least one of: an eNode B (eNB), a node B, a gNode B (gNB), an ng-eNB, a radio access unit, a base station controller or a node on a network.

In embodiments of the disclosure, a gNB (or next Generation Node B) may be a next-generation base station node. For example, the gNB may refer to a 5G base station or an NR base station.

In embodiments of the disclosure, an NG-RAN node may be a next-generation radio access network node. For example, The NG-RAN node may include a gNB or an ng-eNB.

In embodiments of the disclosure, a DU (Distributed Unit) may be used interchangeably with a gNB-DU. For example, the DU may have functions such as Radio Link Control (RLC) protocol, Media Access Control (MAC) protocol and Physical (PHY) protocol.

In embodiments of the disclosure, a CU (Central Unit) may be used interchangeably with a gNB-CU. For example, the CU may have functions such as Radio Resource Control (RRC), Service Data Adaptation Protocol (SDAP), and a Packet Data Convergence Protocol (PDCP) protocol layer.

In embodiments of the disclosure, for 5G NR, an SSB is a Synchronization Signal/PBCH (Physical Broadcast Channel) block. For example, the SSB may include a Primary Synchronization Signal (PSS), a Secondary Synchronization Signal (SSS), and a PBCH, where the PBCH may include PBCH Demodulation reference signals (DM-RS) and PBCH data.

In embodiments of the disclosure, an SSB beam may refer to a beam associated with a corresponding SSB (e.g., an SSB index such as SSB-Index or ssb-index), for example, a beam that may be used for transmission of the corresponding SSB. An "accessed" SSB beam may refer to an SSB beam used in a random access procedure, or an SSB beam used in reselecting access after a radio link failure occurs for the current accessing beam.

In embodiments of the disclosure, a 5GC (5G Core network) may include network elements such as an AMF (Access and Mobility Management Function) and a UPF (User Plane Function).

In embodiments of the disclosure, an AMF is a network element of a 5GC, which is responsible for access and mobility management of a 5G base station. For example, the AMF may be connected to the 5G base station through an NG-C interface.

In embodiments of the disclosure, an NG interface paging message may refer to a paging message for paging a UE transmitted by a CN (e.g., an AMF) to a RAN node (e.g., a gNB-CU) or an NG-RAN node through an NG interface.

In embodiments of the disclosure, an F1 interface paging message may refer to a paging message for paging a UE transmitted by a gNB-CU to a gNB-DU through an F1 interface.

In embodiments of the disclosure, an RRC paging message may refer to a paging message for paging a UE transmitted by a RAN node (e.g., a gNB-DU) or an NG-RAN node to the UE.

In embodiments of the disclosure, an OAM (Operations Administration and Maintenance) entity may store various configuration information, such as satellite ephemeris, information on mapping (e.g., a mapping relationship) between satellite beams (e.g., satellite beam IDs) and base station cells (e.g., cell IDs), and information on mapping (e.g., a mapping relationship) of each satellite beam (a satellite beam ID) to a configuration of SSB beams of a cell (e.g., SSB beam IDs), among others. For example, information on a geographic location area covered by the satellite beams and SSB beams of each cell may be calculated based on a preconfigured or preset array map of satellite antennas, the minimum elevation angle of the satellite antennas, and the above stored configuration information.

In embodiments of the disclosure, a GEO (Geostationary Earth Orbit) may refer to a circular orbit, such as about 35786 kilometers above the equator of the earth, on which a satellite may move in a direction of the earth's rotation. An orbit period of the satellite in this orbit may be equal to the circulation (or rotation) period of the earth. Thus, for a ground observer, a relative position of the satellite in the sky is fixed and still. That is to say, the position between the satellite in the orbit and the ground remain relatively unchanged.

In embodiments of the disclosure, an LEO (Low Earth Orbiting) may refer to an orbit around the earth with a height between about 300 km to 1500 km. For a ground observer, a relative position in the sky changes periodically. That is to say, the positions of a satellite in the orbit and the ground changes periodically.

In embodiments of the disclosure, a GNSS (Global Navigation Satellite System) may include various types of satellite navigation systems, including global, regional and enhanced satellite navigation systems, such as GPS of the United States, Glonass of Russia, Galileo of Europe, Beidou satellite navigation system of China, and related enhanced systems, such as WAAS (Wide Area Augmentation System) of the United States, EGNOS (European Geostationary Navigation Overlay Service) of Europe and MSAS (Multifunctional Satellite Augmentation System) of Japan, among others. In addition, the GNSS may also include other satellite navigation systems being built and to be built. Therefore, the GNSS may be a multi-system, multi-level and multi-mode complex combined system. It should be noted that the disclosure does not limit specific implementations of the GNSS. For example, the GNSS in embodiments of the disclosure may include one or more of the satellite navigation systems described above.

Various embodiments of the disclosure will be described in detail with reference to the accompanying drawings.

Embodiments of the disclosure may be applicable to NTN networks. Basic architectures of some NTN networks supported by NR are described with reference to FIGS. 1-3 below.

FIG. 1 illustrates a schematic diagram of an architecture of a satellite transparent transmission system according to some embodiments of the disclosure.

Referring to FIG. 1, in the architecture of the transparent transmission system, a UE 10 may communicate with a gNB 112 in an NG-RAN node 11 through a satellite 111-1. The satellite 111-1 and an NTN gateway 111-2 may constitute an RRU (Remote Radio Unit) 111. For example, the satellite 111-1 in the architecture may only have functions of uplink signal reception filtering, frequency conversion, and downlink signal filtering and amplification, and therefore its functions may be similar to those of an analogue RF repeater.

Continuing to refer to FIG. 1, the UE 10 may communicate with a gNB 112 through an NR Uu interface, the gNB 112 may communicate with a 5GC 12 through an NG interface, and the 5GC 12 may communicate with a data network 13 through an N6 interface. In addition, the satellite 111-1 may communicate with the NTN gateway 111-2 through a Satellite Radio Interface (SRI) (not shown). The above NR Uu interface, NG interface and N6 interface may be standard interface names defined by 3GPP specifications.

Figure 2:
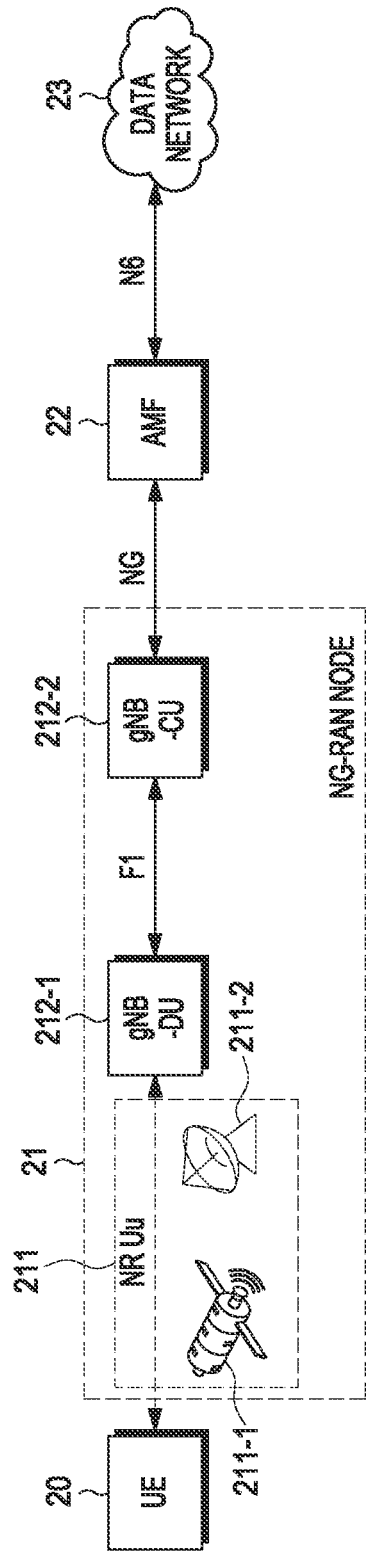
FIG. 2 illustrates a schematic diagram of a satellite transparent transmission system architecture in which a Central Unit (CU) and a Distributed Unit (DU) are split according to some embodiments of the disclosure.

FIG. 2 illustrates a schematic diagram of an architecture of a satellite transparent transmission system in which a CU and a DU are split (i.e. with split CU-DU) according to some embodiments of the disclosure.

Referring to FIG. 2, a gNB in the satellite transparent transmission system includes a CU (i.e., a gNB-CU) and a DU (i.e., a gNB-DU) that are separated from each other. A UE 20 may communicate with a gNB-CU 212-2 in an NG-RAN node 21 through a satellite 211-1. The satellite 211-1 and an NTN gateway 211-2 may constitute an RRU 211. For example, the satellite 211-1 in the system may only have functions of uplink signal reception filtering, frequency conversion, and downlink signal filtering and amplification, and therefore its functions may be similar to those of an analog radio frequency repeater.

Continuing to refer to FIG. 2, the UE 20 may communicate with a gNB-DU 212-1 through an NR Uu interface, the gNB-DU 212-1 may communicate with a gNB-CU 212-2 through an F1 interface, the gNB-CU 212-2 may communicate with a 5GC 22 through an NG interface, and the 5GC 22 may communicate with a data network 13 through an N6 interface. In addition, the satellite 211-1 may communicate with the NTN gateway 211-2 through an SRI (not shown). The above NR Uu interface, F1 interface, NG interface and N6 interface may be standard interface names defined by 3GPP specifications.

Figure 3:
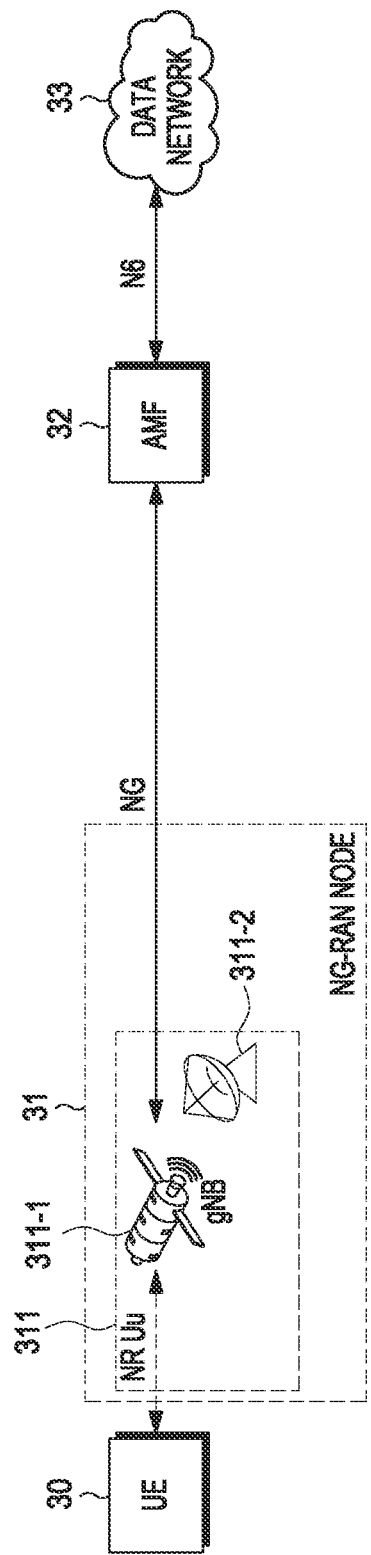
FIG. 3 illustrates a schematic diagram of an on-board gNB satellite regenerative transmission system architecture according to some embodiments of the disclosure.

FIG. 3 illustrates a schematic diagram of an architecture of a satellite regenerative transmission system based on an on-board gNB according to some embodiments of the disclosure.

Referring to FIG. 3, in the architecture of the satellite regenerative transmission system based on an on-board gNB, a role of a satellite 311-1 may correspond to, for example, a 5G base station gNB. For example, the satellite 311-1 may support various functions of the gNB defined by the 3GPP specifications.

In the satellite regenerative transmission system based on an on-board gNB illustrated in FIG. 3, the satellite 311-1 may have the functions of digital signal intermediate frequency processing including modulation and demodulation, and coding and decoding, and radio frequency processing including uplink signal reception and filtering, frequency conversion, and downlink signal filtering and amplification.

Continuing to refer to FIG. 3, a UE 30 may communicate with a satellite 311-1 in a RAN node 31 through an NR Uu interface, the satellite 311-1 may communicate with a 5GC 32 through an NG interface, and the 5GC 32 may communicate with a data network 33 through an N6 interface. In addition, the satellite 311-1 may communicate with an NTN gateway 311-2 through an SRI (not shown). The above NR Uu interface, NG interface and N6 interface may be standard interface names defined by 3GPP specifications.

Figure 4:
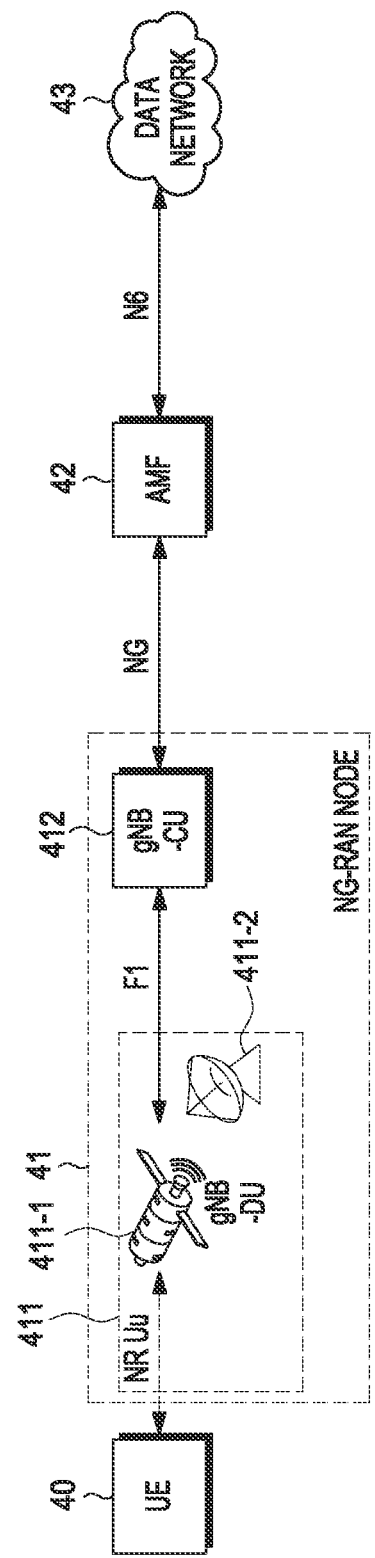
FIG. 4 illustrates a schematic diagram of an on-board gNB-DU satellite regenerative transmission system architecture according to some embodiments of the disclosure.

FIG. 4 illustrates a schematic diagram of an architecture of a satellite regenerative transmission system based on an on-board gNB-DU according to some embodiments of the disclosure.

Referring to FIG. 4, in the architecture of satellite regenerative transmission system based on an on-board gNB-DU, a role of a satellite 411-1 may correspond to, for example, a gNB-DU in a gNB, and may communicate with a gNB-CU 412 in the gNB. For example, the satellite 411-1 may support various functions of the gNB-DU defined by the 3GPP specifications.

In the satellite regenerative transmission system based on an on-board gNB-DU in FIG. 4, the satellite 411-1 may have functions of digital signal intermediate frequency processing including modulation and demodulation, and coding and decoding, and radio frequency processing including uplink signal reception and filtering, frequency conversion, and downlink signal filtering and amplification.

Continuing to refer to FIG. 4, a UE 40 may communicate with a satellite 411-1 in a RAN node 41 through an NR Uu interface, the satellite 411-1 may communicate with the gNB-CU 412 in the RAN node 41 through an F1 interface, the gNB-CU 412 may communicate with a 5GC 42 through an NG interface, and the 5GC 42 may communicate with a data network 43 through an N6 interface. In addition, the satellite 411-1 may communicate with an NTN gateway 411-2 through an SRI (not shown). The above NR Uu interface, F1 interface, NG interface and N6 interface may be standard interface names defined by 3GPP specifications.

It should be noted that the NTN networks according to the embodiments of the disclosure described above are only examples. For example, in the NTN networks described above, some of the elements described above may be omitted or additional elements may be included.

It should be noted that although several examples of the NTN networks to which the embodiments of the disclosure may be applied are described above. However, the embodiments of the disclosure are not limited thereto. The embodiments of the disclosure may be applicable to any suitable communication systems.

Various embodiments of a method for paging a UE, including paging initiated by a CN for a UE in an IDLE state and paging initiated by a RAN for a UE in an INACTIVE state, will be described below respectively for the basic network architectures of the NTNs above.

In the embodiments of the disclosure, types of satellites include, but are not limited to, a GEO and an LEO described in the embodiments. For example, the embodiments of the LEO are also applicable to other similar satellites such as MEO (Medium Earth Orbit) satellites or HEO (High Elliptical Orbit) satellites or mobile UAS (Unmanned Aircraft Systems) platforms. For example, the embodiments of the GEO are also applicable to other similar scenarios within a research scope of 3GPP NTNs such as fixed HAPS (High Altitude Platform Station) or fixed UAS platforms. For example, the embodiment of the GEO may also be applicable to current TN (terrestrial network) NR communication systems.

It should be noted that although the following embodiments will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

It should also be noted that FIGS. 5 to 16 discussed below and various embodiments for describing the principles of embodiments of the disclosure are only for illustration, and should not be interpreted as limiting the scope of the disclosure in any way. Those skilled in the art will understand that the principles of the disclosure may be implemented in any suitably arranged system or device.

The text and drawings are provided as examples only to help understand the disclosure. They should not be interpreted as limiting the scope of the disclosure in any way. Although certain embodiments and examples have been provided, based on the disclosure herein, it will be apparent to those skilled in the art that changes may be made to the illustrated embodiments, implementations and examples without departing from the scope of the disclosure.

Figure 5A:
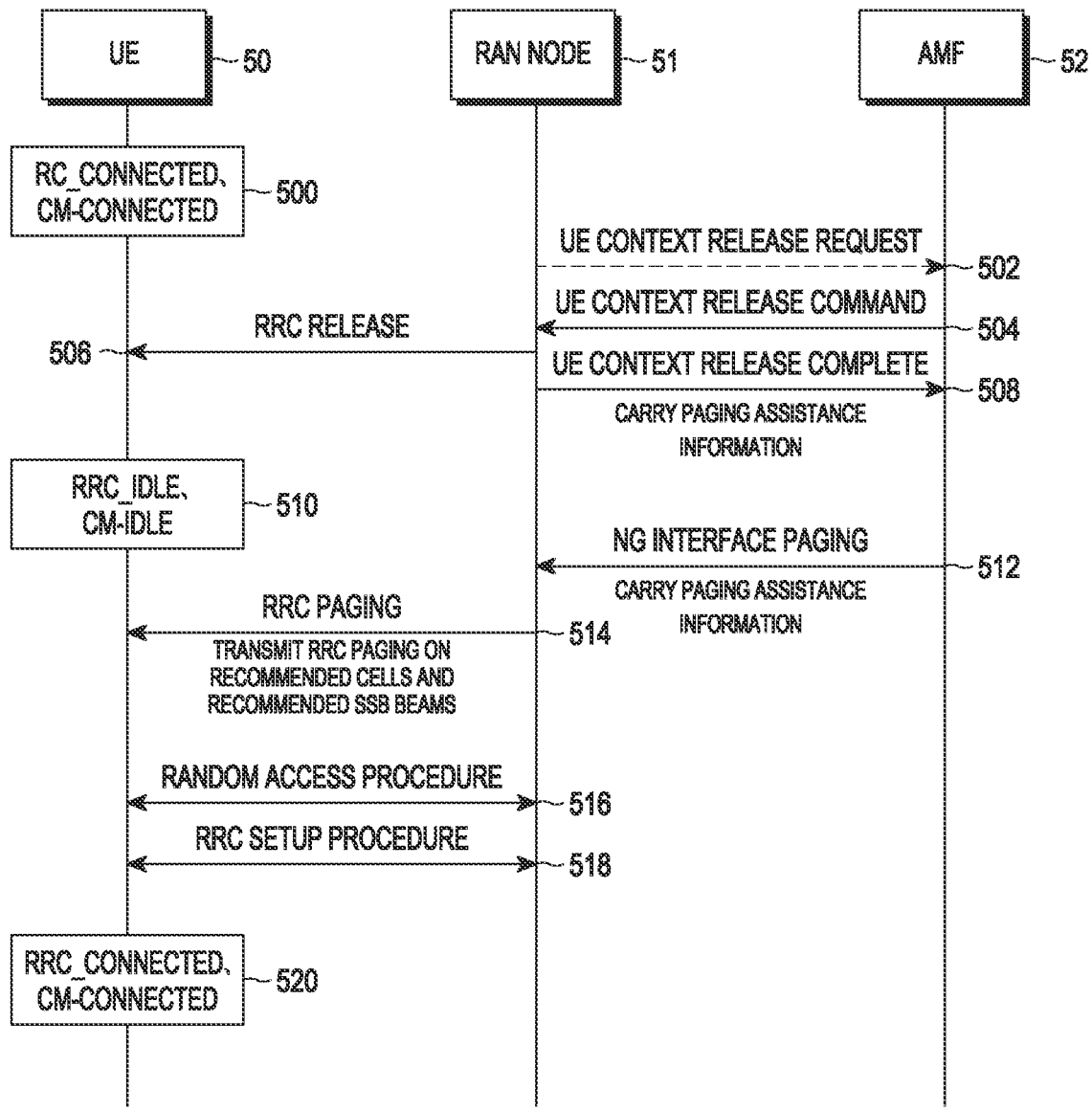
FIG. 5A illustrates a diagram of a method of paging a User Equipment (UE) by a Core network (CN) according to some embodiments of the disclosure, where the method may be applicable to an NR communication system, an NTN GEO satellite transparent transmission system, a GEO on-board gNB satellite regenerative transmission system, or a future new next-generation communication system.
Figure 5B:
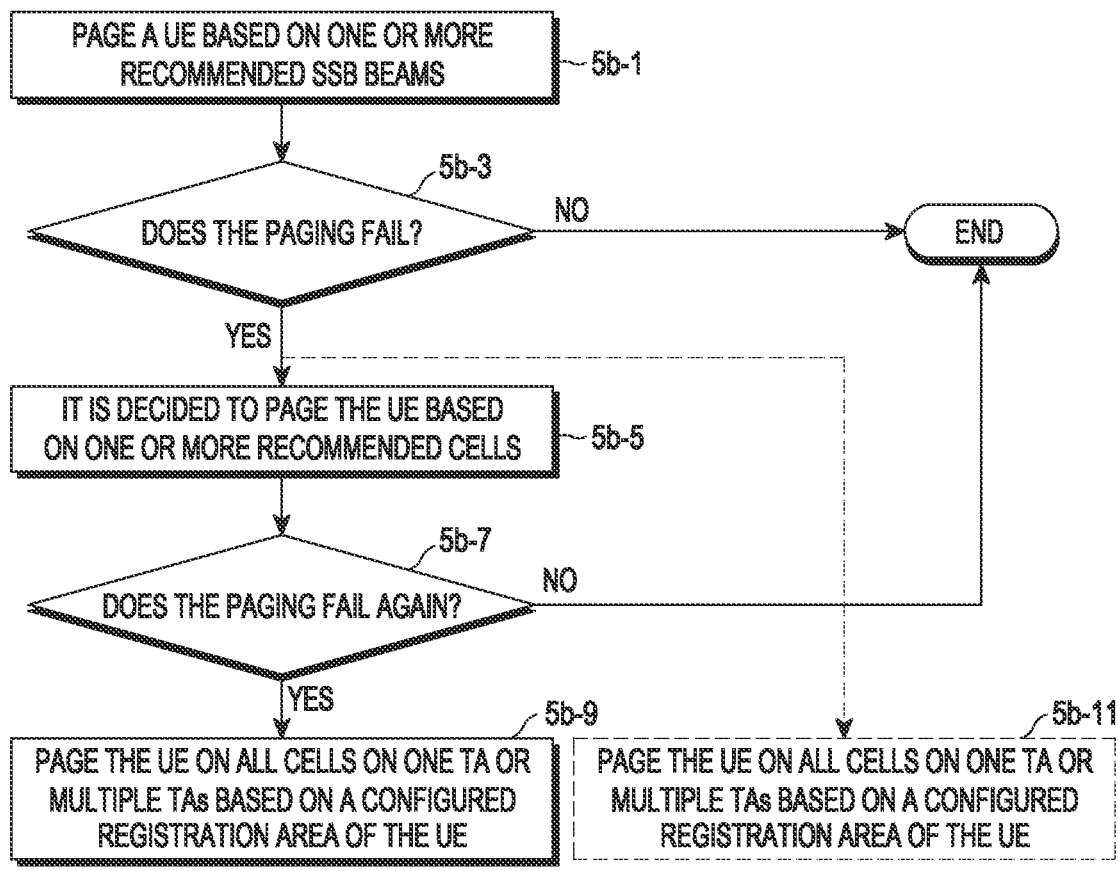
FIG. 5B illustrates a flowchart of a selection method of a paging scheme according to some embodiments of the disclosure.

FIG. 5A illustrates a diagram of a method of paging a UE by a CN according to some embodiments of the disclosure. FIG. 5B illustrates a flowchart of a selection method of a paging scheme according to some embodiments of the disclosure. The embodiments of FIGS. 5A and 5B describe flows of paging the UE initiated by the CN. For example, these embodiments may be applicable to a current NR communication system, an NTN GEO satellite transparent transmission system (see FIG. 1), a GEO on-board gNB satellite regenerative transmission system (see FIG. 3), or a future new next-generation communication system.

Referring to FIG. 5A, in operation 500, a UE may be in a CONNECTED state after accessing a radio access network node (RAN node). For example, the UE may be in an RRC_CONNECTED state and a CM-CONNECTED state.

At operation 502, a UE context release request procedure may be initiated by the RAN node. For example, when the UE does not receive and transmit user plane data and does not have any signaling plane messages for interaction, the RAN node may initiate the UE context release request procedure in a case that the RAN node monitors that the UE is always in this state and a timer is expired. Or, the UE context release request procedure may be initiated by the RAN node for other reasons.

At operation 504, in response to a UE context release request from the RAN node, an Access and Mobility Management Function (AMF) 52 on the CN side transmits a UE context release command to the RAN node 51. Or, the procedure of the UE context release command may be directly initiated by the AMF 52 on the CN side for various reasons.

In operation 506, after receiving the UE context release command, the RAN node may initiate an RRC release procedure to the UE 50 to release radio resources of the UE 50, and simultaneously release radio interface logical connections, related signaling and user plane resources of the UE 50.

After completion of the RRC release, in operation 508, the RAN node 51 may transmit a UE context release complete message confirming the completion of the RRC release to the AMF 52. For example, the context release complete message may indicate the completion of the release of the logical connections and related resources for the UE 50 on the RAN node side.

After the completion of the RRC release, in operation 512, the UE may enter an IDLE state. For example, the UE may be in an RRC_IDLE state and a CM-IDLE state.

When the UE is in the idle state, if there is downlink control signaling or user data transmitted to the UE, the CN side may need to page the UE in the idle state. A possible mechanism is that the CN pages the UE in all cells on one TA or multiple TAs (e.g., a TA List) based on a configured Registration Area of the UE, where these cells may be configured in different RAN nodes. Or, when the UE enters the CM-IDLE state, the RAN node transmits information on recommended cells and RAN nodes for paging (e.g., ID information of the recommended cells and RAN nodes) to the CN. When the CN needs to page the UE next time, the CN transmits the information on recommended cells and RAN nodes for paging (e.g., the ID information of the recommended cells and RAN nodes) to the RAN node to page the UE.

In current 5G communication systems or future next-generation communication systems, since a large-scale antenna array may be adopted in radio frequency, beam-forming technology may be realized. For example, multiple SSBs may be configured to the same cell and mapped to different beams for transmission. SSBs of each cell may be transmitted on different beams in different time slots. When a UE is located at different positions in the cell, the UE may access the cell with beams in different directions, and access beams may change when the UE moves in the cell. When the CN pages the UE in the idle state, even though the CN side (e.g., the AMF) transmits a paging message to the RAN node through a corresponding interface as described above, where the paging message carries ID information of one or more recommended cells for paging the UE, the RAN node still needs to periodically transmit paging time slots on each SSB beam of the cell by utilizing multiple beams configured by the cell. It can be understood that for a fixed-position immobile UE, the UE should always be in the coverage of a certain SSB beam in a cell. Or, even if the UE moves, it is not out of the coverage of the SSB beam, or even if the UE moves, it is in the coverage of some SSB beams, or even if the UE moves, it is in the coverage of one or more SSB beams in one or more neighboring cells. In addition, when the UE is in the connected state, the RAN node should know information about which SSB beam or beams of a cell the UE has stayed in and the stay durations. In some embodiments of the disclosure, when the UE enters the idle state for various reasons, the RAN node may report the information to the CN side (such as the AMF). The CN side (such as the AMF) may store the information and use it for subsequent paging of the UE. For example, the RAN node may report the information to the CN side (such as the AMF) through the UE context release complete message.

In some implementations, referring to FIG. 5A, the context release complete message in operation 508 may include assistance information for paging the UE (for convenience of description, it may be referred to as "information for paging" or "paging assistance information" in the disclosure), where the paging assistance information includes at least one of information related to recommended cells and information related to recommended SSB beams. For example, the paging assistance information may be transmitted by further carrying the paging assistance information in the context release complete message.

In some examples, the paging assistance information may include one or more of the following information:
- ID information of one or more cells (such as NR Cell Identity or NR CGI (Cell Global Identifier), E-UTRA Cell Identity, or E-UTRA CGI)
- information related to time stayed in each of the one or more cells (for convenience of description, it may be referred to as "information related to Time Stayed in Cell")
- ID information of one or more SSB beams that have been accessed in each of the one or more cells (such as SSB-Index) (for convenience of description, it may be referred to as "ID information of SSB beams")
- information related to time stayed in each of the one or more accessed SSB beams (for convenience of description, it may be referred to as "information related to Time Stayed in SSB Beam")

Among the example information listed above, the ID information of one or more cells and the information related to Time Stayed in Cell may be information related to the recommended cells. The ID information of SSB beams and the information related to time stayed in each of the one or more accessed SSB beams may be information related to the recommended SSB beams. Therefore, in a case where the paging assistance information includes all the above listed information, the one or more recommended cells may be determined from at least one of the ID information of one or more cells or the information related to Time Stayed in Cell in the paging assistance information, and one or more recommended SSB beams may be determined from at least one of the ID information of SSB beams or the information related to Time Stayed in SSB Beam in the paging assistance information.

In addition, among the example information listed above, for example, the time stayed in cell may include at least one of a length of time to stay in a corresponding cell or a starting and ending time of the stay. For example, the time stayed in SSB beam may include at least one of a length of time to stay in a corresponding SSB beam or a starting and ending time of the stay.

In some examples, the ID information of one or more cells in the paging assistance information may include ID information of one or more cells of a current RAN node visited by the UE. In the case of handover from a source RAN node to the current RAN node, the ID information of one or more cells in the paging assistance information may include ID information of visited source cells (i.e., cells of the source RAN node) reported by the source RAN node to the current target RAN node in a handover procedure. In this case, the target RAN node may record or store the information and then report the same to the CN. In addition, in this case, it may also include reporting ID information of the source RAN node (e.g., a global RAN node ID (such as Global RAN Node ID)) to the CN, which will be described in detail later with reference to FIGS. 17 and 18.

In some examples, the ID information of SSB beams in the paging assistance information may include ID information of accessed SSB beams in visited cells of the current RAN node. In the case of handover from the source RAN node to the current RAN node, the ID information of SSB beams in the paging assistance information may include ID information of accessed SSB beams in source cells, the ID information of SSB beams being reported by the source RAN node to the current target RAN node in a handover procedure. In this case, the target RAN node may record or store the information and then report the information to the CN, which will be described in detail later with reference to FIGS. 17 and 18.

In some implementations, considering that the information related to the recommended cells for paging may be transmitted to the CN (such as the AMF) through a UE context release complete message (such as UE CONTEXT RELEASE COMPLETE message) in 5G communication systems, thus, the information related to the recommended SSB beams for paging may be transmitted to the CN (such as the AMF) by a newly added IE (Information Element) to the UE context release complete message (such as UE CONTEXT RELEASE COMPLETE message), thereby saving signaling overhead. However, the embodiments of the disclosure are not limited thereto. In some implementations, the information related to the recommended SSB beams in the paging assistance information may be transmitted from the RAN node 51 to the AMF 52 by a separate message. For example, the information related to the recommended SSB beams in the paging assistance information may be transmitted by a newly added NG interface message or other NG interface messages.

Continuing to refer to FIG. 5A, the AMF 52 may receive the paging assistance information for paging the UE (including the information related to the recommended cells and the information related to the recommended SSB beams) carried by the context release complete message from the RAN node 51 in operation 508. Or, the AMF 52 may obtain the paging assistance information through other new messages or through other messages to which a new IE is added, and store the information for subsequent paging of the UE.

When there is downlink signaling or user plane data to be transmitted to the UE 50, the AMF 52 on the CN side may need to page the UE 50. In this case, in operation 512, the AMF 52 may transmit an NG interface paging message to the RAN node 51 to page the UE 50. For example, the paging assistance information for paging the UE may be carried in the NG interface paging message, and includes at least one of the information related to the recommended cells and the information related to the recommended SSB beams.

In some examples, the paging assistance information carried in the NG interface paging message may be the paging assistance information for paging the UE received from the RAN node 51. For example, the paging assistance information may be received from the RAN node 51 through the context release complete message. Or, the paging assistance information may be obtained through other new messages or through other messages to which a new IE is added, and be stored for subsequent paging of the UE.

In some examples, the paging assistance information carried in the NG interface paging message may include one or more of the following information:
  ID information of one or more cells (such as NR Cell Identity or NR CGI, E-UTRA Cell Identity, or E-UTRA CGI)
  information related to time stayed in each of the one or more cells (which may be referred to as "information related to Time Stayed in Cell")
  ID information of one or more SSB beams that have been accessed in each of the one or more cells (such as SSB-Index) (which may be referred to as "ID information of SSB beams")
  information related to time stayed in each of the one or more accessed SSB beams (which may be referred to as "information related to Time Stayed in SSB Beam")

In some examples, the ID information of one or more cells in the paging assistance information carried in the NG interface paging message may be ID information of the one or more recommended cells for paging the UE received from the RAN node 51. For example, the information may be received from the RAN node 51 through the context release complete message. Or, the information may be obtained through a new NG interface message or by a newly added IE to other NG interface messages.

In some examples, the ID information of SSB beams in the paging assistance information carried in the NG interface paging message may be ID information of the one or more recommended SSB beams for paging the UE received from the RAN node 51. For example, the information may be received from the RAN node 51 through the context release complete message. Or, the information may be obtained through a new NG interface message or by a newly added IE to other NG interface messages.

In some examples, the ID information of one or more cells in the paging assistance information carried in the NG interface paging message may include ID information of one or more cells of the RAN node (e.g., the RAN node 51) that have been visited by the UE before the UE enters the idle state. Or, in the case of handover from the source RAN node to the current RAN node, the paging assistance information carried in the NG interface paging message may also include ID information of accessed source cells and/or information related to time stayed in the source cells reported by the source RAN node to the current RAN node (or referred to as the target RAN node) in a handover procedure. In this case, the CN (e.g., the AMF 52) may also select the source RAN node to transmit the NG interface paging message and carry ID information of recommended source cells in the message, which will be described in detail later with reference to FIGS. 17 and 18.

In some examples, the ID information of SSB beams in the paging assistance information carried in the NG interface paging message may include ID information of accessed SSB beams in accessed cells of the RAN node (e.g., the RAN node 51). Or, in the case of handover from the source RAN node to the current RAN node, the paging assistance information carried in the NG interface paging message may also include ID information of accessed SSB beams in source cells reported by the source RAN node to the current RAN node (or referred to as the target RAN node) in a handover procedure. In this case, the CN (e.g., the AMF 52) may also select the source RAN node to transmit the NG interface paging message and carry ID information of recommended SSB beams (e.g., the accessed SSB beams) in recommended source cells (e.g., accessed source cells), which will be described in detail later with reference to FIGS. 17 and 18.

Continuing to refer to FIG. 5A, in operation 514, after the paging assistance information is received by the RAN node 51 for paging the UE 50, based on the paging assistance information, an RRC paging message may be transmitted to the UE 50 for paging the UE 50. In some implementations, the RAN node 51 may select a corresponding cell(s) and corresponding SSB beam(s) based on the paging assistance information. For example, the RAN node 51 may determine a cell with a longer stay time and an SSB beam with a longer stay time from the paging assistance information, and transmit the RRC paging message on the determined cell with a longer stay time and SSB beam with a longer stay time for paging the UE 50.

In an example, one or more cells with a longer stay time may be determined by comparing time stayed in cell with a preset or preconfigured threshold.

In an example, one or more SSB beams with a longer stay time may be determined by comparing time stayed in SSB beam with a preset or preconfigured threshold.

In embodiments of the disclosure, when the CN pages the UE, the RAN node may page the UE on the one or more recommended cells and one or more recommended SSB beams in each of the one or more cells based on the paging assistance information, thereby paging the UE more accurately.

Continuing to refer to FIG. 5A, when the RRC paging message is received by the UE 50, a random access procedure may be initiated in operation 516 and an RRC setup procedure may be initiated in operation 518. Through the random access procedure and RRC setup procedure, the UE 50 may resume to the connected state in operation 520 for transmission or reception of signaling and user plane data.

The method of paging the UE by the CN according to some embodiments of the disclosure has been described above in conjunction with FIG. 5A. In the method of FIG. 5A, if the paging by the RAN node on one or more recommended SSB beams in each recommended cell fails, the CN or RAN node may expand the paging range. In embodiments of the disclosure, the following possible schemes, including at least one of scheme a-1, scheme a-2, scheme a-3 or scheme a-4, may be adopted.

Scheme a-1

Indication information (e.g., an IE including the indication information) is carried in an initial NG interface paging message, and the indication information is used to indicate to the RAN node that if the first paging based on SSB beams of a cell fails, the paging range can be directly expanded. For example, the RRC paging message may be transmitted on all SSB beams in each of the one or more recommended cells to expand the paging range.

Scheme a-2

If the CN knows that the first paging based on SSB beams of a cell fails, the CN may decide to expand the paging range. For example, the CN may transmit the NG interface paging message carrying the ID information of the one or more recommended cells for paging the UE again. The RAN node, after receiving the second NG interface paging message, pages the UE on all SSB beams in each of the one or more recommended cells.

Scheme a-3

If the CN knows that the first paging based on SSB beams of a cell fails, the CN may decide to expand the paging range. For example, the CN may utilize an existing CN paging mechanism to expand the paging range. Particularly, the CN may select a RAN node of cell configured with a corresponding Tracking Area Identity (TAI) to transmit the NG interface paging message (such as an NG PAGING message) on one TA (Tracking Area) or multiple TAs (such as a TA List) based on a configured Registration Area of the UE, and then the RAN node select the cells configured with the corresponding TAI to transmit the RRC paging message (such as an RRC paging message) for paging the UE.

Scheme a-4

For scheme a-1 or scheme a-2, if the paging of the UE based on recommended cells fails, the CN may continue to expand the paging range. For example, the existing CN paging mechanism described in scheme a-3 may be utilized to select, based on a configured Registration Area of the UE, to transmit the NG interface paging message (such as an NG PAGING message) to RAN nodes of cells configured with a corresponding TAI on one TA or multiple TAs (such as a TA List). Then the RAN node may select the cells configured with the corresponding TAI to transmit the RRC paging message (such as an RRC PAGING message) for paging the UE.

Considering the paging schemes described above, an embodiment of the disclosure provides a selection method of a paging scheme, as shown in FIG. 5B.

In operation 5b-1, a UE may be paged based on one or more recommended SSB beams, as the method described with reference to FIG. 5A.

If it is determined that the paging fails in operation 5b-3, in operation 5b-5, a RAN node or CN may decide to page the UE based on one or more recommended cells, as described in the scheme a-1 or a-2. For example, the RAN node or CN may decide to page the UE on all SSB beams in each of the one or more recommended cells.

If it is determined that the paging fails again in operation 5b-7, in operation 5b-9, the CN may decide to page the UE in all cells on one TA or multiple TAs (such as a TA List) based on a configured Registration Area of the UE, as described in scheme a-3.

In some implementations, if it is determined that the paging based on SSB beams fails in operation 5b-3, in operation 5b-11, the CN may decide to page the UE directly in all cells on one TA or multiple TAs (such as a TA List) based on a configured Registration Area of the UE, as described in scheme a-3.

The selection method of a paging scheme according to some embodiments of the disclosure has been described above with reference to FIG. 5B. It should be noted that among the various operations described in FIG. 5B, some operations may be omitted or additional operations may be added to realize various selection methods of paging schemes.

Figure 6A:
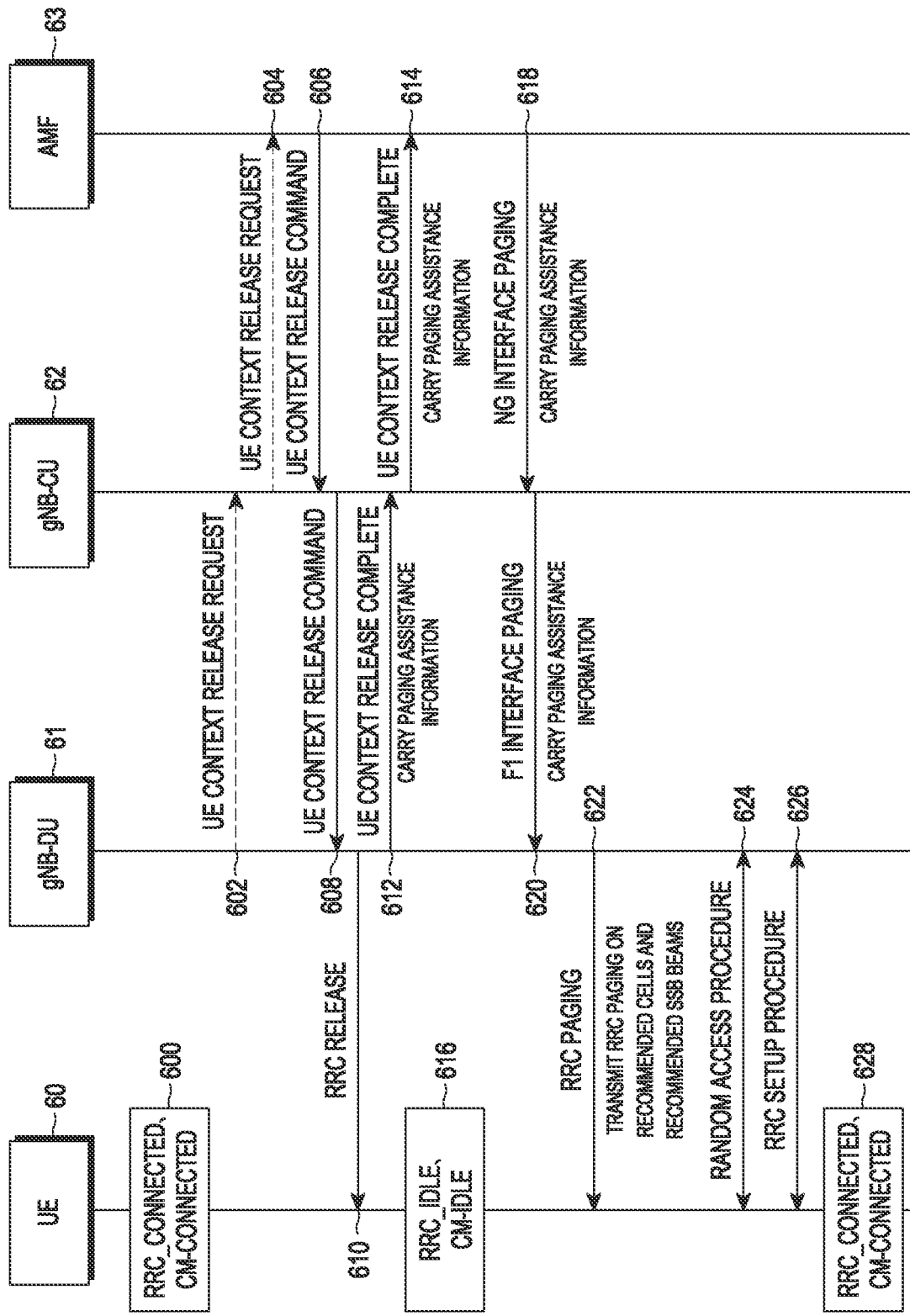
FIG. 6A illustrates a diagram of a method of paging a UE by a CN according to some embodiments of the disclosure, where the method may be applicable to an NR communication system, a CU-DU split NTN GEO satellite transparent transmission system, a GEO on-board gNB-DU satellite regenerative transmission system, or a future new next-generation communication system.
Figure 6B:
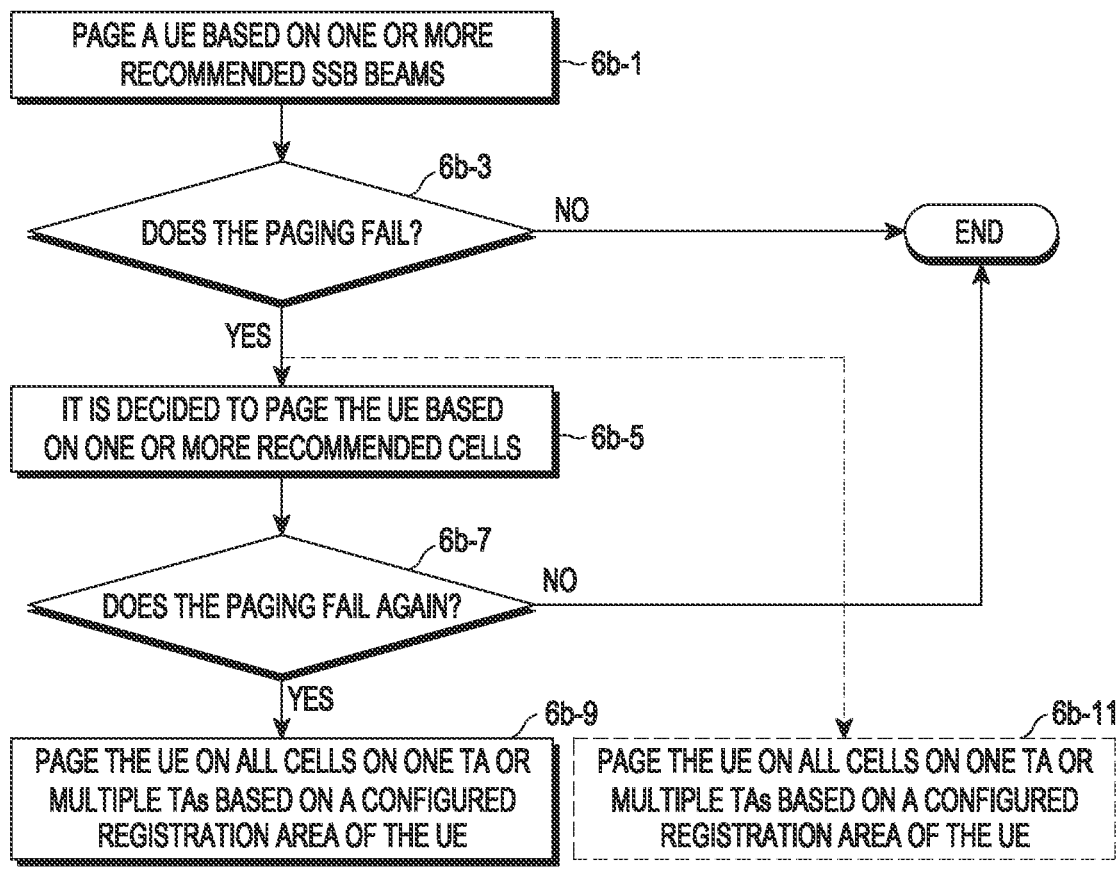
FIG. 6B illustrates a flowchart of a selection method of a paging scheme according to some embodiments of the disclosure.

FIG. 6A illustrates a diagram of a method of paging a UE by a CN according to some embodiments of the disclosure. FIG. 6B illustrates a flowchart of a selection method of a paging scheme according to some embodiments of the disclosure. The embodiments of FIGS. 6A and 6B describe flows of paging the UE initiated by the CN. For example, these embodiments may be applicable to an NR communication system, an NTN GEO satellite transparent transmission system with split CU-DU (see FIG. 2), a GEO on-board gNB-DU satellite regenerative transmission system (see FIG. 4), or a future new next-generation communication system.

It should be noted that although the embodiments related to FIGS. 6A and 6B will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

Referring to FIG. 6A, in operation 600, a UE 60 may be in a connected state after accessing a RAN. For example, the UE 60 may be in an RRC_CONNECTED state and a CM-CONNECTED state.

In an implementation, in operation 602, a UE context release request procedure may be initiated by a gNB-DU 61 through an F1 interface. Or, a gNB-CU 62 may initiate the UE context release request procedure through an NG interface in operation 604. In operation 606, in response to a UE context release request, a UE context release command procedure may be initiated by an AMF 63 through the NG interface. Accordingly, in operation 608, the UE context release command procedure may be initiated by the gNB-CU 62 through the F1 interface.

In an implementation, the UE context release command procedure may be directly triggered by the AMF 63 in operation 606 without any UE context release request. Accordingly, in operation 608, the UE context release command procedure may be initiated by the gNB-CU 62 through the F1 interface.

No matter how the UE context release procedure is triggered, for the whole UE context release procedure, operations 606, 608, 612 and 614 in FIG. 6A are necessary processes and operations 602 and 604 are possible processes.

In operation 610, after receiving a UE context release command in operation 608, the gNB-DU 61 may initiate an RRC release procedure to the UE to release radio resources of the UE 60, and at the same time release radio interface logical connections, related signaling and user plane resources of the UE 60.

After completion of the RRC release, in operation 612 the gNB-DU 61 may transmit a UE context release complete message confirming the completion of the RRC release to the gNB-CU 62. In operation 614, the gNB-CU 62 may transmit the UE context release complete message confirming the completion of the RRC release to the AMF 63. For example, the context release complete message may indicate the completion of the release of the logical connections and related resources for the UE 60 on the RAN node side.

After the completion of the RRC release, in operation 616, the UE 60 may enter an IDLE state. For example, the UE 60 may be in an RRC_IDLE state and a CM-IDLE state.

When the UE is in the idle state, if there is downlink control signaling or user data transmitted to the UE, a CN side may need to page the UE in the idle state. A possible mechanism is that information on recommended cells and RAN nodes for paging the UE is carried through the UE context release complete message over the NG interface; the information on recommended cells and RAN nodes for paging the UE includes a list of recommended cells and stay time information of each cell. The AMP may receive and store the information. When there is downlink control signaling or user data transmitted to UE, the AMF may need to page the UE. In this case, assistance information for paging the UE (e.g., assistance data for paging the UE) may be carried when transmitting an NG interface paging message; the assistance information for paging the UE includes the list of recommended cells and the stay duration of each cell. After receiving the assistance information, the gNB-CU may transmit an F1 interface paging message carrying corresponding cell ID information (such as a Paging Cell List) to the gNB-DU, and then the gNB-DU may transmit an RRC paging message in a corresponding cell to page the UE. The UE may initiate a random access procedure and an RRC setup procedure after receiving the paging message, such that the UE is resumed to the connected state for transmission and reception of signaling and user plane data.

In current 5G communication systems or future next-generation communication systems, since a large-scale antenna array may be adopted in radio frequency, beam-forming technology may be realized. For example, multiple SSBs may be configured to the same cell and mapped to different beams for transmission. SSBs of each cell may be transmitted on different beams in different time slots. When a UE is located at different positions in the cell, the UE may access the cell with beams in different directions, and access beams may change in the case of movement in the cell. When the CN pages the UE in the idle state, even though the CN side (e.g., the AMF) transmits a paging message to the gNB-CU through the NG interface, where the paging message carries ID information of one or more recommended cells for paging the UE, the gNB-DU still needs to periodically transmit paging time slots on each SSB beam of the cell by utilizing multiple beams configured by the cell. It can be understood that for a fixed-position immobile UE, the UE should always be in the coverage of a certain SSB beam in the cell. Or, even if the UE moves, it is not out of the coverage of the SSB beam, or even if the UE moves, it is in the coverage of some SSB beams, or even if the UE moves, it is in the coverage of one or more SSB beams in one or more neighboring cells. In addition, when the UE is in the connected state, the gNB-DU should know information about which SSB beam or beams of a cell the UE has stayed in and the stay durations. In some embodiments of the disclosure, when the UE enters the idle state for various reasons, the gNB-DU may report the information to the gNB-CU, and then the gNB-CU reports the information to the CN side (such as the AMF). The CN side (such as the AMF) may store the information and use it for subsequent paging of the UE. For example, the gNB-DU may report the information to the gNB-CU through the UE context release complete message over the F1 interface, and then the gNB-CU may report the information to the CN side (such as the AMF) through the UE context release complete message over the NG interface.

In some implementations, referring to FIG. 6A, the context release complete message in operation 612 may include assistance information for paging the UE (for convenience of description, it may be referred to as "information for paging" or "paging assistance information" in the disclosure), where the paging assistance information includes at least one of information related to recommended cells and information related to recommended SSB beams. For example, the paging assistance information may be transmitted by further carrying the paging assistance information in the context release complete message.

In some examples, the paging assistance information may include one or more of the following information:
- ID information of one or more cells (such as NR Cell Identity or NR CGI, E-UTRA Cell Identity or E-UTRA CGI)
- information related to time stayed in each of the one or more cells (which may be referred to as "information related to Time Stayed in Cell")
- ID information of one or more SSB beams that have been accessed in each of the one or more cells (such as SSB-Index) (which may be referred to as "ID information of SSB beams")
- information related to time stayed in each of the one or more accessed SSB beams (which may be referred to as "information related to Time Stayed in SSB Beam")

Among the example information listed above, the ID information of one or more cells and the information related to Time Stayed in Cell may be information related to the recommended cells. The ID information of SSB beams and the information related to time stayed in each of the one or more accessed SSB beams may be information related to the recommended SSB beams. Therefore, in a case where the paging assistance information includes all the above listed information, the one or more recommended cells may be determined from at least one of the ID information of one or more cells or the information related to Time Stayed in Cell in the paging assistance information, and one or more recommended SSB beams may be determined from at least one of the ID information of SSB beams or the information related to Time Stayed in SSB Beam in the paging assistance information.

In some implementations, the ID information of one or more cells in the paging assistance information may include ID information of one or more cells of the current gNB-DU (e.g., the gNB-DU 61) that have been visited by the UE. The gNB-DU 61 may store the information and transmit it to the gNB-CU 62 for mapping of ID information of cells and the ID information of SSB beams. In addition, since the gNB-CU 62 knows information related to Time Stayed in Cell, the gNB-DU 61 may not report the information to the gNB-CU 62.

In some implementations, the ID information of SSB beams in the paging assistance information may include ID information of accessed SSB beams in accessed cells of the current gNB-DU (gNB-DU 61). The gNB-DU 61 may store the information and transmit it to the gNB-CU 62.

In some implementations, the paging assistance information for paging the UE may be transmitted to the gNB-CU 62 through the UE context release complete message in operation 612. However, the embodiments of the disclosure are not limited thereto. For example, the paging assistance information may be reported to the gNB-CU 62 by a newly added F1 interface message or other F1 interface messages.

Continuing to refer to FIG. 6A, in operation 614, the gNB-CU 62 may report the paging assistance information to the AMF 63 through the UE context release complete message (CONTEXT RELEASE COMPLETE message) over the NG interface. In some implementations, the assistance information for paging the UE (for convenience of description, it may be referred to as "information for paging" or "paging assistance information" in the disclosure) may be carried in the UE context release complete message over the NG interface; the paging assistance information includes at least one of information related to recommended cells and information related to recommended SSB beams. For example, the paging assistance information may be further carried in the UE context release complete message over the NG interface to transmit the paging assistance information.

In some examples, the paging assistance information transmitted by the gNB-CU 62 to the AMF 63 may include one or more of the following information:
- ID information of one or more cells (such as NR Cell Identity or NR CGI, E-UTRA Cell Identity or E-UTRA CGI)
- information related to time stayed in each of the one or more cells (which may be referred to as "information related to Time Stayed in Cell")
- ID information of one or more SSB beams that have been accessed in each of the one or more cells (such as SSB-Index) (which may be referred to as "ID information of SSB beams")
- information related to time stayed in each of the one or more accessed SSB beams (which may be referred to as "information related to Time Stayed in SSB Beam")

In some examples, the ID information of one or more cells in the paging assistance information may include ID information on one or more cells of the gNB-DU that have been visited by the UE before the UE enters the idle state, the ID information being reported by the gNB-DU 61 to the gNB-CU 62 through the UE context release complete message in operation 612 or by utilizing other F1 interface information. Or, in a case where the current target gNB-DU is accessed due to inter-DU mobility, the paging assistance information may also include ID information of accessed source cells and/or information related to time stayed in the source cells which are reported by a source gNB-DU to the gNB-CU in an access procedure. In this case, the gNB-CU may record and store the information, and then report it to the CN. The reporting procedure of the paging assistance information involving inter-DU mobility will be described in detail later with reference to FIG. 19.

In some examples, the ID information of SSB beams in the paging assistance information may include ID information on accessed SSB beams of cells on the gNB-DU that have been visited by the UE before the UE enters the idle state, the ID information being reported by the gNB-DU 61 to the gNB-CU 62 through the UE context release complete message in operation 612 or by utilizing other F1 interface information. Or, in a case where the current target gNB-DU is accessed due to inter-DU mobility, the paging assistance information may also include ID information of accessed SSB beams in source cells reported by the source gNB-DU to the gNB-CU in an access procedure. In this case, the gNB-CU may record and store the information, and then report it to the CN. The reporting procedure of the paging assistance information involving inter-DU mobility will be described in detail later with reference to FIG. 19.

In some implementations, considering that the information related to the recommended cells for paging may be transmitted to the CN (such as the AMF) through a UE context release complete message (such as UE CONTEXT RELEASE COMPLETE message) in 5G communication systems, thus, the information related to the recommended SSB beams for paging may be transmitted to the CN (such as the AMF) by a newly added IE (Information Element) to the UE context release complete message (such as UE CONTEXT RELEASE COMPLETE message), thereby saving signaling overhead. However, the embodiments of the disclosure are not limited thereto. In some implementations, the information related to the recommended SSB beams in the paging assistance information may be transmitted from the gNB-CU 62 to the AMF 63 through a separate message. For example, the information related to the recommended SSB beams in the paging assistance information may be transmitted by a newly added NG interface message or other NG interface messages.

Continuing to refer to FIG. 6A, the AMF 63 may receive the paging assistance information (including the information related to the recommended cells and the information related to the recommended SSB beams) carried by the context release complete message from the gNB-CU 62 in operation 614. Or, the AMF 63 may obtain the paging assistance information through other new messages or through other messages to which a new IE is added, and store the information for subsequent paging of the UE.

When there is downlink signaling or user plane data to be transmitted to the UE 60, the AMF 63 on the CN side may need to page the UE 60. In this case, in operation 618, the AMF 63 may transmit the NG interface paging message to the gNB-CU 62 to page the UE 60. For example, the paging assistance information for paging the UE may be carried in the NG interface paging message, and includes at least one of the information related to the recommended cells and the information related to the recommended SSB beams.

In some examples, the paging assistance information carried in the NG interface paging message may include one or more of the following information:

ID information of one or more cells (such as NR Cell Identity or NR CGI, E-UTRA Cell Identity, or E-UTRA CGI)

information related to time stayed in each of the one or more cells (which may be referred to as "information related to Time Stayed in Cell")

ID information of one or more SSB beams that have been accessed in each of the one or more cells (such as SSB-Index) (which may be referred to as "ID information of SSB beams")

information related to time stayed in each of the one or more accessed SSB beams (which may be referred to as "information related to Time Stayed in SSB Beam")

In some examples, the ID information of one or more cells in the paging assistance information carried in the NG interface paging message may be ID information of one or more recommended cells for paging the UE received from the gNB-CU 62. For example, the information may be received from the gNB-CU 62 through the context release complete message in operation 614. Or, the information may be obtained through a new NG interface message or by a newly added IE to other NG interface messages.

In some examples, the ID information of SSB beams in the paging assistance information carried in the NG interface paging message may be ID information of one or more recommended SSB beams for paging the UE received from the gNB-CU 62. For example, the information may be received from the gNB-CU 62 through the context release complete message in operation 614. Or, the information may be obtained through a new NG interface message or by a newly added IE to other NG interface messages.

In some examples, the ID information of one or more cells in the paging assistance information carried in the NG interface paging message may include ID information on one or more cells of the current gNB-DU that have been visited by the UE before the UE enters the idle state. Or, in a case where the current target gNB-DU is accessed due to inter-DU mobility, the paging assistance information carried in the NG interface paging message may also include ID information of visited source cells and/or information related to time stayed in the source cells reported by the source gNB-DU to the gNB-CU in an access procedure.

In some examples, the ID information of SSB beams in the paging assistance information carried in the NG interface paging message may include ID information on access beams in cells of the current gNB-DU that have been visited by the UE before the UE enters the idle state. Or, in a case where the current target gNB-DU is accessed due to inter-DU mobility, the ID information of SSB beams in the paging assistance information carried in the NG interface paging message may include ID information of accessed SSB beams in source cells, the ID information being reported by the source gNB-DU to the gNB-CU in an access procedure.

Continuing to refer to FIG. 6A, in operation 620, the gNB-CU 62 may transmit, to the gNB-DU (a gNB-DU serving the UE or source gNB-DU) including the recommended cells through the F1 interface paging message, the paging assistance information including the information related to the recommended cells and the information related to the recommended SSB beams. It should be noted that although FIG. 6A shows that the gNB-CU 62 transmits the F1 interface paging message to the gNB-DU 61. However, the embodiments of the disclosure are not limited thereto. For example, the source gNB-DU paging the UE may be another gNB-DU.

In some examples, the paging assistance information carried in the F1 interface paging message may include one or more of the following information:

ID information of one or more cells (such as NR Cell Identity or NR CGI, E-UTRA Cell Identity, or E-UTRA CGI)

information related to time stayed in each of the one or more cells (which may be referred to as "information related to Time Stayed in Cell")

ID information of one or more SSB beams that have been accessed in each of the one or more cells (such as SSB-Index) (which may be referred to as "ID information of SSB beams")

information related to time stayed in each of the one or more accessed SSB beams (which may be referred to as "information related to Time Stayed in SSB Beam")

In some examples, the ID information of one or more cells in the paging assistance information carried in the F1 interface paging message may include ID information on one or more cells in the gNB-DU 61 that have been visited by the UE before the UE enters the idle state, the ID information being reported by the gNB-DU 61 to the gNB-CU 62 in operation 612. Or, in a case where the current target gNB-DU 61 is accessed due to inter-DU mobility, the ID information of one or more cells in the paging assistance information carried in the F1 interface paging message may also include ID information of visited source cells and/or information related to time stayed in the source cells reported by the source gNB-DU to the gNB-CU 62 in an access procedure.

In some examples, the ID information of SSB beams in the paging assistance information carried in the F1 interface paging message may include ID information on access beams in visited cells of the current gNB-DU before the UE enters the idle state reported by the gNB-DU 61 to the gNB-CU 62 in operation 612. Or, in a case where the current target gNB-DU is accessed due to inter-DU mobility, the ID information of SSB beams in the paging assistance information carried in the F1 interface paging message may include ID information of accessed SSB beams in source cells reported by the source gNB-DU to the gNB-CU 62 in an access procedure.

In some implementations, consider a procedure at the target gNB-DU where the current target gNB-DU is accessed due to inter-DU mobility and the UE is paged by the CN. In the access procedure, the source gNB-DU reports to the gNB-CU the ID information of visited source cells and/or the information related to time stayed in the source cells, and the ID information of accessed SSB beams in source cells and/or the information related to Time Stayed in SSB Beam, and the gNB-CU stores the information, which will be described in detail later with reference to FIG. 19. In a procedure of releasing a UE context by the current gNB-DU, the current gNB-DU reports the ID information on cells that have been visited by the UE, the ID information of SSB beams that have been visited by the UE and corresponding stay time information to the gNB-CU, the gNB-CU may combine the information reported from the source gNB-DU and the target gNB-DU and report it to the AMF through the UE context release complete message over the NG interface. Therefore, when the CN pages the UE subsequently, the paging message transmitted by the CN also carries ID information of source cells and the ID information of SSB beams. In this case, after the gNB-CU receives the paging message carrying the paging assistance information transmitted by the CN, the gNB-CU will also transmit the F1 interface paging message carrying the ID information of source cells and the ID information of SSB beams to the source gNB-DU.

In some implementations, considering that the information related to the recommended cells for paging, which includes a Paging Cell List IE, may be carried by the F1 interface paging message in 5G communication systems, information related to recommended SSB beams for paging, which includes the ID information of SSB beam and/or the information related to Time Stayed in SSB Beam, may be transmitted to the gNB-DU through the Paging Cell List IE. However, the embodiments of the disclosure are not limited thereto. In some implementations, the information related to the recommended SSB beams for paging may be transmitted to the gNB-DU 61 by a newly added IE to the F1 interface paging message.

Continuing to refer to FIG. 6A, after receiving the paging assistance information for paging the UE through the F1 interface paging message, the gNB-DU 61 may transmit the RRC paging message to the UE 60 to page the UE 60 based on the paging assistance information. In some implementations, the gNB-DU 61 may select a corresponding cell and a corresponding SSB beam based on the paging assistance information. For example, the gNB-DU 61 may determine a cell with a longer stay time and/or an SSB beam with a longer stay time from the paging assistance information, and transmit the RRC paging message on the determined cell with a longer stay time and SSB beam with a longer stay time to page the UE 60.

In an example, one or more cells with a longer stay time may be determined by comparing Time Stayed in Cell with a preset or preconfigured threshold.

In an example, one or more SSB beams with a longer stay time may be determined by comparing Time Stayed in SSB beam with a preset or preconfigured threshold.

In embodiments of the disclosure, when the CN pages the UE, by utilizing the paging assistance information, the gNB-DU may page the UE on the one or more recommended cells and one or more recommended SSB beams in each of the one or more cells based on the paging assistance information, thereby paging the UE more accurately.

Continuing to refer to FIG. 6A, when the UE 60 receives the RRC paging message, a random access procedure may be initiated in operation 624 and an RRC setup procedure may be initiated in operation 626. Through the random access procedure and RRC setup procedure, the UE 60 may resume to the connected state for transmission or reception of signaling and user plane data in operation 628.

The method of paging the UE by the CN according to some embodiments of the disclosure has been described above in conjunction with FIG. 6A. In the method of FIG. 6A, if the paging by the CN based on one or more recommended SSB beams in each recommended cell fails, the CN, gNB-CU or gNB-DU may decide to expand the paging range. In embodiments of the disclosure, the following possible schemes, including at least one of scheme b-1, scheme b-2, scheme b-3, scheme b-4 or scheme b-5, may be adopted.

Scheme b-1

Indication information (e.g., an IE including the indication information) is carried in an initial F1 interface paging message, and is used to indicate to the gNB-DU that if the first paging based on SSB beams of a cell fails, the paging range will be directly expanded. For example, the paging message may be transmitted on all SSB beams in each of the one or more recommended cells to expand the paging range.

Scheme b-2

Indication information (e.g., an IE including the indication information) is carried in an initial NG interface paging message, and is used to indicate to the gNB-CU that if the first paging based on SSB beams of a cell fails, the paging range will be directly expanded. For example, the paging message may be transmitted on all SSB beams in each of the one or more recommended cells to expand the paging range. Based on the indication information, the gNB-CU may transmit the second F1 interface paging message to the gNB-DU, where the F1 interface paging message only carries ID information of one or more recommended cells for paging the UE. The gNB-DU may transmit the paging message based on all SSB beams in each of the one or more recommended cells.

Scheme b-3

If the CN knows that the first paging based on SSB beams of a cell fails, the CN may decide to expand the paging range. For example, the CN may transmit the NG interface paging message again, where the NG interface paging message only carries the ID information of the one or more recommended cells for paging the UE. In this case, after receiving the second NG interface paging message, the gNB-CU may transmit the second F1 interface paging message to the gNB-DU, where the F1 interface paging message only carries ID information of one or more recommended cells for paging the UE. The gNB-DU may transmit the paging message based on all SSB beams in each of the one or more recommended cells.

Scheme b-4

If the CN knows that the first paging based on SSB beams of a cell fails, the CN may decide to expand the paging range. For example, the CN may utilize an existing CN paging mechanism to expand the paging range. Particularly, the CN may select a gNB-CU of cells configured with a corresponding TAI to transmit the NG interface paging message (such as an NG PAGING message) on one TA or multiple TAs (such as a TA List) based on a configured Registration Area of the UE. In a case where the gNB-CU receives the second NG interface paging message, the gNB-CU may select the cells configured with a corresponding TAI to transmit the F1 interface paging message, where the F1 interface paging message carries ID information (such as a Paging Cell List IE) of target cells for paging the UE. Then, after receiving the F1 interface paging message, the gNB-DU may transmit the RRC paging message (such as an RRC PAGING message) on all SSB beams of the target cells based on the ID information of the target cells to page the UE.

Scheme b-5

For scheme b-1, scheme b-2 or scheme b-3, if the paging of the UE based on recommended cells fails, the CN may continue to expand the paging range. For example, the existing CN paging mechanism described in scheme b-4 may be utilized to select, based on a configured Registration Area of the UE, to transmit the NG interface paging message (such as an NG PAGING message) to a gNB-CU of cells configured with a corresponding TAI on one TA or multiple TAs (TA List). In a case where the gNB-CU receives the NG interface paging message, the gNB-CU may select the cells configured with a corresponding TAI to transmit the F1 interface paging message, where the F1 interface paging message carries ID information (such as a Paging Cell List IE) of target cells for paging the UE. Then, after receiving the F1 interface paging message, the gNB-DU may transmit the RRC paging message (such as an RRC PAGING message) on all SSB beams of the target cells based on the ID information of the target cells to page the UE.

Considering the paging schemes described above, an embodiment of the disclosure provides a selection method of a paging scheme, as shown in FIG. 6B.

In operation 6b-1, a UE may be paged based on one or more recommended SSB beams, as the method described with reference to FIG. 6A.

If it is determined in operation 6b-3 that the paging fails, in operation 6b-5, the CN, gNB-CU or gNB-DU may decide to page the UE based on one or more recommended cells, as described in the scheme b-3, b-2 or b-1. For example, the CN, gNB-CU or gNB-DU may decide to page the UE on all SSB beams in each of the one or more recommended cells.

If it is determined in operation 6b-7 that the paging fails again, in operation 6b-9, the CN may decide to page the UE on all cells on one TA or multiple TAs (such as a TA List) based on a configured Registration Area of the UE, as described in scheme b-4.

In some implementations, if it is determined in operation 6b-3 that the paging based on SSB beams fails, the CN may decide in operation 6b-11 to page the UE directly on all cells on one TA or multiple TAs (such as a TA List) based on a configured Registration Area of the UE, as described in scheme b-4.

The selection method of a paging scheme according to some embodiments of the disclosure has been described above in conjunction with FIG. 6B. Among the various operations described in FIG. 6B, some operations may be omitted or additional operations may be added to realize selection of various paging schemes.

Figure 7A:
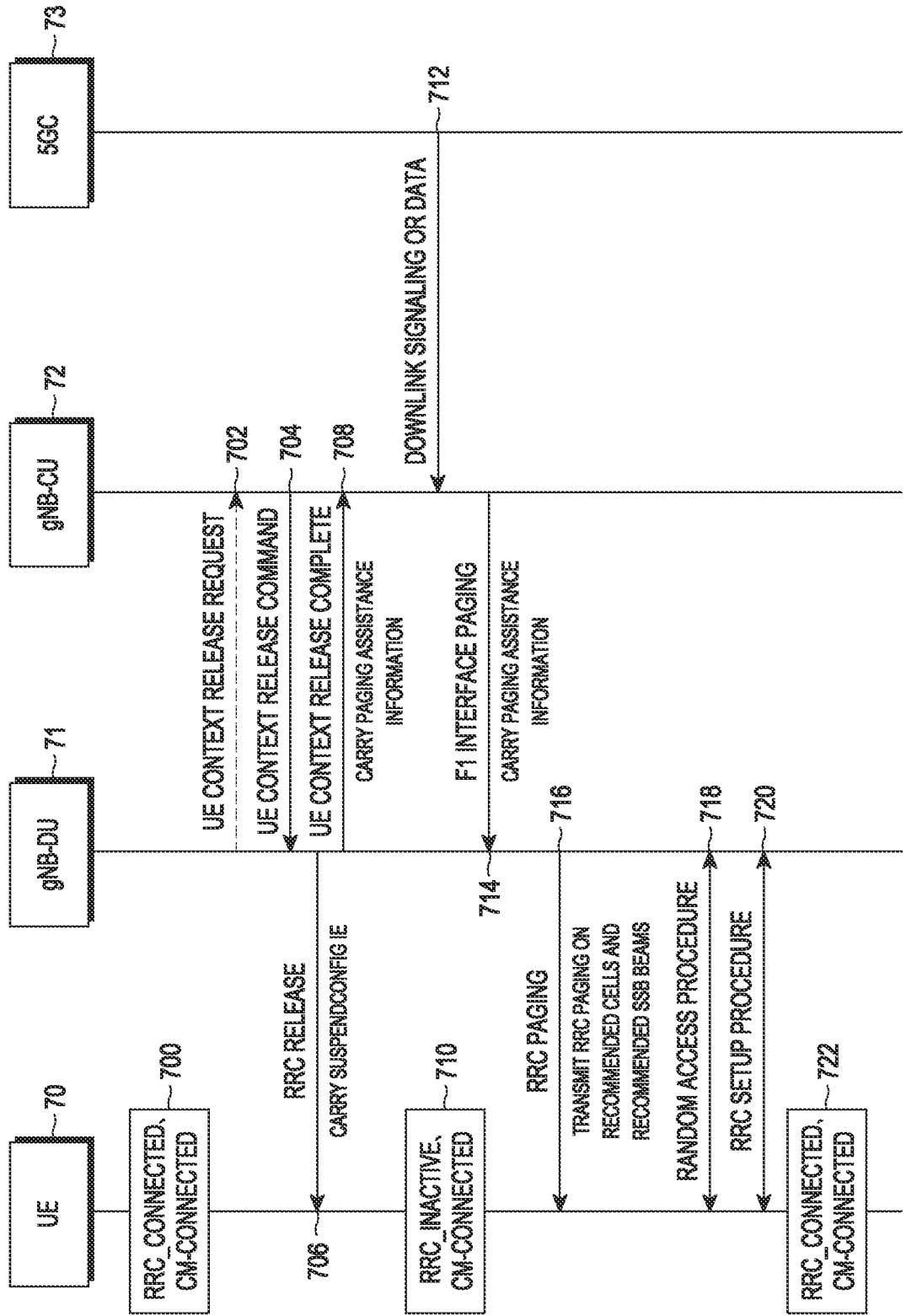
FIG. 7A illustrates a diagram of a method of paging a UE by a RAN according to some embodiments of the disclosure, where the method may be applicable to an NR communication system, a CU-DU split NTN GEO satellite transparent transmission system, a GEO on-board gNB-DU satellite regenerative transmission system, or a future new next-generation communication system.
Figure 7B:
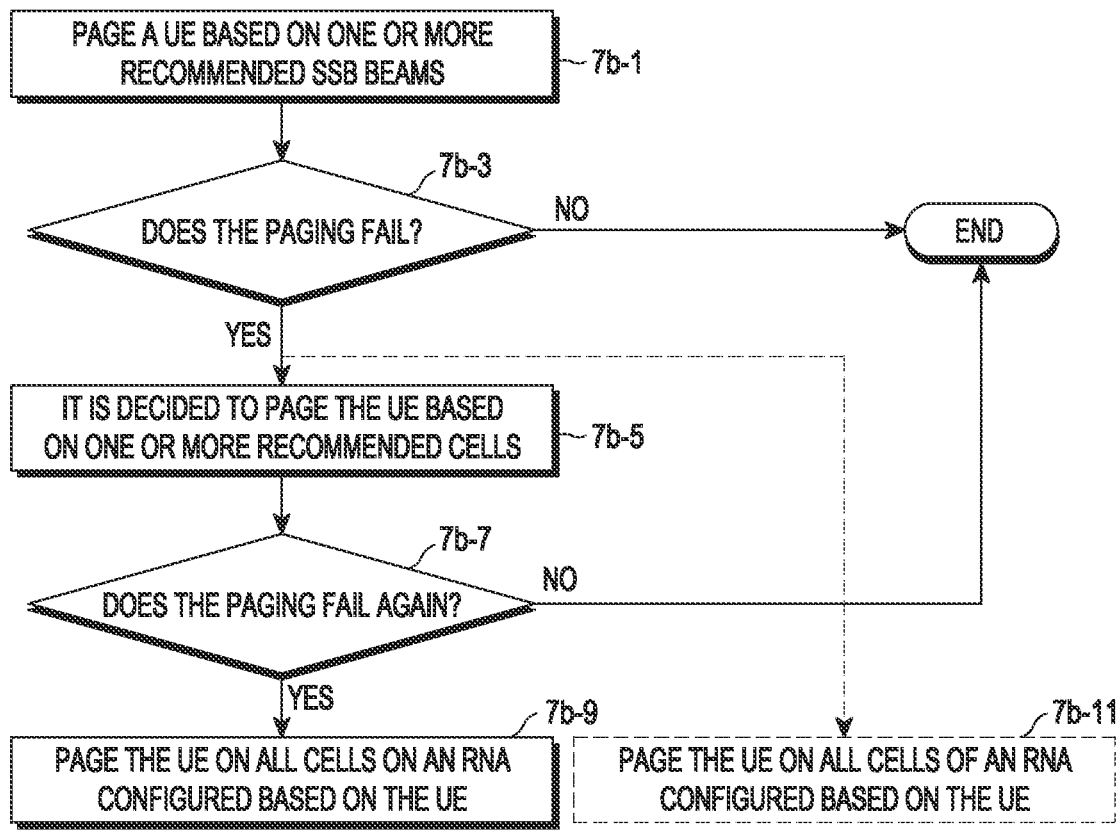
FIG. 7B illustrates a flowchart of a selection method of a paging scheme according to some embodiments of the disclosure.

FIG. 7A illustrates a diagram of a method of paging a UE by a RAN according to some embodiments of the disclosure. FIG. 7B illustrates a flowchart of a selection method of a paging scheme according to some embodiments of the disclosure. The embodiments of FIGS. 7A and 7B describe flows of paging the UE initiated by the RAN. For example, these embodiments may be applicable to a current NR communication system, a CU-DU split NTN GEO satellite transparent transmission system (see FIG. 2), a GEO on-board gNB-DU satellite regenerative transmission system (see FIG. 4), or a future new next-generation communication system.

It should be noted that although the embodiments related to FIGS. 7A and 7B will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

Referring to FIG. 7A, in operation 700, a UE 70 may be in a connected state after accessing a RAN. For example, the UE 70 may be in an RRC_CONNECTED state and a CM-CONNECTED state.

In an implementation, for various reasons, the gNB-DU 71 may initiate a UE context release request procedure through an F1 interface in operation 702. In operation 704, in response to a UE context release request, a gNB-CU 72 may initiate a UE context release command procedure through the F1 interface.

In an implementation, the gNB-CU 72 may directly initiate the UE context release command procedure through the F1 interface in operation 704 without any UE context release request.

No matter how the UE context release procedure is triggered, if the gNB-CU 72 decides that the UE 70 enters an inactive (RRC_INACTIVE) state, suspend configuration information (SuspendConfig IE) may be carried in an RRC release procedure to indicate that the UE will enter the inactive (RRC_INACTIVE) state and apply its suspend configuration information. The suspend configuration information may include information such as a configured RNA (RAN-Based Notification Area) of the UE and ID information of cells included in the RNA, and a value of a periodic RNA update timer.

In operation 706, after receiving the UE context release command, the gNB-DU 71 may initiate the RRC release procedure to the UE 70 to release radio resources between the UE 70 and the RAN.

After completion of the RRC release, in operation 708, the gNB-DU 71 may transmit a UE context release complete message confirming the completion of the RRC release to the gNB-CU 72. For example, the context release complete message may indicate the completion of the release of the logical connections and related resources for the UE 70 on the RAN side.

After the completion of the RRC release, in operation 710, the UE 70 may enter the inactive state. For example, the UE 70 may be in the RRC_INACTIVE state and a CM-CONNECTED state.

When the UE is in the inactive (RRC_INACTIVE) state, if there is downlink signaling or user plane data transmitted from a 5GC to the UE and the downlink signaling or user plane data arrives at the gNB-CU by operation 712, the gNB-CU needs to page the UE. The gNB-CU may select cells included in an RNA which is configured for the UE at a time of RRC release for paging. An Xn interface RAN PAGING message is transmitted to a neighboring gNB, if the RNA includes cells of the neighboring gNB. A current gNB-CU or neighboring gNB-CU may transmit an F1 interface paging message carrying a corresponding Paging Cell List to the gNB-DU, and then the gNB-DU transmits an RRC paging message on the corresponding cell(s) to page the UE. When the UE receives the paging message, a random access procedure and an RRC resume procedure may be initiated, so that the UE resumes to the connected state for transmission and reception of signaling and user plane data.

In current 5G communication systems or future next-generation communication systems, since a large-scale antenna array may be adopted in radio frequency, beam-forming technology may be realized. For example, multiple SSBs may be configured to the same cell and mapped to different beams for transmission. SSBs of each cell may be transmitted on different beams in different time slots. When a UE is located at different positions in the cell, the UE may access the cell with beams in different directions, and access beams may change in the case of movement in the cell. When the RAN pages the UE in the inactive (RRC_INACTIVE) state, even if, as described above, the gNB-CU pages the UE on a cell included in a configured RNA of the UE, and the gNB-CU carries a corresponding Paging Cell List when transmitting a paging message over the F1 interface to the gNB-DU, the gNB-DU still needs to periodically transmit paging time slots on each SSB beam of the cell by utilizing multiple beams configured by the cell. It can be understood that for a fixed-position immobile UE, the UE should always be in the coverage of a certain SSB beam in the cell. Or, even if the UE moves, it is not out of the coverage of the SSB beam, or even if the UE moves, it is in the coverage of some SSB beams, or even if the UE moves, it is in the coverage of one or more SSB beams in one or more neighboring cells. Furthermore, when the UE is in the connected state, the gNB-DU may know information such as which SSB beam or beams of a cell the UE has stayed in and the stay durations. In some embodiments of the disclosure, when the UE enters the inactive (RRC_INACTIVE) state for various reasons, the gNB-DU may report the information to the gNB-CU. The gNB-CU may store the information and use it for subsequent paging of the UE. For example, the gNB-DU may report the information to the gNB-CU through the UE context release complete message.

In some implementations, referring to FIG. 7A, the context release complete message in operation 708 may include assistance information for paging the UE (for convenience of description, it may be referred to as "information for paging" or "paging assistance information" in the disclosure), where the paging assistance information includes at least one of information related to recommended cells and information related to recommended SSB beams. For example, the paging assistance information may be transmitted by further carrying the paging assistance information in the context release complete message.

In some examples, the paging assistance information may include one or more of the following information:
 ID information of one or more cells (such as NR Cell Identity or NR CGI, E-UTRA Cell Identity or E-UTRA CGI)
 information related to time stayed in each of the one or more cells (which may be referred to as "information related to Time Stayed in Cell")
 ID information of one or more SSB beams that have been accessed in each of the one or more cells (such as SSB-Index) (which may be referred to as "ID information of SSB beams")
 information related to time stayed in each of the one or more accessed SSB beams (which may be referred to as "information related to Time Stayed in SSB Beam")

Among the example information listed above, the ID information of one or more cells and the information related to Time Stayed in Cell may be information related to recommended cells. The ID information of SSB beams and the information related to time stayed in each of the one or more accessed SSB beams may be information related to recommended SSB beams. Therefore, in a case where the paging assistance information includes all the above listed information, the one or more recommended cells may be determined from at least one of the ID information of one or more cells or the information related to Time Stayed in Cell in the paging assistance information, and one or more recommended SSB beams may be determined from at least one of the ID information of SSB beams or the information related to Time Stayed in SSB Beam in the paging assistance information.

In some implementations, the ID information of one or more cells in the paging assistance information may include ID information of one or more cells of the current gNB-DU (gNB-DU 71) that have been visited by the UE. The gNB-DU 71 may record or store the information and transmit it to the gNB-CU 72 for mapping of the ID information of cells and the ID information of SSB beams. In addition, since the gNB-CU 72 knows the information related to Time Stayed in Cell, the gNB-DU 71 may not report the information to the gNB-CU 72.

In some implementations, the ID information of SSB beams in the paging assistance information may include ID information of accessed SSB beams in cells of the current gNB-DU (gNB-DU 71) that have been visited by the UE. The gNB-DU 71 may store the information and transmit it to the gNB-CU 72.

In some implementations, the paging assistance information for paging the UE may be transmitted to the gNB-CU 72 through the UE context release complete message in operation 708. However, the embodiments of the disclosure are not limited thereto. For example, the paging assistance information may be reported to the gNB-CU 72 by a newly added F1 interface message or other F1 interface messages. The gNB-CU 72 may then store the information and use it for subsequent paging of the UE.

Continuing to refer to FIG. 7A, when the UE is in the inactive (RRC_INACTIVE) state, if there is downlink signaling or user plane data transmitted from a 5GC 73 to the UE 70 and the downlink signaling or user plane data arrives at the gNB-CU 72 by operation 712, the gNB-CU 72 needs to page the UE 70.

In this case, in operation 714, the gNB-CU 72 may transmit the F1 interface paging message to the gNB-DU 71 to page the UE 70. For example, the paging assistance information for paging the UE may be carried in the F1 interface paging message, and includes at least one of the information related to the recommended cells (e.g., a Paging Cell List) and the information related to the recommended SSB beams.

In some examples, the paging assistance information transmitted by the gNB-CU 72 to the gNB-DU 71 may include one or more of the following information:

ID information of one or more cells (such as NR Cell Identity or NR CGI, E-UTRA Cell Identity, or E-UTRA CGI)

information related to time stayed in each of the one or more cells (which may be referred to as "information related to Time Stayed in Cell")

ID information of one or more SSB beams that have been accessed in each of the one or more cells (such as SSB-Index) (which may be referred to as "ID information of SSB beams")

information related to time stayed in each of the one or more accessed SSB beams (which may be referred to as "information related to Time Stayed in SSB Beam")

In some examples, the ID information of one or more cells in the paging assistance information may include ID information on one or more cells of the gNB-DU having been visited by the UE before UE enters the inactive state that is reported by the gNB-DU 71 to the gNB-CU 72 through the UE context release complete message in operation 708 or by utilizing other F1 interface information.

In some examples, the ID information of SSB beams in the paging assistance information may include ID information on accessed SSB beams of cells on the gNB-DU that have been visited by the UE before UE enters the inactive state, the ID information on the accessed SSB beams being reported to the gNB-CU 72 by the gNB-DU 71 through the UE context release complete message in operation 708 or utilizing other F1 interface information.

In some implementations, consider a procedure at a target gNB-DU where the current target gNB-DU is accessed due to inter-DU mobility and the UE is paged by the RAN. In the access procedure, a source gNB-DU reports to the gNB-CU ID information of visited source cells and/or information related to time stayed in the source cells, and ID information of accessed SSB beams in the source cells and/or the information related to Time Stayed in SSB Beam, and the gNB-CU stores the information, which will be described in detail in FIG. 19. In a procedure of releasing a UE context by the current gNB-DU, the current gNB-DU reports ID information on cells that have been visited by the UE, the ID information of SSB beams that have been accessed by the UE and corresponding stay time information to the gNB-CU, the gNB-CU may combine the information reported from the source gNB-DU and the target gNB-DU and store the information for subsequent paging of the UE. Therefore, when the RAN pages the UE subsequently, the gNB-CU will also transmit the F1 interface paging message carrying ID information of source cells and the ID information of SSB beams to the source gNB-DU.

In some implementations, considering that the information related to the recommended cells for paging, including a Paging Cell List IE, may be carried by the F1 interface paging message in 5G communication systems, information related to recommended SSB beams for paging, including the ID information of SSB beams and/or the information related to Time Stayed in SSB Beam, may be transmitted to the gNB-DU through the Paging Cell List IE. However, the embodiments of the disclosure are not limited thereto. In some implementations, the information related to the recommended SSB beams for paging may be transmitted to the gNB-DU by a newly added IE to the F1 interface paging message.

Continuing to refer to FIG. 7A, after receiving the paging assistance information for paging the UE through the F1 interface paging message, the gNB-DU 71 may transmit the RRC paging message to the UE 70 based on the paging assistance information to page the UE 70. In some embodiments, the gNB-DU 71 may select a corresponding cell(s) and corresponding SSB beam(s) based on the paging assistance information. For example, the gNB-DU 71 may determine a cell with a longer stay time and an SSB beam with a longer stay time from the paging assistance information, and transmit the RRC paging message on the determined cell with a longer stay time and the SSB beam with a longer stay time to page the UE 70.

In an example, one or more cells with a longer stay time may be determined by comparing Time Stayed in Cell with a preset or preconfigured threshold.

In an example, one or more SSB beams with a longer stay time may be determined by comparing Time Stayed in SSB beam with a preset or preconfigured threshold.

In embodiments of the disclosure, when the RAN pages the UE, by utilizing the paging assistance information, the gNB-DU may page the UE on the one or more recommended cells and one or more recommended SSB beams in each of the one or more cells based on the paging assistance information, thereby paging the UE more accurately.

Continuing to refer to FIG. 7A, when the UE 70 receives the RRC paging message, a random access procedure may be initiated in operation 718 and an RRC setup procedure may be initiated in operation 720. Through the random access procedure and RRC setup procedure, the UE 70 may resume to the connected state for transmission or reception of signaling and user plane data in operation 722.

The method of paging the UE by the RAN according to some embodiments of the disclosure has been described above in conjunction with FIG. 7A. In the method of FIG. 7A, if the paging by the RAN based on one or more recommended SSB beams in each recommended cell fails, the RAN may decide to expand the paging range. In embodiments of the disclosure, the following possible schemes, including at least one of scheme c-1, scheme c-2, scheme c-3 or scheme c-4, may be adopted.

Scheme c-1

Indication information (e.g., an IE including the indication information) is carried in an initial F1 interface paging message, and is used to indicate to the gNB-DU that if the first paging based on SSB beams of a cell fails, the paging range will be directly expanded. For example, the RRC paging message may be transmitted on all SSB beams in each of the one or more recommended cells to expand the paging range.

Scheme c-2

If the gNB-CU knows that the first paging based on SSB beams of a cell fails, the gNB-CU may decide to expand the paging range. For example, the gNB-CU may transmit the F1 interface paging message again, where the F1 interface paging message only carries ID information (Paging Cell List IE) of one or more recommended cells for paging the UE. Then, after receiving the second F1 interface paging message, the gNB-DU pages the UE on all SSB beams in each of the one or more recommended cells.

Scheme c-3

If the gNB-CU knows that the first paging based on SSB beams of a cell fails, the gNB-CU may decide to expand the paging range. For example, the gNB-CU may utilize an existing paging mechanism of the RAN to expand the paging range.

For example, the gNB-CU may select to transmit an F1 interface paging message to a gNB-DU of cells configured with the same RNA, where the F1 interface paging message carries ID information (e.g., an Paging Cell List IE) of target cells for paging the UE, and then the gNB-CU selects a corresponding cell to transmit the RRC paging message (RRC PAGING message) to page the UE.

In addition, the gNB-CU may select to transmit an Xn interface paging message (Xn RAN PAGING message) to a neighboring gNB-CU of cells configured with the same RNA, and then the neighboring gNB-CU selects a gNB-DU of cells configured with the same RNA to transmit the F1 interface paging message, where the F1 interface paging message carries target cell ID information (e.g., a Paging Cell List IE) for paging the UE, and then the gNB-DU selects a corresponding cell to transmit the RRC paging message (RRC PAGING message) to page the UE. If a neighboring node of the gNB-CU is a non-split gNB, i.e., an NG-RAN node, the NG-RAN node may select cells configured with the same RNA to transmit the RRC paging messages after receiving the Xn RAN PAGING message. Scheme c-4

For scheme c-1 or scheme c-2, if the paging of the UE based on recommended cells fails, the gNB-CU may continue to expand the paging range. For example, the existing RAN paging mechanism described in scheme c-3 may be utilized to page the UE on all cells of an RNA (RAN-Based Notification Area) configured for the UE.

Considering the paging schemes described above, an embodiment of the disclosure provides a selection method of a paging scheme, as shown in FIG. 7B.

In operation 7b-1, a UE may be paged based on one or more recommended SSB beams, as the method described with reference to FIG. 7A.

If it is determined in operation 7b-3 that the paging fails, in operation 7b-5, the RAN may decide to page the UE based on one or more recommended cells, as described in the scheme c-1 or c-2. For example, the gNB-DU or gNB-CU may decide to page the UE on all SSB beams in each of the one or more recommended cells.

If it is determined in operation 7b-7 that the paging fails again, in operation 7b-9, the gNB-CU may decide to page the UE on all cells of an RNA configured for the UE, as described in scheme c-3.

In some embodiments, if it is determined in operation 7b-3 that the paging based on SSB beams fails, the gNB-CU may decide in operation 7b-11 to directly page the UE on all cells of the RNA configured for the UE, as described in scheme c-3.

The selection method of a paging scheme according to some embodiments of the disclosure has been described above in conjunction with FIG. 7B. Among the various operations described in FIG. 7B, some operations may be omitted or additional operations may be added to realize various selection methods of paging schemes.

Figure 8A:
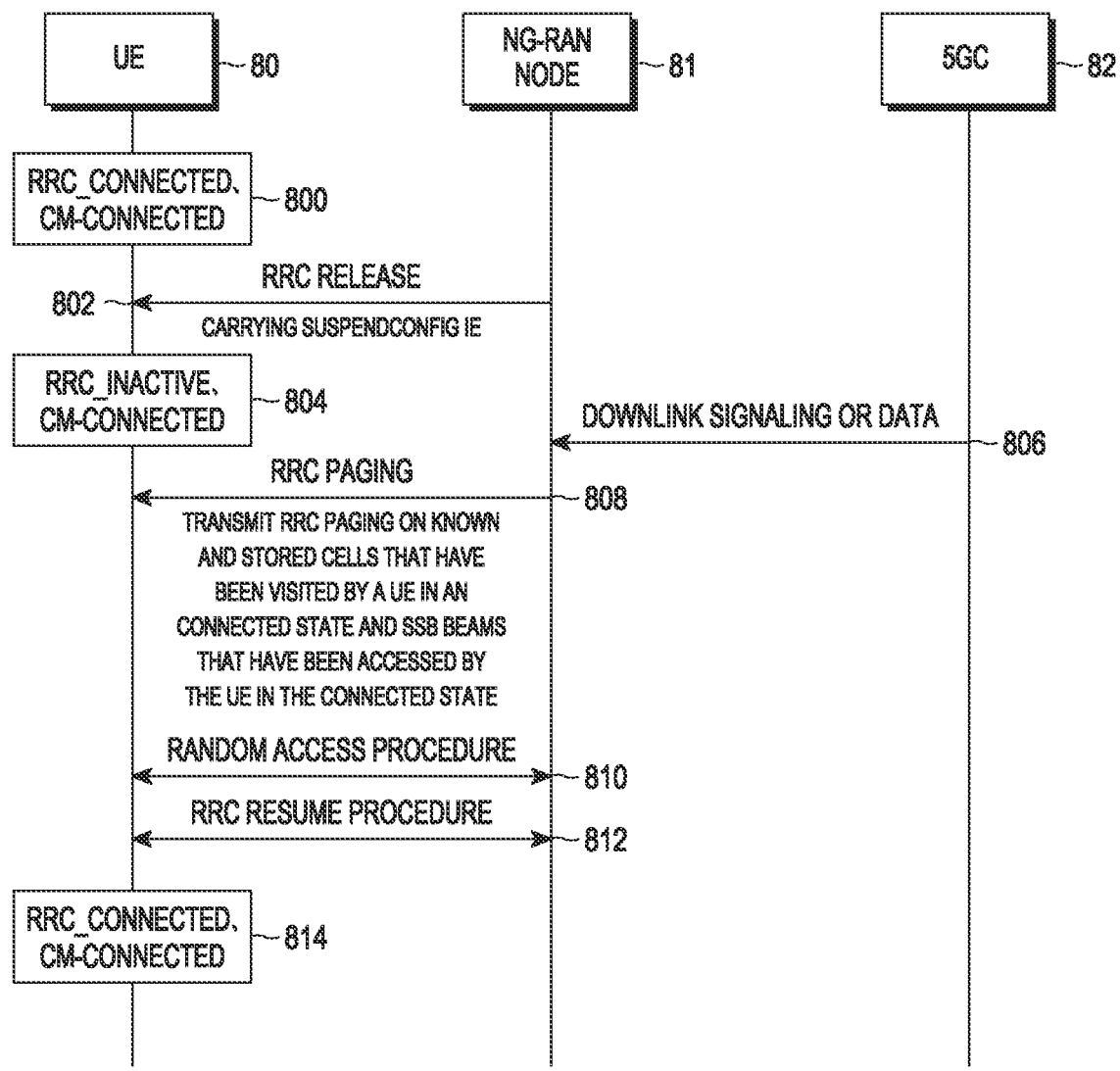
FIG. 8A illustrates a diagram of a method of paging a UE by a RAN according to some embodiments of the disclosure, where the method may be applicable to an NR communication system, an NTN GEO satellite transparent transmission system, a GEO on-board gNB satellite regenerative transmission system, or a future new next-generation communication system.
Figure 8B:
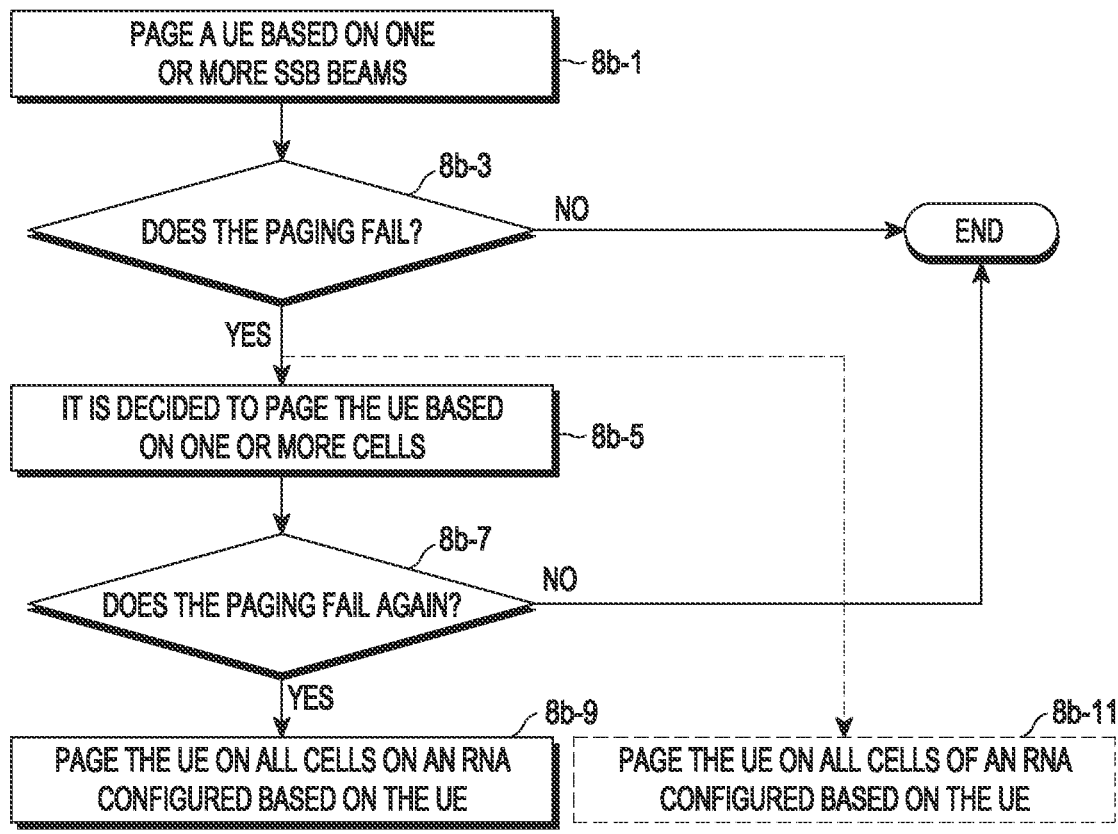
FIG. 8B illustrates a flowchart of a selection method of a paging scheme according to some embodiments of the disclosure.

FIG. 8A illustrates a diagram of a message flow method of paging a UE by a RAN according to some embodiments of the disclosure. FIG. 8B illustrates a flowchart of a selection method of a paging scheme according to some embodiments of the disclosure. The embodiments of FIGS. 8A and 8B describe flows of paging the UE initiated by the RAN. For example, these embodiments may be applicable to a current NR communication system, an NTN GEO satellite transparent transmission system (see FIG. 1), a GEO on-board gNB satellite regenerative transmission system (see FIG. 3), or a future new next-generation communication system.

The embodiments of the disclosure take current 5G NR (New Radio) communication systems and 5G communication systems with an NTN (Non-terrestrial networks) architecture as examples, but they cannot limit the applicable scope of the disclosure, the principles of the disclosure may be implemented in any appropriately arranged system or equipment, and also be applicable to next-generation or future new mobile communication systems. Even through names of network elements may change, the principle of their application is similar or the same as that of the disclosure, which is within the protection scope of the disclosure.

In the embodiments described with reference to FIGS. 8A and 8B, interaction of new information may not be involved, but the behavior description of an NG-RAN node with respect to the paging by the RAN may be defined. Therefore, these embodiments may be particularly applicable to the following situations: for a fixed-position immobile UE, it should always be in the coverage of a certain SSB beam in a cell; even if the UE moves, it is not out of the coverage of the SSB beam; or even if the UE moves, it is in the coverage of certain SSB beams, or even if the UE moves, it is in the coverage of one or more SSB beams in one or more neighboring cells.

Referring to FIG. 8A, in operation 800, a UE 80 may be in a connected state after accessing an NG-RAN node 81. For example, the UE 80 may be in an RRC_CONNECTED state and a CM-CONNECTED state.

For various reasons, if the NG-RAN node 81 decides that the UE 80 enters an inactive (such as RRC_INACTIVE) state, suspend configuration information (such as Suspend-Config IE) may be carried in an RRC release procedure of operation 802 to indicate that the UE will enter the inactive (such as RRC_INACTIVE) state and apply its suspend configuration information. The suspend configuration information may include information such as a configured RNA (such as RAN-Based Notification Area) of the UE, ID information of cells included in the RNA, and a value of a periodic RNA update timer.

After completion of the RRC release, in operation 804, the UE 80 may enter the inactive state. For example, the UE 80 may be in the RRC_INACTIVE state and a CM-CONNECTED state.

When the UE is in the inactive (such as RRC_INACTIVE) state, if there is downlink signaling or user plane data transmitted from a 5GC to the UE and the downlink signaling or user plane data arrives at the NG-RAN node 81 by operation 806, the NG-RAN node 81 needs to page the UE. The NG-RAN node 81 may select cells included in an RNA which is configured for the UE at a time of RRC release. An Xn interface RAN PAGING message is transmitted to a neighboring NG-RAN node, if the RNA includes cells of the neighboring gNB. A current NG-RAN node or neighboring NG-RAN node may select to transmit an RRC paging message on the corresponding cell(s) to page the UE. When the UE receives a paging message, a random access procedure and an RRC resume procedure may be initiated, so that the UE resumes to the connected state for transmission and reception of signaling and user plane data.

In current 5G communication systems or future next-generation communication systems, since a large-scale antenna array may be adopted in radio frequency, beam-forming technology may be realized. For example, multiple SSBs may be configured to the same cell and mapped to different beams for transmission. SSBs of each cell may be transmitted on different beams in different time slots. When a UE is located at different positions in the cell, the UE may access the cell with beams in different directions, and access beams may change in the case of movement in the cell. When a RAN pages the UE in the inactive (such as RRC_I-NACTIVE) state, even if, as described above, an NG-RAN node pages the UE on a cell included in an RNA configured for the UE and selects to transmit the RRC paging message on the corresponding cell(s) to page the UE, the NG-RAN node still needs to utilize multiple beams configured for each cell to periodically transmit paging time slots on each SSB beam of the cell. It can be understood that for a fixed-position immobile UE, the UE should always be in the coverage of a certain SSB beam in the cell. Or, even if the UE moves, it is not out of the coverage of the SSB beam, or even if the UE moves, it is in the coverage of some SSB beams, or even if the UE moves, it is in the coverage of one or more SSB beams in one or more neighboring cells. Furthermore, when the UE is in the connected state, the NG-RAN node may know ID information of cells where the UE has stayed, ID information of corresponding SSB beams, and corresponding stay time information, including: ID information of visited cells and SSB beams in the current NG-RAN node and stay time information; or ID information of source cells of a source NG-RAN node from which UE accesses the current NG-RAN node due to handover, ID information of SSB beams that have been accessed by the UE and stay time information that are stored by the NG-RAN node, which will be described in detail with reference to FIGS. 17 and 18. In some embodiments of the disclosure, the NG-RAN node may directly select the known or stored visited cell(s) and accessed SSB beams in the corresponding cell to transmit the RRC paging message.

In some embodiments, when the UE enters the INACTIVE state, the NG-RAN node may store the information (including: the ID information of visited cells and SSB beams in the current NG-RAN node and the stay time information; or the ID information of source cells of a source NG-RAN node from which UE accesses the current NG-RAN node due to handover, the ID information of SSB beams that have been accessed by the UE and the stay time information stored by the NG-RAN node) as paging assistance information, and use it for subsequent paging of the UE.

Continuing to refer to FIG. 8A, in operation 808, the NG-RAN node 81 may transmit the RRC paging message to the UE 80 based on the paging assistance information to page the UE 80. For example, the paging assistance information may include ID information of one or more recommended cells and/or ID information of one or more recommended SSB beams known or stored by the NG-RAN node 81.

In some embodiments, the NG-RAN node 81 may select a corresponding cell(s) and corresponding SSB beam(s) based on the paging assistance information. For example, the NG-RAN node 81 may determine a cell with a longer stay time and an SSB beam with a longer stay time from the paging assistance information, and transmit the RRC paging message on the determined cell with a longer stay time and SSB beam with a longer stay time to page the UE 80.

In an example, one or more cells with a longer stay time may be determined by comparing Time Stayed in Cell with a preset or preconfigured threshold.

In an example, one or more SSB beams with a longer stay time may be determined by comparing Time Stayed in SSB beam with a preset or preconfigured threshold.

In some implementations, an Xn RAN PAGING message carrying the ID information of source cells and the ID information of SSB beams that have been accessed by the UE may be transmitted to the source NG-RAN node for paging the UE. The source NG-RAN node then transmits the RRC paging message on the source cells and corresponding SSB beams. In a case where the source NG-RAN node may be a split gNB, the gNB-CU may need to transmit F1 interface paging message to the corresponding gNB-DU and carry the ID information of source cells and the ID information of SSB beams that have been accessed by the UE, and then the gNB-DU may transmit the RRC paging message on the source cells and the corresponding SSB beams.

In embodiments of the disclosure, when the RAN pages the UE, by utilizing the paging assistance information, the RAN may page the UE on the one or more recommended cells and one or more recommended SSB beams in each of the one or more cells based on the paging assistance information, thereby paging the UE more accurately.

Continuing to refer to FIG. 8A, when the UE 80 receives the RRC paging message, a random access procedure may be initiated in operation 810 and an RRC setup procedure may be initiated in operation 812. Through the random access procedure and RRC setup procedure, the UE 80 may resume to the connected state for transmission or reception of signaling and user plane data in operation 814.

The method of paging the UE by the RAN according to some embodiments of the disclosure has been described above in conjunction with FIG. 8A. In the method of FIG. 8A, if the paging by the RAN based on one or more SSB beams in a cell fails, the RAN may decide to expand the paging range. In embodiments of the disclosure, the following possible schemes, including at least one of scheme d-1 or scheme d-2, may be adopted.

Scheme d-1

The RAN may transmit the RRC paging message again, and page the UE on all SSB beams in each cell visited by the UE which are stored before.

Scheme d-2

For scheme d-1, if the paging based on cells fails, the RAN will continue to expand the paging range. For example, the RAN may utilize an existing RAN paging mechanism to expand the paging range.

For example, based on an RNA (RAN-Based Notification Area) configured for the UE, the RAN may select cells configured with the same RNA to transmit the RRC paging message.

For example, if there are cells of a neighboring NG-RAN node configured in the same RNA, it may be necessary to transmit the Xn RAN PAGING message to a neighboring NG-RAN node, and then the neighboring NG-RAN node continues to initiate RRC paging on the corresponding cell(s).

Considering the paging schemes described above, an embodiment of the disclosure provides a selection method of a paging scheme, as shown in FIG. 8B.

In operation 8b-1, a UE may be paged based on one or more SSB beams, as the method described with reference to FIG. 8A.

If it is determined in operation 8b-3 that the paging fails, in operation 8b-5, the RAN may decide to page the UE based on one or more cells, as described in scheme d-1.

If it is determined in operation 8b-7 that the paging fails again, in operation 8b-9, the RAN node may decide to page the UE on all cells of an RNA configured for the UE, as described in scheme d-2.

In some implementations, if it is determined in operation 8b-3 that the paging based on SSB beams fails, the RAN node may decide to directly page the UE on all cells of an RNA configured for the UE in operation 8b-11, as described in scheme d-2.

The selection method of a paging scheme according to some embodiments of the disclosure has been described above in conjunction with FIG. 8B. Among the various operations described in FIG. 8B, some operations may be omitted or additional operations may be added to realize various selection methods of paging schemes.

Figure 9A:
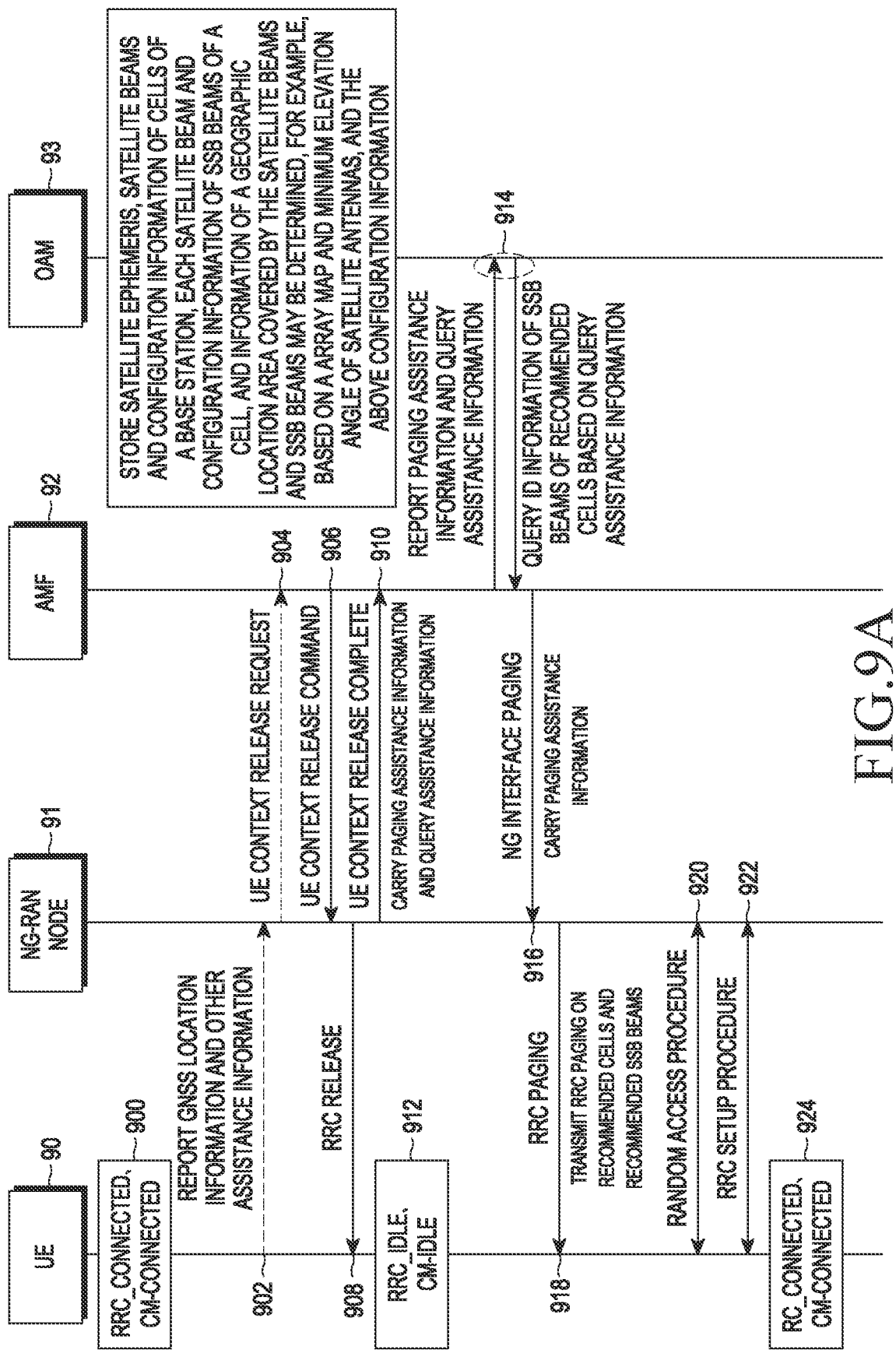
FIG. 9A illustrates a diagram of a method of paging a UE by a CN based on a UE location (where an AMF interacts with an OAM) according to some embodiments of the disclosure, where the method may be applicable to an NR communication system, an NTN GEO satellite transparent transmission system, a GEO on-board gNB satellite regenerative transmission system, or a future new next-generation communication system.
Figure 9B:
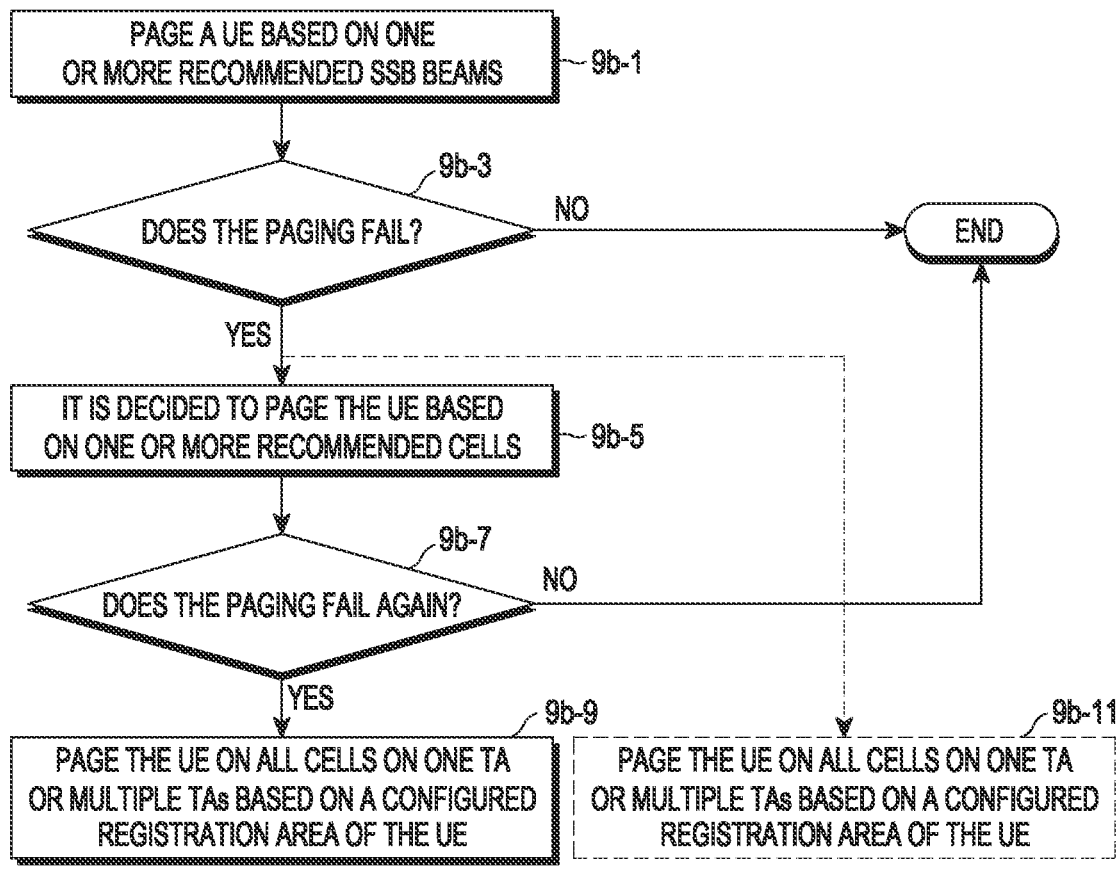
FIG. 9B illustrates a flowchart of a selection method of a paging scheme according to some embodiments of the disclosure.

FIG. 9A illustrates a diagram of a method of paging a UE by a CN based on a UE location (where an AMF interacts with an OAM) according to some embodiments of the disclosure. FIG. 9B illustrates a flowchart of a selection method of a paging scheme according to some embodiments of the disclosure. The embodiments of FIGS. 9A and 9B describe flows of paging the UE initiated by the CN based on the UE location. For example, these embodiments may be applicable to a current NR communication system, an NTN GEO satellite transparent transmission system (see FIG. 1), a GEO on-board gNB satellite regenerative transmission system (see FIG. 3), or a future new next-generation communication system.

In some embodiments, the AMF may be responsible for interacting with a local or remote OAM with respect to assistance information for paging the UE reported by a NG-RAN node, to acquire ID information of SSB beams of a cell for paging the UE; and then initiate a CN paging procedure, and transmit ID information of recommended cells and corresponding SSB beams for paging the UE to the NG-RAN node through a NG PAGING message, and then the NG-RAN node performs RRC paging on the corresponding cell(s) and SSB beam(s).

It should be noted that although the following embodiments will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, the UE itself has a positioning capability (e.g., a GNSS positioning capability) and a capability to monitor other assistance information (such as a UE type related to a motion capability of the UE, a motion direction or a motion speed of the UE). In this case, the UE may obtain location information (e.g., GNSS location (or position) information) and the other assistance information (such as the UE type related to the motion capability, the motion direction and the motion speed) of the UE, and may report the GNSS location information and the other assistance information to the NG-RAN node through a new RRC message or an existing RRC message carrying a new IE in a connected state. A flow of UE reporting will be described in detail with reference to FIGS. 20 and 21.

In embodiments of the disclosure, the GNSS location information may refer to location information of the UE obtained through GNSS, including, for example, geographic location information (such as a longitude, a latitude, or an altitude).

It should be noted that although GNSS location information is used for description in some implementations, the implementations of the disclosure are not limited to this, for example, any other suitable location information may be adopted to implement various implementations.

In embodiments of the disclosure, the UE type related to the motion capability may include a static UE (e.g., some of the IoT UEs described above), a low mobility UE (e.g., a handheld terminal), and a high mobility UE (e.g., a vehicle-mounted terminal, a ship-borne terminal, or an airborne terminal).

In some implementations, if the UE does not have the GNSS positioning capability, the NG-RAN node can acquire the GNSS position (or location) information and the other assistance information (such as the UE type related to the motion capability, the motion direction or the motion speed of the UE) when the UE is in a connected state through a positioning mechanism implemented by 3GPP.

In embodiments of the disclosure, for convenience of description, the GNSS location information or the other assistance information (such as the UE type related to the motion capability, the motion direction or the motion speed of the UE) may be referred to as query assistance information.

It should be noted that the reporting procedure (procedure 902) of the GNSS position (or location) information and the other assistance information of the UE in FIG. 9A is an optional procedure, which is suitable for the UE having the GNSS positioning capability to report them to the NG-RAN node. No matter which mechanism is adopted, it may be assumed that the NG-RAN node already knows the GNSS location information and the other assistance information of the UE (such as the UE type related to the motion capability, the motion direction or the motion speed of the UE) before the UE enters an idle state.

Referring to FIG. 9A, in operation 900, the UE may be in a CONNECTED state after accessing a NG-RAN node 91. For example, the UE may be in an RRC_CONNECTED state and a CM-CONNECTED state.

In operation 904, a UE context release request procedure may be initiated by the NG-RAN node. For example, the UE context release request procedure may be initiated by the NG-RAN node for various reasons. In operation 904, in response to a UE context release request from the NG-RAN node, an AMF 92 on a CN side transmits a UE context release command to the NG-RAN node 91. Or, the procedure of the UE context release command may be directly initiated by the AMF 92 on the CN side for various reasons.

In operation 906, after receiving the UE context release command, the NG-RAN node 91 may initiate an RRC release procedure to the UE 90 to release radio resources of the UE 90, and at the same time release radio interface logical connections, related signaling and user plane resources of the UE 90.

After completion of the RRC release, in operation 908, the NG-RAN node 91 may transmit a UE context release complete message confirming the completion of the RRC release to the AMF 92. For example, the context release complete message may indicate the completion of the release of the logical connections and related resources for the UE 90 on the NG-RAN node side.

After the completion of the RRC release, in operation 912, the UE may enter an idle state. For example, the UE may be in an RRC_IDLE state and a CM-IDLE state.

In some implementations, the UE context release complete message in operation 910 may include assistance information for paging the UE (for convenience of description, it may be referred to as "information for paging" or "paging assistance information" in the disclosure) and query assistance information. The paging assistance information may include information related to recommended cells. The query assistance information may include information related to a GNSS position of the UE or other assistance information (such as a UE type related to a motion capability, a motion direction or a motion speed of the UE).

In some examples, the paging assistance information may include one or more of the following information:
ID information of one or more cells (such as NR Cell Identity or NR CGI, E-UTRA Cell Identity, or E-UTRA CGI)
information related to time stayed in each of the one or more cells (which may be referred to as "information related to Time Stayed in Cell")

In some examples, the query assistance information may include one or more of the following information:
GNSS location information of the UE (information such as a longitude, a latitude, or an altitude)
other query assistance information (such as the UE type related to the motion capability, the motion direction or the motion speed of the UE)
time stamp information In some examples, the ID information of one or more cells in the paging assistance information may include ID information of one or more cells of the current NG-RAN node that have been visited by the UE.

In some examples, the time stamp information may be used to indicate a time point when the UE is in a corresponding GNSS position and a corresponding state of the query assistance information. For example, the time stamp information may be information in a UTC format.

In some implementations, considering that the information related to the recommended cells for paging may be transmitted to a CN (such as an AMF) through a UE context release complete message (such as UE CONTEXT RELEASE COMPLETE message) in 5G communication systems, thus, the query assistance information may be transmitted to the CN (such as the AMF) by a newly added IE to the UE context release complete message (such as UE CONTEXT RELEASE COMPLETE message), thereby saving signaling overhead. However, the embodiments of the disclosure are not limited thereto. In some implementations, the query assistance information may be transmitted from the NG-RAN node 91 to the AMF 92 through a separate message. For example, the query assistance information may be transmitted by a newly added NG interface message or other NG interface messages.

Continuing to refer to FIG. 9A, the AMF 92 may receive the paging assistance information (including the information related to the recommended cells) and the query assistance information (including the information related to the GNSS position of the UE or the other assistance information (such as the UE type related to the motion capability, the motion direction or the motion speed of the UE) carried by the context release complete message from the NG-RAN node 91 in operation 910. Or, the AMF 92 may obtain the paging assistance information and/or the query assistance information through other new messages or through other messages to which a new IE is added, and store the information for subsequent paging of the UE.

When the UE 90 is in the idle state (operation 912), if there is downlink signaling or user plane data to be transmitted to the UE 90, the AMF 92 on the CN side may need to page the UE 90.

Referring to FIG. 9A, before initiating NG paging, in operation 914, the AMF 92 may interact with an OAM 93.

In some implementations, the OAM 93 may be a local OAM or a remote OAM. For example, the OAM 93 may store various configuration information, such as satellite ephemeris, information on mapping of satellite beams to a configuration of cells of a base station, and/or information on mapping of each satellite beam to a configuration of SSB beams of a cell, among others. For example, information on a geographic location area covered by the satellite beams and SSB beams of each cell may be calculated based on a preconfigured or preset array map and minimum elevation angle of satellite antennas, and the above stored configuration information.

For a present NR network, the OAM 93 configures a mapping relationship between NR antenna arrays and base stations and cells of NR, and stores a geographic position, an azimuth and inclination angle of each NR antenna array, and information on mapping of a configuration of SSB beams of a cell to a geographic position, an azimuth and an inclination angle of each NR antenna array. Based on the above information, a coverage of SSB beams in each cell can be calculated.

In operation 914, the AMF 92 may report the paging assistance information (including the information related to the recommended cells) and the query assistance information (including the information related to the GNSS position of the UE or the other assistance information (such as the UE type related to the motion capability, the motion direction or the motion speed of the UE)) to the OAM 93, and can query ID information of SSB beams of recommended cells for paging the UE at the current time from the OAM 93 based on the query assistance information.

In operation 916, the AMF 92 may transmit an NG interface paging message to the NG-RAN node 91 to page the UE 90. For example, paging assistance information for paging the UE may be carried in the NG interface paging message, and includes at least one of information related to the recommended cells and information related to the recommended SSB beams.

In some examples, the paging assistance information carried in the NG interface paging message may include one or more of the following information:
ID information of one or more cells (such as NR Cell Identity or NR CGI, E-UTRA Cell Identity, or E-UTRA CGI)
information related to time stayed in each of the one or more cells (which may be referred to as "information related to Time Stayed in Cell")
ID information of one or more SSB beams in each of the one or more cells (such as SSB-Index) (which may be referred to as "ID information of SSB beams")

In some examples, the ID information of one or more cells in the paging assistance information carried in the NG interface paging message may be ID information of one or more recommended cells for paging the UE that is received from the NG-RAN node 91 by the AMF 92. For example, the information may be received from the NG-RAN node 91 through the context release complete message. Or, the information may be obtained through a new NG interface message or by a newly added IE to other NG interface messages.

In some examples, the ID information of one or more cells in the paging assistance information carried in the NG interface paging message may include ID information of one or more cells of the NG-RAN node 91 that have been visited by the UE before the UE enters the idle state.

Continuing to refer to FIG. 9A, in operation 918, after receiving the paging assistance information for paging the UE 50, the NG-RAN node 91 may transmit the RRC paging message to the UE 90 based on the paging assistance information to page the UE 90. In some implementations, the NG-RAN node 91 may select a corresponding cell(s) and corresponding SSB beam(s) based on the paging assistance information. For example, the NG-RAN node 91 may determine a cell with a longer stay time from the paging assistance information, and transmit the RRC paging message on the determined cell with a longer stay time to page the UE 90.

In an example, one or more cells with a longer stay time may be determined by comparing Time Stayed in Cell with a preset or preconfigured threshold.

In embodiments of the disclosure, when the CN pages the UE, by utilizing the paging assistance information, the NG-RAN node may page the UE on the one or more recommended cells and one or more recommended SSB beams in each of the one or more cells based on the paging assistance information, thereby paging the UE more accurately.

Continuing to refer to FIG. 9A, when the UE 90 receives the RRC paging message, a random access procedure may be initiated in operation 920 and an RRC setup procedure may be initiated in operation 922. Through the random access procedure and RRC setup procedure, the UE 90 may resume to the connected state for transmission or reception of signaling and user plane data in operation 924.

The method of paging the UE by the CN according to some embodiments of the disclosure has been described above in conjunction with FIG. 9A. In the method of FIG. 9A, if the paging by the NG-RAN node based on one or more recommended SSB beams in each recommended cell fails, the CN or NG-RAN node may expand the paging range. In embodiments of the disclosure, the following possible schemes, including at least one of scheme e-1, scheme e-2, scheme e-3 or scheme e-4, may be adopted.

Scheme e-1

Indication information (e.g., an IE including the indication information) is carried in an initial NG interface paging message, and is used to indicate to the NG-RAN node that if the first paging based on SSB beams of a cell fails, the paging range will be directly expanded. For example, the RRC paging message may be transmitted on all SSB beams in each of the one or more recommended cells to expand the paging range.

Scheme e-2

If the CN knows that the first paging based on SSB beams of a cell fails, the CN may decide to expand the paging range. For example, the CN may transmit the NG interface paging message again, where the NG interface paging message only carries the ID information of the one or more recommended cells for paging the UE. The NG-RAN node, after receiving the second NG interface paging message, pages the UE on all SSB beams in each of the one or more recommended cells.

Scheme e-3

If the CN knows that the first paging based on SSB beams of a cell fails, the CN may decide to expand the paging range. For example, the CN may utilize an existing CN paging mechanism to expand the paging range. Particularly, the CN may select an NG-RAN node of cells configured with a corresponding TAI to transmit the NG interface paging message (such as an NG PAGING message) on one TA or multiple TAs (such as a TA List) based on a configured Registration Area of the UE, and then the NG-RAN node selects cells configured with the corresponding TAI to transmit the RRC paging message (such as an RRC PAGING message) to page the UE.

Scheme e-4

For scheme e-1 or scheme e-2, if the paging of the UE based on recommended cells fails, the CN may continue to expand the paging range. For example, the existing CN paging mechanism described in scheme e-3 may be utilized to select to transmit the NG interface paging message (such as an NG PAGING message) to an NG-RAN node of cells configured with a corresponding TAI on one TA or multiple TAs (TA List) based on a configured Registration Area of the UE, and then the NG-RAN node may select cells configured with the corresponding TAI to transmit the RRC paging message (such as an RRC PAGING message) to page the UE.

Considering the paging schemes described above, an embodiment of the disclosure provides a selection method of a paging scheme, as shown in FIG. 9B.

In operation 9b-1, a UE may be paged based on one or more recommended SSB beams, as the method described with reference to FIG. 9A.

If it is determined in operation 9b-3 that the paging fails, in operation 9b-5, the NG-RAN node or CN may decide to page the UE based on one or more recommended cells, as described in the scheme e-1 or e-2. For example, the NG-RAN node or CN may decide to page the UE on all SSB beams in each of the one or more recommended cells.

If it is determined in operation 9b-7 that the paging fails again, in operation 9b-9, the CN may decide to page the UE on all cells on one TA or multiple TAs (such as a TA List) based on a configured Registration Area of the UE, as described in scheme e-3.

In some implementations, if it is determined in operation 9b-3 that the paging based on SSB beams fails, the CN may decide in operation 9b-11 to page the UE directly on all cells on one TA or multiple TAs (such as a TA List) based on a configured Registration Area of the UE, as described in scheme e-3.

The selection method of a paging scheme according to some embodiments of the disclosure has been described above in conjunction with FIG. 9B. Among the various operations described in FIG. 9B, some operations may be omitted or additional operations may be added to realize various selection methods of paging schemes.

Figure 10A:
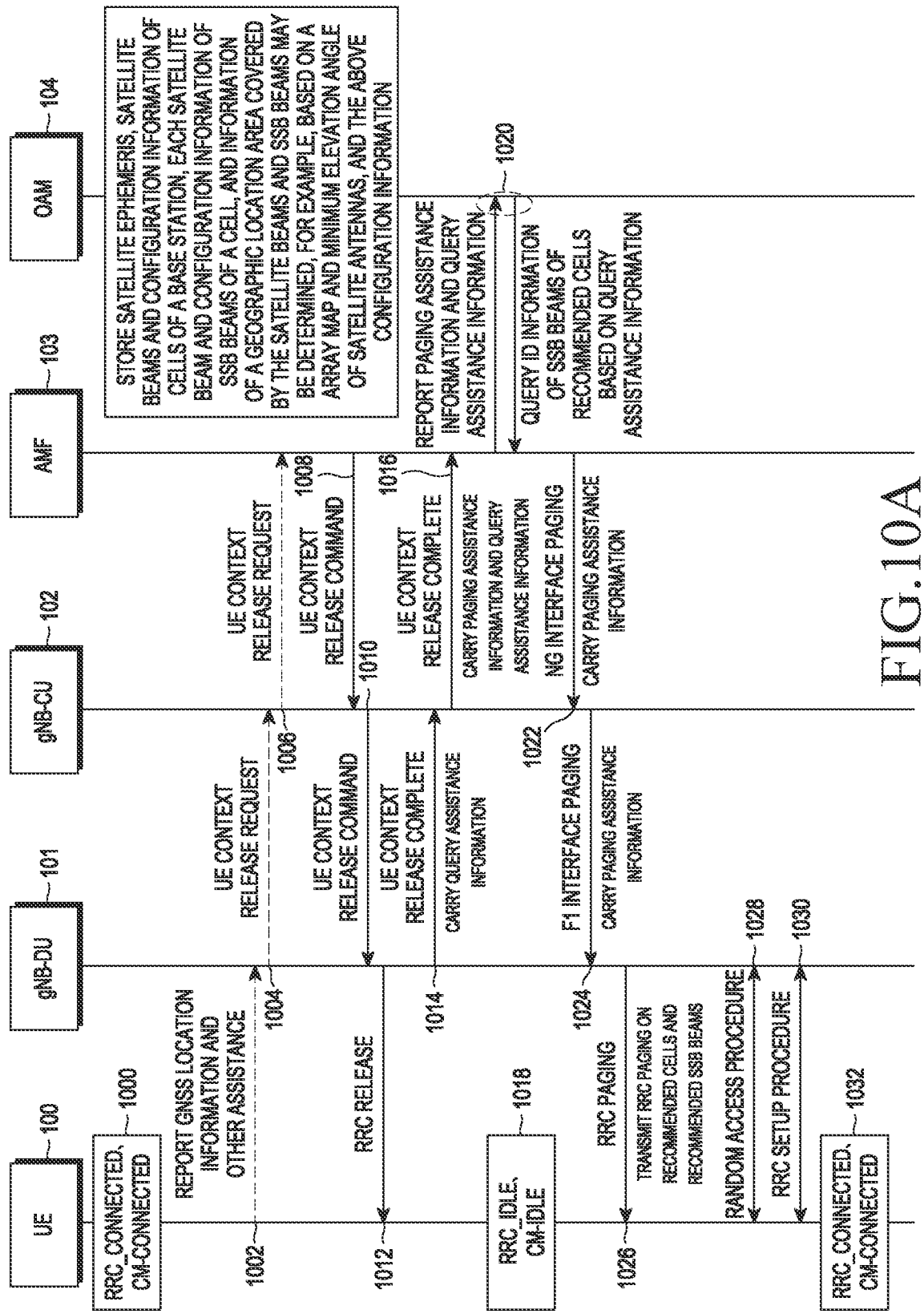
FIG. 10A illustrates a diagram of a method of paging a UE by a CN based on a UE location (where an AMF interacts with an OAM) according to some embodiments of the disclosure, where the method may be applicable to an NR communication system, a CU-DU split NTN GEO satellite transparent transmission system, a GEO on-board gNB-DU satellite regenerative transmission system, or a future new next-generation communication system.
Figure 10B:
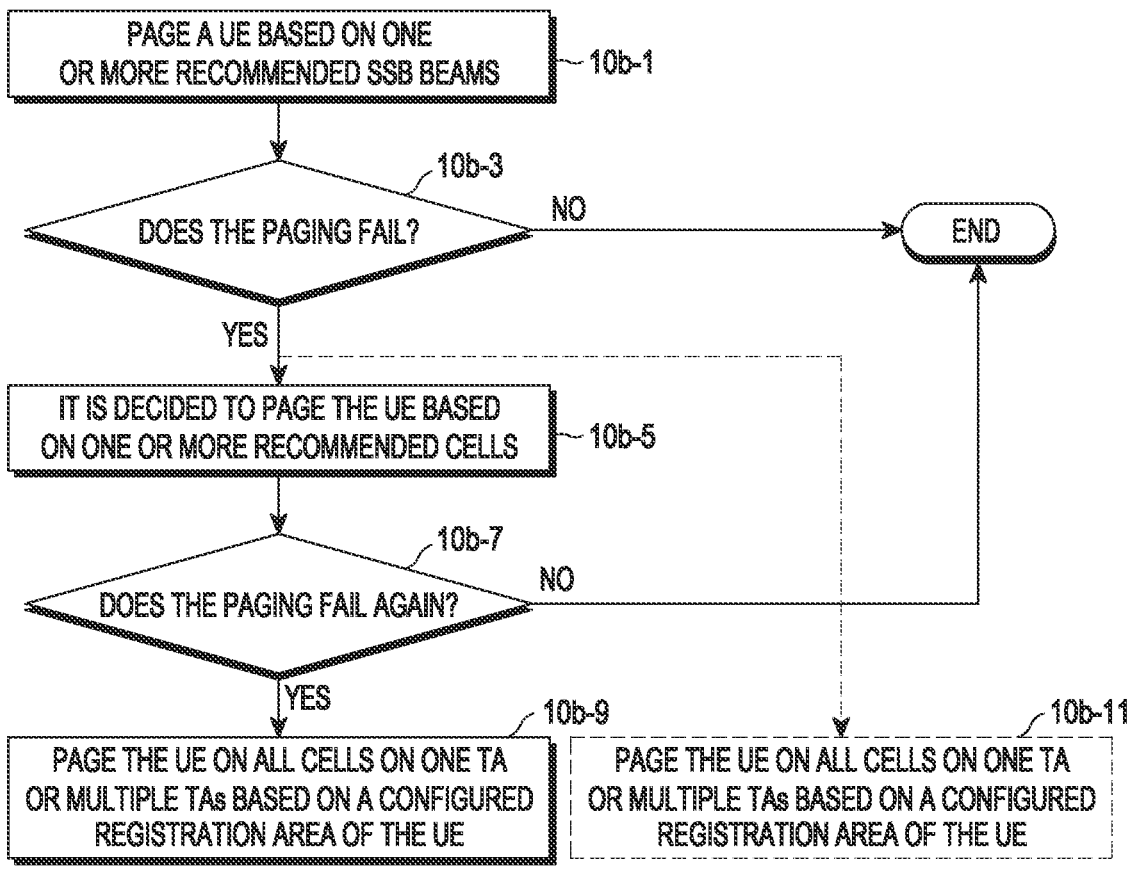
FIG. 10B illustrates a flowchart of a selection method of a paging scheme according to some embodiments of the disclosure.

FIG. 10A illustrates a diagram of a method of paging a UE by a CN based on a UE location (where an AMF interacts with an OAM) according to some embodiments of the disclosure. FIG. 10B illustrates a flowchart of a selection method of a paging scheme according to some embodiments of the disclosure. The embodiments of FIGS. 10A and 10B describe flows of paging the UE initiated by the CN based on the UE location. The embodiments may be applicable to a current NR communication system, a CU-DU split NTN GEO satellite transparent transmission system (see FIG. 2), a GEO on-board gNB-DU satellite regenerative transmission system (see FIG. 4), or a future new next-generation communication system.

It should be noted that although the embodiments related to FIGS. 10A and 10B will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, an AMF 103 may be responsible for interacting with a local or remote OAM with respect to paging assistance information reported by a gNB-CU to acquire information of recommended cells and information of SSB beams for paging the UE, where some of the paging assistance information may be reported to the gNB-CU through a gNB-DU. Then, the AMF 103 initiates a CN paging procedure, and transmits the information of the recommended cells and the information of the SSB beams for paging the UE to the gNB-CU through a NG PAGING message, then a gNB-CD transmits the information of the recommended cells and the information of the SSB beams to the gNB-DU through an F1 interface paging message, and then the gNB-DU transmits RRC paging on the corresponding cell(s) and SSB beam(s).

In some implementations, the UE itself may have positioning capability (e.g., GNSS positioning capability) and a capability to monitor other assistance information (such as a UE type related to a motion capability of the UE, a motion direction or a motion speed of the UE). In this case, the UE may obtain location information of the UE (e.g., GNSS location information) and the other assistance information (such as the UE type related to the motion capability, the motion direction and the motion speed). Then, when the UE is in a connected state, through a new RRC message or through an existing RRC message carrying a new IE, the information is reported to the gNB-CU by means of a transparent container through the gNB-DU. Or, the UE may first report the information to the gNB-DU, and then the gNB-DU transmits the information to the gNB-CU through a UE context release complete message over an F1 interface when the UE context is released or a newly defined F1 interface message or other messages. In some implementations, even if the UE does not have the GNSS positioning capability, the gNB-DU can acquire the GNSS position information and the other assistance information of the UE in the connected state through a positioning mechanism implemented by 3GPP, and then report the GNSS position information and the other assistance information to the gNB-CU. Or the gNB-CU directly acquires the GNSS location information and the other assistance information of the UE in the connected state through the positioning mechanism implemented by 3GPP.

It should be noted that the reporting procedure (procedure 1002) of UE GNSS location information and the other assistance information in FIG. 10 is an optional procedure, which is suitable for the UE having the GNSS positioning capability to report them to the gNB-DU. It may be assumed that the gNB-DU already knows the GNSS location information and the other assistance information of the UE before the UE enters an IDLE state.

It should also be noted that although GNSS location information is used for description in some implementations, the implementations of the disclosure are not limited to this, for example, any other suitable location information may be adopted to implement various implementations.

Referring to FIG. 10A, in operation 1000, a UE 100 may be in a connected state after accessing a RAN. For example, the UE 100 may be in an RRC_CONNECTED state and a CM-CONNECTED state.

In an implementation, in operation 1004, a gNB-DU 101 may initiate a UE context release request procedure through an F1 interface. Or, the UE context release request procedure may be initiated by a gNB-CU 102 through an NG interface in operation 1006. In operation 1008, in response to a UE context release request, a UE context release command procedure may be initiated by an AMF 103 through the NG interface. Accordingly, in operation 1010, the UE context release command procedure may be initiated by the gNB-CU 102 through the F1 interface.

In an implementation, the UE context release command procedure may be directly triggered by the AFM 103 in operation 1008 without any UE context release request. Accordingly, in operation 1010, the UE context release command procedure may be initiated by the gNB-CU 102 through the F1 interface.

No matter how the UE context release procedure is triggered, operations 1008 and 1010, and operations 1014 and 1016 in FIG. 10A are necessary processes for the whole UE context release procedure, and operations 1004 and 1006 are possible processes.

In some implementations, in operation 1010, the gNB-DU 101 receives a UE context release command, and carries an RRC release message by a container. Or, the gNB-CU may carry the RRC release message by a DL RRC MESSAGE TRANSFER.

Continuing to refer to FIG. 10A, in operation 1012, after receiving the UE context release command, the gNB-DU 101 may initiate an RRC release procedure to the UE 100 to release radio resources of the UE 100, and at the same time release radio interface logical connections, related signaling and user plane resources of the UE 100.

After completion of the RRC release, in operation 1014, the gNB-DU 101 may transmit a UE context release complete message confirming the completion of the RRC release to the gNB-CU 102. In operation 1016, the gNB-CU 102 may transmit the UE context release complete message confirming the completion of the RRC release to the AMF 103. For example, the context release complete message may indicate the completion of the release of the logical connections and related resources for the UE 100 on the RAN node side.

After the completion of the RRC release, in operation 1018, the UE 100 may enter an idle state. For example, the UE 100 may be in an RRC_IDLE state and a CM-IDLE state In some implementations, the UE context release complete message in operation 1014 may include query assistance information. The query assistance information may include information related to a GNSS position of the UE or other assistance information (such as a UE type related to a motion capability, a motion direction or a motion speed of the UE).

In some examples, the query assistance information may include one or more of the following information:
 GNSS location information of the UE (information such as a longitude, a latitude, or an altitude)
 other query assistance information (such as the UE type related to the motion capability, the motion direction or the motion speed of the UE)
 time stamp information In some examples, the time stamp information may be used to indicate a time point when the UE is in a corresponding GNSS position and a corresponding state of the query assistance information. For example, the time stamp information may be information in a UTC format.

In some implementations, the query assistance information may be transmitted from the gNB-DU 101 to the gNB-CU 102 through a separate message. For example, the query assistance information may be transmitted by a newly added F1 interface message or other F1 interface messages.

Because the gNB-CU knows information such as cells where the UE stays when the UE is in the connected state and the stay durations, when the gNB-CU receives the query assistance information reported from the gNB-DU, the query assistance information and the known cells stayed and stay time information may be combined, and the combined information may be reported to the AMF through the UE context release complete message over the NG interface. If the UE does not have the GNSS positioning capability, the gNB-CU can acquire the query assistance information, including the GNSS location information and the other assistance information of the UE in the connected state, through the positioning mechanism implemented by 3GPP. In this case, the gNB-CU may directly utilize the query assistance information (including the GNSS location information and the other assistance information). For example, it may be reported to the AMF through the UE context release complete message over the NG interface.

In some implementations, the UE context release complete message in operation 1016 may include assistance information for paging the UE (for convenience of description, it may be referred to as "information for paging" or "paging assistance information" in the disclosure) and query assistance information. The paging assistance information may include information related to recommended cells. The query assistance information may include information related to a GNSS position of the UE or other assistance information (such as a UE type related to a motion capability, a motion direction or a motion speed of the UE).

In some examples, the paging assistance information may include one or more of the following information:
  ID information of one or more cells (such as NR Cell Identity or NR CGI, E-UTRA Cell Identity, or E-UTRA CGI)
  information related to time stayed in each of the one or more cells (which may be referred to as "information related to Time Stayed in Cell")

In some examples, the query assistance information may include one or more of the following information:
  GNSS location information of the UE (information such as a longitude, a latitude, or an altitude)
  other query assistance information (such as the UE type related to the motion capability, the motion direction or the motion speed of the UE)
  time stamp information In some examples, the ID information of one or more cells in the paging assistance information may include ID information of one or more cells of a current gNB-CU visited by the UE. The gNB-CU may record or store the information and then report it to the CN.

In some examples, the time stamp information may be used to indicate a time point when the UE is in a corresponding GNSS position and a corresponding state of the query assistance information. For example, the time stamp information may be information in a UTC format.

In some implementations, considering that the information related to the recommended cells for paging (e.g., the paging assistance information) may be transmitted to a CN (such as an AMF) through a UE context release complete message (such as UE CONTEXT RELEASE COMPLETE message) in 5G communication systems, thus, the query assistance information may be transmitted to the CN (such as the AMF) by a newly added IE (Information Element) to the UE context release complete message (such as UE CONTEXT RELEASE COMPLETE message), thereby saving signaling overhead. However, the embodiments of the disclosure are not limited thereto. In some implementations, the query assistance information may be transmitted from the gNB-CU 102 to the AMF 103 through a separate message. For example, the query assistance information may be transmitted by a newly added NG interface message or other NG interface messages. The AMF receives the assistance information carried in operation 1016 and stores the information for subsequent paging of the UE.

When the UE 100 is in the idle state (operation 1018), if there is downlink signaling or user plane data to be transmitted to the UE 100, the AMF 103 on the CN side may need to page the UE 100.

Referring to FIG. 10A, before initiating an NG paging message, in operation 1020, the AMF 103 may interact with an OAM 104.

In some implementations, the OAM 104 may be a local OAM or a remote OAM. For example, the OAM 104 may store various configuration information, such as satellite ephemeris, information on mapping of satellite beams to a configuration of cells of a base station, and/or information on mapping of each satellite beam to a configuration of SSB beams of a cell, among others. For example, information on a geographic location area covered by the satellite beams and SSB beams of each cell may be calculated based on a preconfigured or preset array map and minimum elevation angle of satellite antennas, and the above stored configuration information.

For a present NR network, the OAM 104 configures a mapping relationship between base stations and cells of NR and a configuration of NR antenna arrays, and stores a geographic position, an azimuth and inclination angle of each NR antenna array, and information on mapping of a configuration of SSB beams of a cell to a geographic position, an azimuth and inclination angle of each NR antenna array. Based on the above information, a coverage of SSB beams of each cell can be calculated.

In operation 1020, the AMF 103 interacts with the OAM 104. For example, the AMF 103 may report the paging assistance information (including the information related to the recommended cells) and the query assistance information (including the information related to the GNSS position of the UE or the other assistance information (such as the UE type related to the motion capability, the motion direction or the motion speed of the UE)) to the OAM 104, and can query ID information of SSB beams of recommended cells for paging the UE at the current time from the OAM 104 based on the query assistance information.

In operation 1022, the AMF 103 may transmit an NG interface paging message to the gNB-CU 102 to page the UE 100. For example, paging assistance information for paging the UE may be carried in the NG interface paging message, and includes at least one of information related to the recommended cells and information related to the recommended SSB beams.

In some examples, the paging assistance information carried in the NG interface paging message may include one or more of the following information:
  ID information of one or more cells (such as NR Cell Identity or NR CGI, E-UTRA Cell Identity, or E-UTRA CGI)
  information related to time stayed in each of the one or more cells (which may be referred to as "information related to Time Stayed in Cell")
  ID information of one or more SSB beams in each of the one or more cells (such as SSB-Index) (which may be referred to as "ID information of SSB beams")

In some examples, the ID information of one or more cells in the paging assistance information carried in the NG interface paging message may include ID information of one or more cells of the current gNB-DU visited by the UE before the UE enters the idle state, the ID information of the one or more cells of the current gNB-DU being reported by the gNB-CU to the CN.

Continuing to refer to FIG. 10A, in operation 1024, the gNB-CU 102 may transmit the paging assistance information, including the information related to the recommended cells (such as a Paging Cell List) and the information related to the recommended SSB beams, to the gNB-DU including the recommended cells through an F1 interface paging message.

In some examples, the paging assistance information carried in the F1 interface paging message may include one or more of the following information:
- ID information of one or more cells (such as NR Cell Identity or NR CGI, E-UTRA Cell Identity, or E-UTRA CGI)
- information related to time stayed in each of the one or more cells (which may be referred to as "information related to Time Stayed in Cell")
- ID information of one or more SSB beams in each of the one or more cells (such as SSB-Index) (which may be referred to as "ID information of SSB beams")

In some examples, the ID information of one or more cells in the paging assistance information carried in the F1 interface paging message may include ID information on one or more cells of the current gNB-DU that have been visited by the UE before UE enters the idle state.

In some implementations, considering that the information related to the recommended cells for paging, including a Paging Cell List IE, may be carried by the F1 interface paging message in 5G communication systems, information related to recommended SSB beams for paging, including the ID information of SSB beams, may be transmitted to the gNB-DU through the Paging Cell List IE. However, the embodiments of the disclosure are not limited thereto. In some implementations, the information related to the recommended SSB beams for paging may be transmitted to the gNB-DU by a newly added IE to the F1 interface paging message.

Continuing to refer to FIG. 10A, after receiving the paging assistance information for paging the UE through the F1 interface paging message, the gNB-DU 101 may transmit an RRC paging message to the UE 100 based on the paging assistance information to page the UE 100. In some implementations, the gNB-DU 101 may select a corresponding cell(s) and corresponding SSB beam(s) based on the paging assistance information, and transmit the RRC paging messages on the corresponding cell and corresponding SSB beam to page the UE 100.

In embodiments of the disclosure, when the CN pages the UE, by utilizing the paging assistance information, the gNB-DU may page the UE on the one or more recommended cells and one or more recommended SSB beams in each of the one or more cells based on the paging assistance information, thereby paging the UE more accurately.

Continuing to refer to FIG. 10A, when the UE 100 receives the RRC paging message, a random access procedure may be initiated in operation 1028 and an RRC setup procedure may be initiated in operation 1030. Through the random access procedure and RRC setup procedure, the UE 100 may resume to the connected state for transmission or reception of signaling and user plane data in operation 1030.

The method of paging the UE by the CN according to some embodiments of the disclosure has been described above in conjunction with FIG. 10A. In the method of FIG. 10A, if the paging by the CN based on one or more SSB beams in each recommended cell fails, the CN, gNB-CU or gNB-DU may decide to expand the paging range. In embodiments of the disclosure, the following possible schemes, including at least one of scheme f-1, scheme f-2, scheme f-3, scheme f-4 or scheme f-5, may be adopted.

Scheme f-1

Indication information (e.g., an IE including the indication information) is carried in an initial F1 interface paging message, and is used to indicate to the gNB-DU that if the first paging based on SSB beams of a cell fails, the paging range will be directly expanded. For example, the paging message may be transmitted on all SSB beams in each of the one or more recommended cells to expand the paging range.

Scheme f-2

Indication information (e.g., an IE including the indication information) is carried in an initial NG interface paging message, and is used to indicate to the gNB-CU that if the first paging based on SSB beams of a cell fails, the paging range will be directly expanded. For example, the paging message may be transmitted on all SSB beams in each of the one or more recommended cells to expand the paging range. Based on the indication information, the gNB-CU may transmit the second F1 interface paging message to the gNB-DU, where the F1 interface paging message only carries ID information of one or more recommended cells for paging the UE. The gNB-DU may transmit the paging message based on all SSB beams in each of the one or more recommended cells.

Scheme f-3

If the CN knows that the first paging based on SSB beams of a cell fails, the CN may decide to expand the paging range. For example, the CN may transmit the NG interface paging message again, where the NG interface paging message only carries the ID information of the one or more recommended cells for paging the UE. The gNB-CU may expand the paging range after receiving the second NG interface paging message. In this case, the gNB-CU may transmit the second F1 interface paging message to the gNB-DU, where the F1 interface paging message only carries ID information of one or more recommended cells for paging the UE. The gNB-DU may transmit the paging message based on all SSB beams in each of the one or more recommended cells.

Scheme f-4

If the CN knows that the first paging based on SSB beams of a cell fails, the CN may decide to expand the paging range. For example, the CN may utilize an existing CN paging mechanism to expand the paging range. Particularly, the CN may select a gNB-CU of cells configured with a corresponding TAI to transmit the NG interface paging message (such as an NG PAGING message) on one TA or multiple TAs (such as a TA List) based on a configured Registration Area of the UE. In a case where the gNB-CU receives the second NG interface paging message, the gNB-CU may select the cells configured with a corresponding TAI to transmit the F1 interface paging message, where the F1 interface paging message carries ID information (such as a Paging Cell List IE) of target cells for paging the UE. Then, after receiving the F1 interface paging message, the gNB-DU may transmit the RRC paging message (such as an RRC PAGING message) on all SSB beams of the target cells based on the ID information of the target cells to page the UE.

Scheme f-5

For scheme f-1, scheme f-2 or scheme f-3, if the paging of the UE based on recommended cells fails, the CN may continue to expand the paging range. For example, the existing CN paging mechanism described in scheme f-4 may be utilized to select to transmit the NG interface paging message (such as an NG PAGING message) to a gNB-CU of cells configured with a corresponding TAI on one TA or multiple TAs (TA List) based on a configured Registration Area of the UE. In a case where the gNB-CU receives the NG interface paging message, the gNB-CU may select the cells configured with a corresponding TAI to transmit the F1 interface paging message, where the F1 interface paging message carries ID information (such as a Paging Cell List IE) of target cells for paging the UE. Then, after receiving the F1 interface paging message, the gNB-DU may transmit the RRC paging message (such as an RRC PAGING message) on all SSB beams of the target cells based on the ID information of the target cells to page the UE.

Considering the paging schemes described above, an embodiment of the disclosure provides a selection method of a paging scheme, as shown in FIG. 10B.

In operation 10b-1, a UE may be paged based on one or more SSB beams, as the method described with reference to FIG. 10A.

If it is determined in operation 10b-3 that the paging fails, in operation 10b-5, the CN, gNB-CU or gNB-DU may decide to page the UE based on one or more recommended cells, as described in the scheme f-1, f-2 or f-3. For example, the CN, gNB-CU or gNB-DU may decide to page the UE on all SSB beams in each of the one or more recommended cells.

If it is determined in operation 10b-7 that the paging fails again, in operation 10b-9, the CN may decide to page the UE on all cells on one TA or multiple TAs (such as a TA List) based on a configured Registration Area of the UE, as described in the scheme f-4.

In some implementations, if it is determined in operation 10b-3 that the paging based on SSB beams fails, the CN may decide in operation 10b-11 to page the UE directly on all cells on one TA or multiple TAs (such as a TA List) based on a configured Registration Area of the UE, as described in scheme f-4.

The selection method of a paging scheme according to some embodiments of the disclosure has been described above in conjunction with FIG. 10B. Among the various operations described in FIG. 10B, some operations may be omitted or additional operations may be added to realize selection of various paging schemes.

Figure 11A:
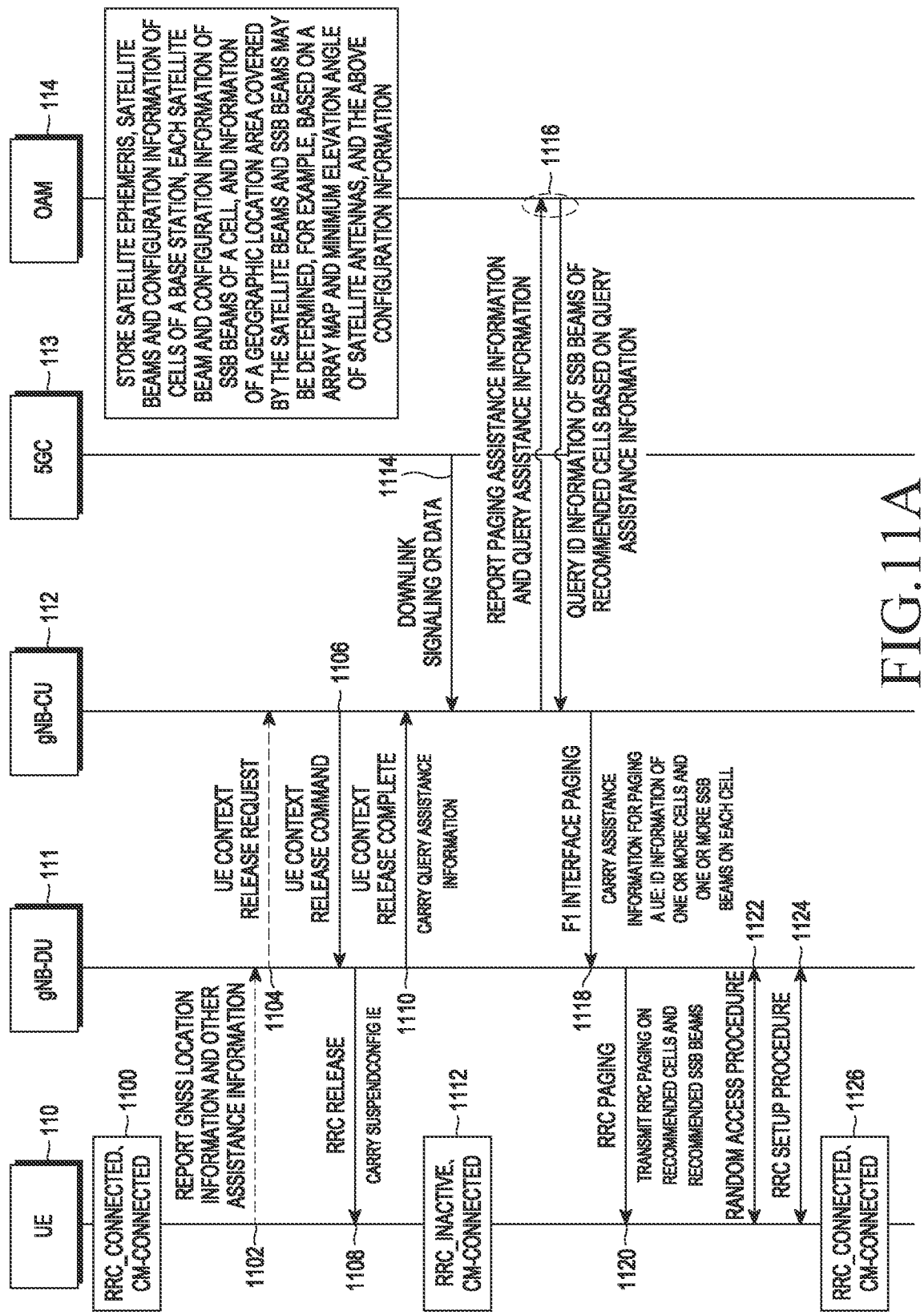
FIG. 11A illustrates a diagram of a method of paging a UE by a RAN based on a UE location (where a gNB-CU interacts with an OAM) according to some embodiments of the disclosure, where the method may be applicable to an NR communication system, a CU-DU split NTN GEO satellite transparent transmission system, a GEO on-board gNB-DU satellite regenerative transmission system, or a future new next-generation communication system.
Figure 11B:
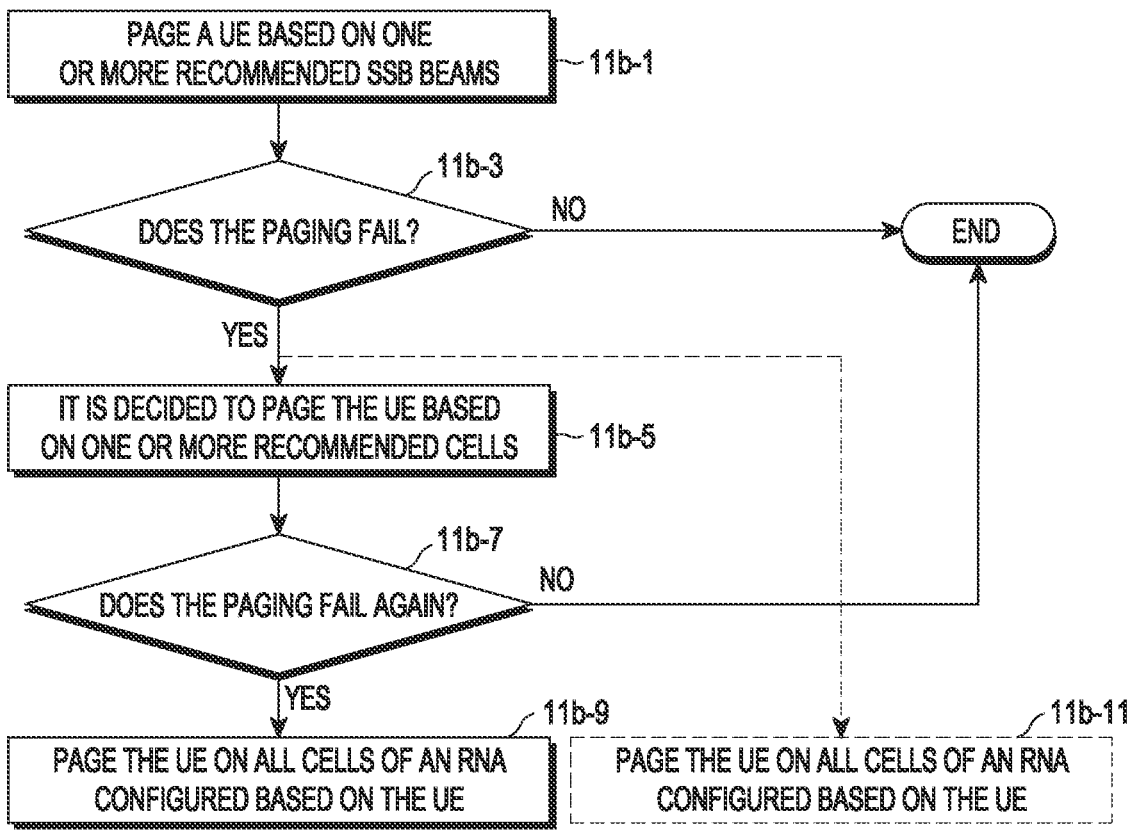
FIG. 11B illustrates a flowchart of a selection method of a paging scheme according to some embodiments of the disclosure.

FIG. 11A illustrates a diagram of a method of paging a UE by a RAN based on a UE location (where a gNB-CU interacts with an OAM) according to some embodiments of the disclosure. FIG. 11B illustrates a flowchart of a selection method of a paging scheme according to some embodiments of the disclosure. The embodiments of FIG. 11A describe a flow of paging the UE initiated by the RAN based on the UE location. The embodiments may be applicable to a current NR communication system, a CU-DU split NTN GEO satellite transparent transmission system (see FIG. 2), a GEO on-board gNB-DU satellite regenerative transmission system (see FIG. 4).

It should be noted that although the embodiments related to FIGS. 11A and 11B will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, the gNB-CU may be responsible for interacting with a local or remote OAM with respect to assistance information for paging the UE reported by the gNB-CU to acquire ID information of SSB beams of a cell for paging the UE, where some of the assistance information may be reported to the gNB-CU first through a gNB-DU. When the gNB-CU receives downlink signaling or data, a RAN paging procedure needs to be initiated, and ID information of recommended cells and corresponding SSB beams for paging the UE is transmitted to the gNB-DU through an F1 interface paging message, and then the gNB-DU transmits RRC paging on the corresponding cell(s) and SSB beam(s).

In some embodiments, the UE itself has a positioning capability (e.g., GNSS positioning capability) and a capability to monitor other assistance information (such as a UE type related to a motion capability of the UE, a motion direction or a motion speed of the UE). In this case, the UE may obtain location information of the UE (e.g., GNSS location information) and the other assistance information (such as the UE type related to the motion capability, the motion direction and the motion speed). Then, when the UE is in a connected state, through a new RRC message or by an existing RRC message carrying a new IE, the information is reported to the gNB-CU by means of a transparent container through the gNB-DU. Or, the UE may first report the information to the gNB-DU, and then the gNB-DU transmits the information to the gNB-CU through a UE context release complete message over an F1 interface when the UE context is released or a newly defined F1 interface message or other messages.

In some implementations, even if the UE does not have the GNSS positioning capability, the gNB-DU can acquire the GNSS location information and the other assistance information of the UE in the connected state through a positioning mechanism implemented by 3GPP, and then report the same to the gNB-CU. Or the gNB-CU directly acquires the GNSS location information and the other assistance information of the UE in the connected state through the positioning mechanism implemented by 3GPP.

It should be noted that the reporting procedure (operation 1002) of the UE GNSS and the other assistance information in FIG. 11 is an optional procedure, which is suitable for the UE having the GNSS positioning capability to report them to the gNB-DU. It may be assumed that the gNB-DU already knows the GNSS location information and the other assistance information of the UE before the UE enters an IDLE state.

It should also be noted that although GNSS location information is used for description in some implementations, the implementations of the disclosure are not limited to this, for example, any other suitable location information may be adopted to implement various implementations.

Referring to FIG. 11A, in operation 1100, a UE 110 may be in a connected state after accessing a RAN. For example, the UE 110 may be in an RRC_CONNECTED state and a CM-CONNECTED state.

In an implementation, for various reasons, a gNB-DU 111 may initiate a UE context release request procedure through an F1 interface in operation 1104. In operation 1106, in response to a UE context release request, a gNB-CU 112 may initiate a UE context release command procedure through the F1 interface in operation 1106.

In an implementation, the gNB-CU 111 may directly initiate the UE context release command procedure through the F1 interface in operation 1106 without any UE context release request.

No matter how the UE context release procedure is triggered, if the gNB-CU 112 decides that the UE 110 enters an inactive (such as RRC_INACTIVE) state, suspend configuration information (such as SuspendConfig IE) may be carried in an RRC release procedure to indicate that the UE will enter the inactive (such as RRC_INACTIVE) state and apply its suspend configuration information. The suspend configuration information may include information such as a configured RNA (such as RAN-Based Notification Area) of the UE, ID information of cells included in the RNA, and a value of a periodic RNA update timer.

In operation 1108, after receiving a UE context release command, the gNB-DU 111 may initiate an RRC release procedure to the UE 70 to release radio resources between the UE 110 and the RAN.

After completion of the RRC release, in operation 1110, the gNB-DU 111 may transmit a UE context release complete message confirming the completion of the RRC release to the gNB-CU 112. For example, the context release complete message may indicate the completion of the release of the logical connections and related resources for the UE 110 on the RAN side.

In some embodiments, the UE context release complete message in operation 1110 may include query assistance information. The query assistance information may include information related to a GNSS position of the UE or other assistance information (such as a UE type related to a motion capability, a motion direction or a motion speed of the UE).

In some examples, the query assistance information may include one or more of the following information:
GNSS location information of the UE (information such as a longitude, a latitude, or an altitude)
other query assistance information (such as the UE type related to the motion capability, the motion direction or the motion speed of the UE)
time stamp information In some examples, the time stamp information may be used to indicate a time point when the UE is in a corresponding GNSS position and a corresponding state of the query assistance information. For example, the time stamp information may be information in a UTC format.

In some implementations, the query assistance information may be transmitted from the gNB-DU 111 to the gNB-CU 112 through a separate message. For example, the query assistance information may be transmitted by a newly added F1 interface message or other F1 interface messages.

Because the gNB-CU knows information such as cells where the UE stays when the UE is in the connected state and the stay durations, when the gNB-CU receives the query assistance information reported from the gNB-DU, the query assistance information and the known cells stayed and stay time information may be combined, and the combined information may be stored and used for subsequent paging of the UE. If the UE does not have the GNSS positioning capability, the gNB-CU can acquire the query assistance information, including the GNSS location information and the other assistance information of the UE in the connected state, through the positioning mechanism implemented by 3GPP. In this case, the gNB-CU may directly utilize the query assistance information (including the GNSS location information and the other assistance information).

When the UE 110 is in the inactive state (operation 1112), if there is downlink signaling or user plane data to be transmitted from a 5GC 113 to the UE 100 (operation 1114), the gNB-CU needs to initiate a procedure of paging the UE.

Referring to FIG. 11A, before a F1 paging procedure is initiated, in operation 1116, the gNB-CU 112 may interact with an OAM 114.

In some implementations, the OAM 114 may be a local OAM or remote OAM. For example, the OAM 114 may store various configuration information, such as satellite ephemeris, information on mapping of satellite beams to a configuration of cells of a base station, and/or information on mapping of each satellite beam to a configuration of SSB beams of a cell, among others. For example, information on a geographic location area covered by the satellite beams and SSB beams of each cell may be calculated based on a preconfigured or preset array map and minimum elevation angle of satellite antennas, and the above stored configuration information.

For a present NR network, the OAM 114 configures a mapping relationship between base stations and cells of NR and a configuration of NR antenna arrays, and stores a geographic position, an azimuth and inclination angle of each NR antenna array, and information on mapping a configuration of SSB beams of a cell to a geographic position, an azimuth and inclination angle of each NR antenna array. Based on the above information, a coverage of SSB beams of each cell can be calculated.

In operation 1116, the gNB-CU 112 interacts with the OAM 114. For example, the gNB-CU 112 may report paging assistance information (including information related to recommended cells) and the query assistance information (including the information related to the GNSS position of the UE or the other assistance information (such as the UE type related to the motion capability, the motion direction or the motion speed of the UE)) to the OAM 114, and can query ID information of SSB beams of recommended cells for paging the UE at the current time from the OAM 114 based on the query assistance information.

Continuing to refer to FIG. 11A, in operation 1118, the gNB-CU 112 may transmit paging assistance information, including information related to the recommended cells (such as a Paging Cell List) and information related to the recommended SSB beams, to the gNB-DU 111 through an F1 interface paging message.

In some examples, the paging assistance information carried in the F1 interface paging message may include one or more of the following information:
ID information of one or more cells (such as NR Cell Identity or NR CGI, E-UTRA Cell Identity, or E-UTRA CGI)
information related to time stayed in each of the one or more cells (which may be referred to as "information related to Time Stayed in Cell")
ID information of one or more SSB beams in each of the one or more cells (such as SSB-Index) (which may be referred to as "ID information of SSB beams")

In some examples, the ID information of one or more cells in the paging assistance information carried in the F1 interface paging message may include ID information on one or more cells of the current gNB-DU that have been visited by the UE before UE enters the inactive state.

In some implementations, considering that the information related to the recommended cells for paging, including a Paging Cell List IE, may be carried by the F1 interface paging message in 5G communication systems, information related to recommended SSB beams for paging, including the ID information of SSB beams, may be transmitted to the gNB-DU through the Paging Cell List IE. However, the embodiments of the disclosure are not limited thereto. In some implementations, the information related to the recommended SSB beams for paging may be transmitted to the gNB-DU by a newly added IE to the F1 interface paging message.

Continuing to refer to FIG. 11A, after receiving the paging assistance information for paging the UE through the F1 interface paging message, the gNB-DU 111 may transmit an RRC paging message to the UE 110 based on the paging assistance information to page the UE 110 in operation 1120. In some implementations, the gNB-DU 111 may select a corresponding cell(s) and corresponding SSB beam(s) based on the paging assistance information, and transmit the RRC paging message on the corresponding cell and corresponding SSB beam to page the UE 100.

In embodiments of the disclosure, when the RAN pages the UE, by utilizing the paging assistance information, the gNB-DU may page the UE on the one or more recommended cells and one or more recommended SSB beams in each of the one or more cells based on the paging assistance information, thereby paging the UE more accurately.

Continuing to refer to FIG. 11A, when the UE 110 receives the RRC paging message, a random access procedure may be initiated in operation 1122 and an RRC setup procedure may be initiated in operation 1124. Through the random access procedure and RRC setup procedure, the UE 100 may resume to the connected state for transmission or reception of signaling and user plane data in operation 1126.

The method of paging the UE by the RAN according to some embodiments of the disclosure has been described above in conjunction with FIG. 11A. In the method of FIG. 11A, if the paging by the RAN based on one or more SSB beams in each recommended cell fails, the RAN may decide to expand the paging range. In embodiments of the disclosure, the following possible schemes, including at least one of scheme g-1, scheme g-2, scheme g-3 or scheme g-4, may be adopted.

Scheme g-1

Indication information (e.g., an IE including the indication information) is carried in an initial F1 interface paging message, and is used to indicate to the gNB-DU that if the first paging based on SSB beams of a cell fails, the paging range will be directly expanded. For example, the RRC paging message may be transmitted on all SSB beams in each of the one or more recommended cells to expand the paging range.

Scheme g-2

If the gNB-CU knows that the first paging based on SSB beams of a cell fails, the gNB-CU may decide to expand the paging range. For example, the gNB-CU may transmit the F1 interface paging message again, where the F1 interface paging message only carries ID information (such as a Paging Cell List IE) of one or more recommended cells for paging the UE. Then, after receiving the second F1 interface paging message, the gNB-DU pages the UE on all SSB beams in each of the one or more recommended cells.

Scheme g-3

If the gNB-CU knows that the first paging based on SSB beams of a cell fails, the gNB-CU may decide to expand the paging range. For example, the gNB-CU may utilize an existing paging mechanism of the RAN to expand the paging range.

For example, the gNB-CU may select to transmit an F1 interface paging message to a gNB-DU of cells configured with the same RNA, where the F1 interface paging message carries ID information (such as a Paging Cell List IE) of target cells for paging the UE, and then the gNB-DU selects a corresponding cell to transmit the RRC paging message (such as an RRC PAGING message) to page the UE.

In addition, the gNB-CU may select to transmit an Xn interface paging message (such as an Xn RAN PAGING message) to a neighboring gNB-CU of cells configured with the same RNA, and then the neighboring gNB-CU selects a gNB-DU of cells configured with the same RNA to transmit the F1 interface paging message, where the F1 interface paging message carries target cell ID information (such as a Paging Cell List IE) for paging the UE, and then the gNB-DU selects a corresponding cell to transmit the RRC paging message (such as an RRC PAGING message) to page the UE. If a neighboring node of the gNB-CU is a non-split gNB, that is, an NG-RAN node, the NG-RAN node may select cells configured with the same RNA to transmit the RRC paging messages after receiving the Xn RAN PAGING message.

Scheme g-4

For scheme g-1 or scheme g-2, if the paging of the UE based on recommended cells fails, the gNB-CU may continue to expand the paging range. For example, the existing RAN paging mechanism described in scheme g-3 may be utilized to page the UE on all cells of an RNA (such as RAN-Based Notification Area) configured for the UE.

Considering the paging schemes described above, an embodiment of the disclosure provides a selection method of a paging scheme, as shown in FIG. 11B.

In operation 11b-1, the UE may be paged based on one or more recommended SSB beams, as the method described with reference to FIG. 11A.

If it is determined in operation 11b-3 that the paging fails, in operation 11b-5, the RAN may decide to page the UE based on one or more recommended cells, as described in the scheme g-1 or g-2. For example, the gNB-DU or gNB-CU may decide to page the UE on all SSB beams in each of the one or more recommended cells.

If it is determined in operation 11b-7 that the paging fails again, in operation 11b-9, the gNB-DU or gNB-CU may decide to page the UE on all cells of an RNA configured for the UE, as described in scheme g-3.

In some implementations, if it is determined in operation 11b-3 that the paging based on SSB beams fails, the gNB-CU may decide in operation 11b-11 to directly page the UE on all cells of an RNA configured for the UE, as described in scheme g-3.

The selection method of a paging scheme according to some embodiments of the disclosure has been described above in conjunction with FIG. 11B. Among the various operations described in FIG. 11B, some operations may be omitted or additional operations may be added to realize various selection methods of paging schemes.

Figure 12A:
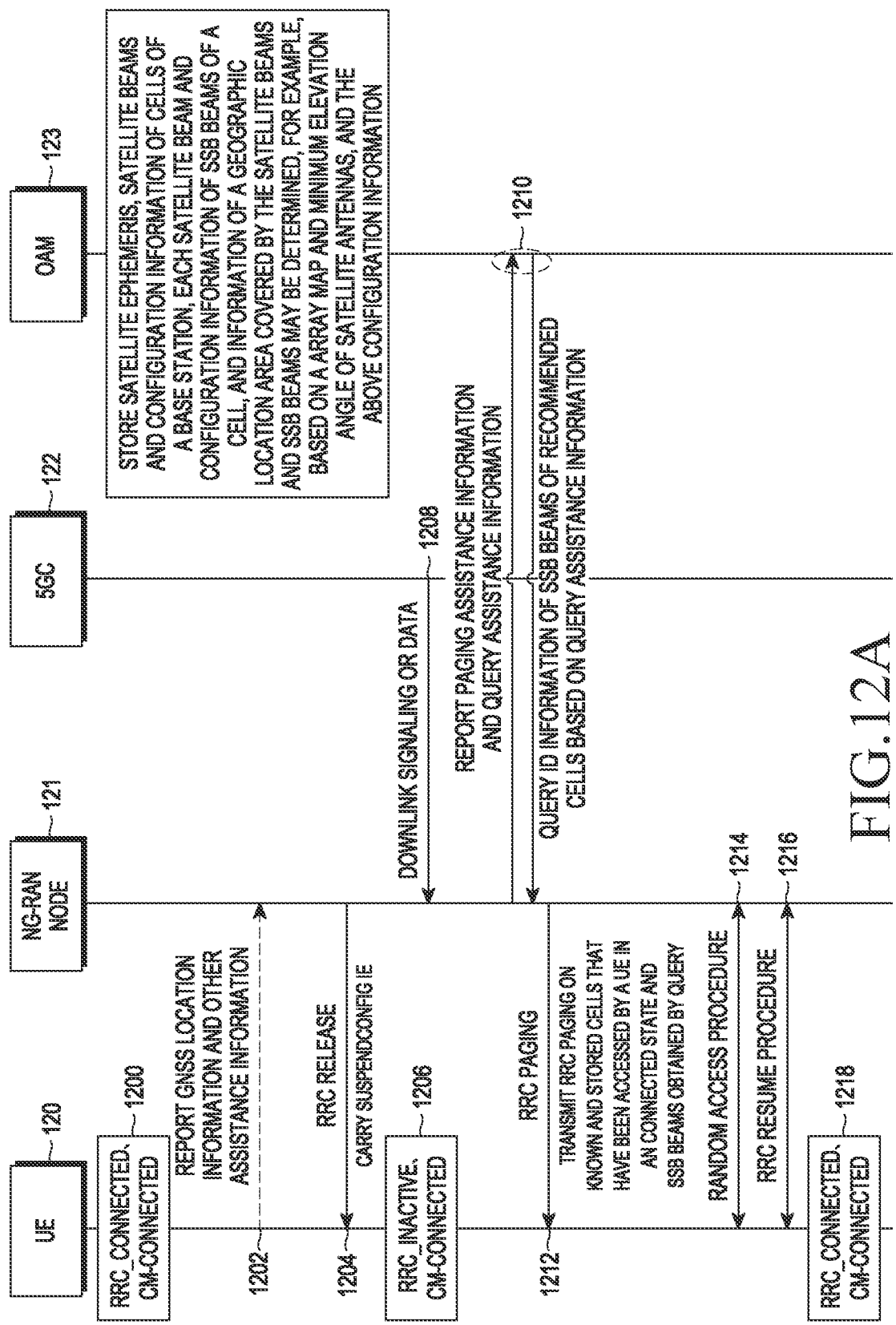
FIG. 12A illustrates a diagram of a method of paging a UE by a RAN based on a UE location (where an NG-RAN node interact with an OAM) according to some embodiments of the disclosure, where the method may be applicable to an NR architecture, an NTN GEO satellite transparent transmission system, a GEO on-board gNB satellite regenerative transmission system, or a future new next-generation communication system.
Figure 12B:
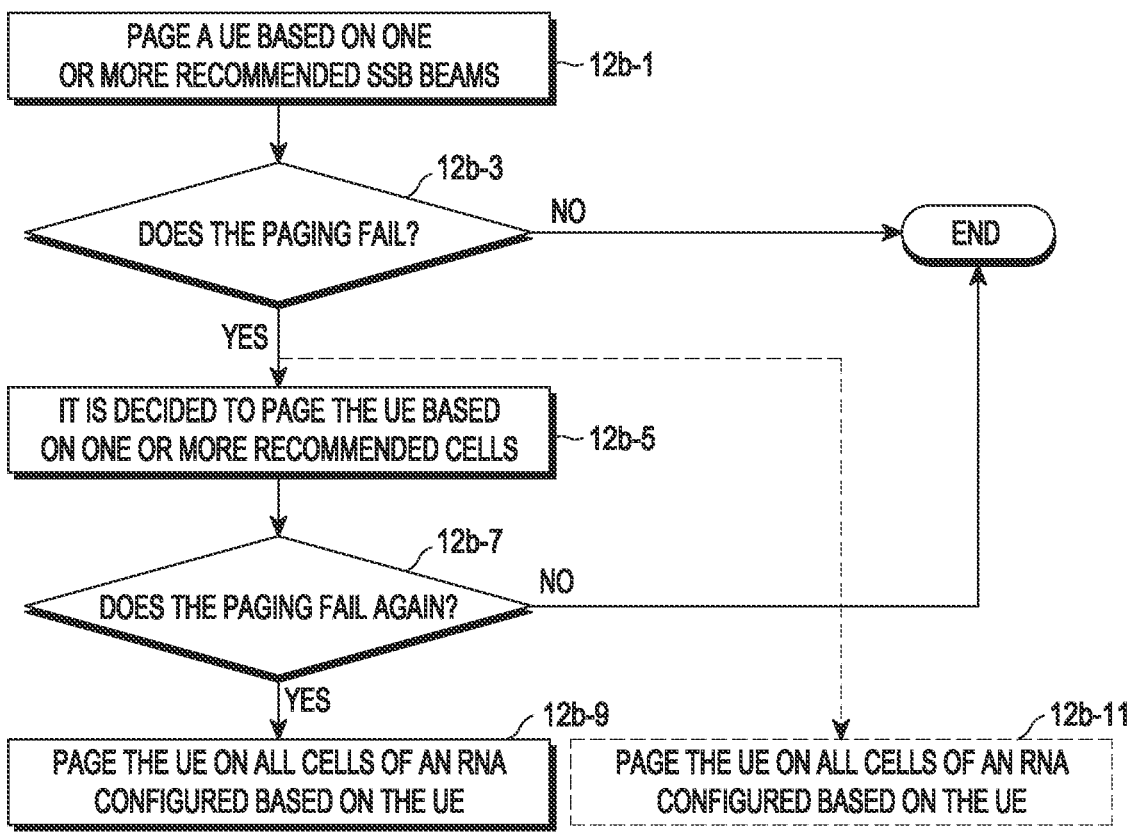
FIG. 12B illustrates a flowchart of a selection method of a paging scheme according to some embodiments of the disclosure.

FIG. 12A illustrates a diagram of a method of paging a UE by a RAN based on a UE location (where an NG-RAN node interacts with an OAM) according to some embodiments of the disclosure. FIG. 12B illustrates a flowchart of a selection method of a paging scheme according to some embodiments of the disclosure. The embodiments in FIGS. 12A and 12B describe flows of paging the UE initiated by the RAN based on the UE location, for example, these embodiments may be applicable to a current NR communication system, an NTN GEO satellite transparent transmission system (see FIG. 1), a GEO on-board gNB (gNB on board) satellite regenerative transmission system (see FIG. 3), or a next-generation new communication system in the future.

It should be noted that although the embodiments related to FIGS. 12A and 12B will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, the NG-RAN node may be responsible for interacting with a local or remote OAM with respect to assistance information for paging the UE reported by the NG-RAN node, to acquire ID information of recommended base stations, ID information of recommended cells and ID information of recommended SSB beams for paging the UE.

In the embodiments described with reference to FIGS. 12A and 12B, interaction of new information may not be involved, but the behavior description of the NG-RAN node with respect to the paging by the RAN may be defined. Therefore, these embodiments may be particularly applicable to the following situations: for a fixed-position immobile UE, it should always be in the coverage of a certain SSB beam in a cell, even if the UE moves, it is not out of the coverage of the SSB beam; or even if the UE moves, it is in the coverage of certain SSB beams, or even if the UE moves, it is in the coverage of one or more SSB beams in one or more neighboring cells.

In some implementations, the UE itself has a positioning capability (e.g., GNSS positioning capability) and a capability to monitor other assistance information (such as a UE type related to a motion capability of the UE, a motion direction or a motion speed of the UE). In this case, the UE may obtain location information (e.g., GNSS location information) and other assistance information (such as a UE type related to a motion capability, a motion direction and a motion speed), and may report the GNSS location information and the other assistance information to the NG-RAN node through a new RRC message or an existing RRC message carrying a new IE in a connected state. A flow of UE reporting will be described in detail with reference to FIGS. 20 and 21.

In some implementations, if the UE does not have the GNSS positioning capability, the NG-RAN node may obtain the GNSS position information and the other assistance information (such as the UE type related to the motion capability, the motion direction or the motion speed of the UE) when the UE is in a connected state through a positioning mechanism implemented by 3GPP.

In embodiments of the disclosure, for convenience of description, the GNSS location information or other assistance information (such as the UE type related to the motion capability, the motion direction or the motion speed of the UE) may be referred to as query assistance information.

It should be noted that the reporting procedure (operation 1202) of the GNSS position and the other assistance information of the UE in FIG. 12A is an optional procedure, which is suitable for the UE having the GNSS positioning capability to report them to the NG-RAN node.

It should also be noted that although GNSS location information is used for description in some implementations, the implementations of the disclosure are not limited to this, for example, any other suitable location information may be adopted to implement various implementations.

No matter which mechanism is adopted, it may be assumed that before the UE enters the INACTIVE state, the NG-RAN node already knows the GNSS location information (such as a longitude, a latitude, or an altitude), the time stamp information, and the other assistance information (such as the UE type related to the motion capability, the motion direction or the motion speed of the UE).

For various reasons, if the NG-RAN node decides that the UE enters the inactive (such as RRC_INACTIVE) state, suspend configuration information (SuspendConfig IE) will be carried in an RRC release procedure to indicate that the UE will enter the RRC_INACTIVE state and apply its suspend configuration information. The suspend configuration information may include information such as a configured RNA (such as RAN-Based Notification Area) of the UE, ID information of cells included in the RNA, and a value of a periodic RNA update timer.

After completion of the RRC release, in operation 1206, the UE 120 may enter the inactive state. For example, The UE 120 may be in the RRC_INACTIVE state and a CM-CONNECTED state.

When the UE 120 is in the inactive (such as RRC_INACTIVE) state, if there is downlink signaling or user plane data transmitted to the UE from a 5GC 122 and the downlink signaling or user plane data arrives at an NG-RAN node 121 by operation 1208, the NG-RAN node 121 needs to page the UE 120. Because the NG-RAN node 121 knows ID information of cells where the UE 120 stays when it is in the connected state, and the GNSS location information (such as a longitude, a latitude, or an altitude), the time stamp information, and the other assistance information (such as the UE type related to the motion capability, the motion direction or the motion speed of the UE) of the UE through the UE report or other means, the NG-RAN node may store the information and use it for subsequent paging of the UE.

When there is downlink signaling or user data to be transmitted to the UE 120, the NG-RAN node 121 needs to initiate a procedure of paging the UE 120. The NG-RAN node 121 interacts with an OAM 123 before initiating an RRC paging message.

In some implementations, the OAM 123 may be a local OAM or remote OAM. For example, the OAM 123 may store various configuration information, such as satellite ephemeris, information on mapping of satellite beams to a configuration of cells of a base station, and/or information on mapping of each satellite beam to a configuration of SSB beams of a cell, among others. For example, information on a geographic location area covered by the satellite beams and SSB beams of each cell may be calculated based on a preconfigured or preset array map and minimum elevation angle of satellite antennas, and the above stored configuration information.

For a present NR network, the OAM 123 configures a mapping relationship between base stations and cells of NR and a configuration of NR antenna arrays, and stores a geographic position, an azimuth and inclination angle of each NR antenna array, and information on mapping of a configuration of SSB beams of a cell to a geographic position, an azimuth and inclination angle of each NR antenna array. Based on the above information, a coverage of SSB beams of each cell can be calculated.

In operation 1210, the NG-RAN node 121 may interact with the OAM 123. For example, the NG-RAN node 121 may report the paging assistance information (including the information related to the recommended cells) and the query assistance information (including the information related to the GNSS position of the UE or the other assistance information (such as the UE type related to the motion capability, the motion direction or the motion speed of the UE)) to the OAM 123, and can query ID information of SSB beams of recommended cells for paging the UE at the current time from the OAM based on the query assistance information. Then, in operation 1212, the NG-RAN node may transmit the RRC paging messages on the corresponding cell(s) and SSB beam(s) to page the UE. For example, the NG-RAN node may transmit RRC paging on the known and stored cells accessed by the UE in the connected state and on SSB beams obtained by the query.

Continuing to refer to FIG. 12A, after receiving the paging message, the UE may initiate a random access in operation 1214 and an RRC resume procedure in operation 1216, so that the UE resumes to the connected state for transmission and reception of signaling and user plane data.

The method of paging the UE by the RAN according to some embodiments of the disclosure has been described above in conjunction with FIG. 12A. In the method of FIG. 12A, if the first paging by the RAN based on one or more SSB beams in a cell fails, the RAN may decide to expand the paging range. In embodiments of the disclosure, the following possible schemes, including at least one of scheme h-1 or scheme h-2, may be adopted.

Scheme h-1

The RAN may transmit the RRC paging message again, and page the UE on all SSB beams in each cell visited by the UE which are stored before.

Scheme h-2

For scheme h-1, if the paging based on cells fails, the RAN will continue to expand the paging range. For example, the RAN may utilize an existing RAN paging mechanism to expand the paging range.

For example, based on an RNA (RAN-Based Notification Area) configured for the UE, the RAN may select cells configured with the same RNA to transmit the RRC paging message.

For example, if there are cells of a neighboring NG-RAN node configured in the same RNA, it may be necessary to transmit the Xn RAN PAGING message to a neighboring NG-RAN node, and then the neighboring NG-RAN node continues to initiate RRC paging on the corresponding cell(s).

Considering the paging schemes described above, an embodiment of the disclosure provides a selection method of a paging scheme, as shown in FIG. 12B.

Referring to FIG. 12B, in operation 12b-1, a UE may be paged based on one or more SSB beams, as the method described with reference to FIG. 12A.

If it is determined in operation 12b-3 that the paging fails, a RAN may decide to page the UE based on one or more cells in operation 12b-5, as described in the scheme h-1.

If it is determined in operation 12b-7 that the paging fails again, the RAN may decide to page the UE on all cells of an RNA configured for the UE in operation 12b-9, as described in scheme h-2.

In some implementations, if it is determined in operation 12b-3 that the paging based on SSB beams fails, the RAN may decide in operation 12b-11 to directly page the UE on all cells of an RNA configured for the UE, as described in scheme h-2.

The selection method of a paging scheme according to some embodiments of the disclosure has been described above in conjunction with FIG. 12B. Among the various operations described in FIG. 12B, some operations may be omitted or additional operations may be added to realize various selection methods of paging schemes.

Figure 13:
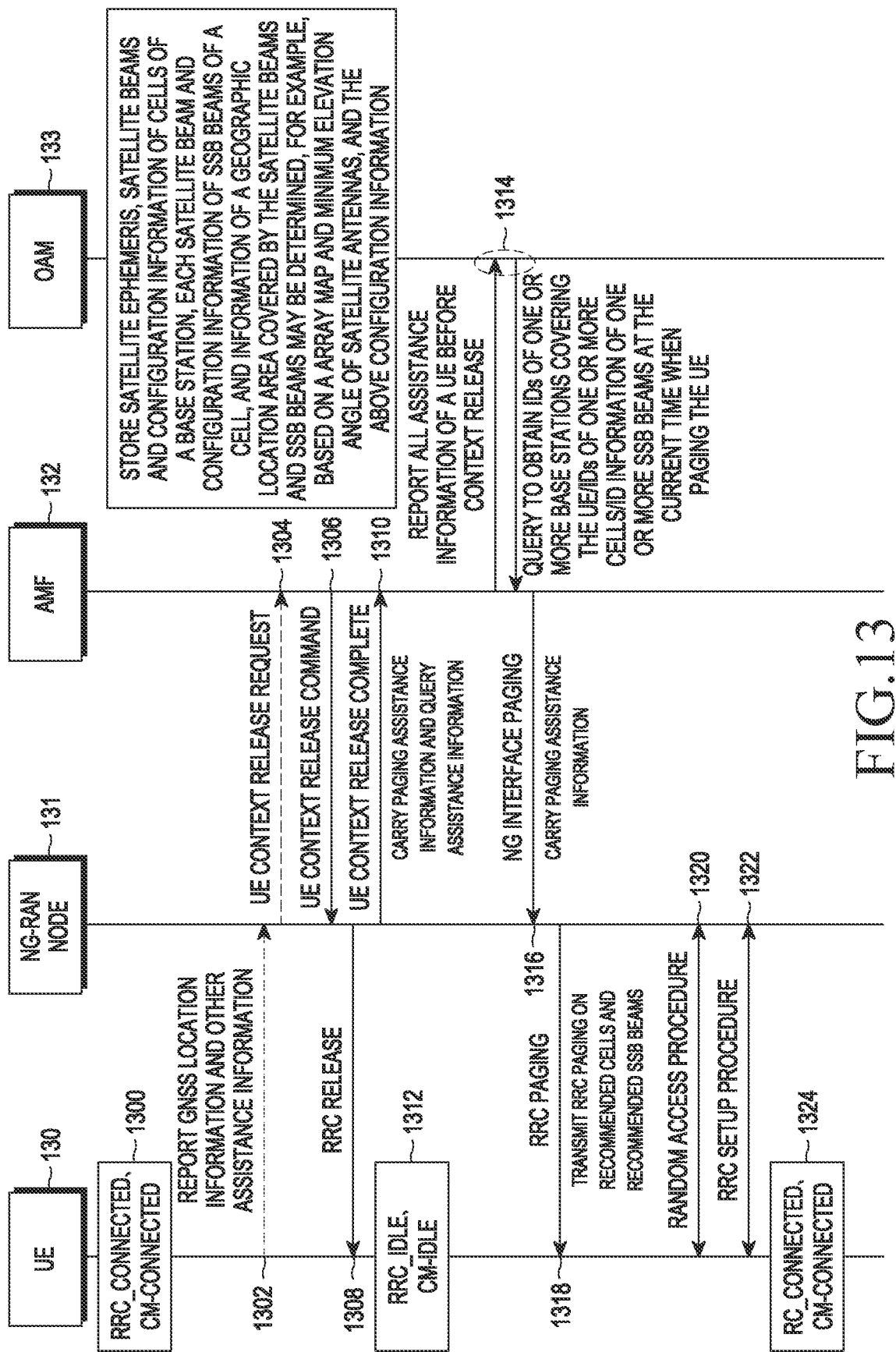
FIG. 13 illustrates a diagram of a method of paging a UE by a CN based on a UE location (where an AMF interacts with an OAM) according to some embodiments of the disclosure, where the method may be applicable to an NTN LEO satellite transparent transmission system, an on-board gNB satellite regenerative transmission system, or a future new next-generation communication system.

FIG. 13 illustrates a diagram of a method of paging a UE by a CN based on a UE location (where an AMF interacts with an OAM) according to some embodiments of the disclosure. The embodiments of FIG. 13 describe a flow of paging the UE initiated by the CN based on the UE location. For example, these embodiments are applicable to an NTN LEO satellite transparent transmission system (see FIG. 1), a GEO on-board gNB satellite regenerative transmission system (see FIG. 3), or a future new next-generation communication system.

In the embodiments of FIG. 13, the AMF may be responsible for interacting with a local or remote OAM with respect to assistance information for paging the UE reported by an NG-RAN node, to acquire ID information of recommended base stations, ID information of recommended cells and ID information of recommended SSB beams for paging the UE. Then, a CN paging procedure may be initiated, and ID information of recommended cells and corresponding SSB beams for paging the UE may be transmitted to a recommended NG-RAN node through an NG interface paging message, and then the NG-RAN node transmits RRC paging on the corresponding cell(s) and SSB beam(s).

It should be noted that although the following embodiments will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, the UE itself has a positioning capability (e.g., GNSS positioning capability) and a capability to monitor other assistance information (such as a UE type related to a motion capability of the UE, a motion direction or a motion speed of the UE). In this case, the UE may obtain location information (e.g., GNSS location information) and the other assistance information (such as the UE type related to the motion capability, the motion direction and the motion speed), and may report the GNSS location information and the other assistance information to the NG-RAN node through a new RRC message or an existing RRC message carrying a new IE in a connected state. A flow of UE reporting will be described in detail with reference to FIGS. 20 and 21.

In some implementations, if the UE does not have the GNSS positioning capability, the NG-RAN node may obtain the GNSS position information and the other assistance information (such as the UE type related to the motion capability, the motion direction or the motion speed of the UE) when the UE is in a connected state through a positioning mechanism implemented by 3GPP.

In embodiments of the disclosure, for convenience of description, the GNSS location information or the other assistance information (such as the UE type related to the motion capability, the motion direction or the motion speed of the UE) may be referred to as query assistance information.

It should be noted that the reporting procedure (procedure 1302) of the GNSS position and the other assistance information of the UE in FIG. 13 is an optional procedure, which is suitable for the UE having the GNSS positioning capability to report them to the NG-RAN node. No matter which mechanism is adopted, it may be assumed that the NG-RAN node already knows the GNSS location information and the other assistance information of the UE (such as the UE type related to the motion capability, the motion direction or the motion speed of the UE) before the UE enters an idle state.

It should also be noted that although GNSS location information is used for description in some implementations, the implementations of the disclosure are not limited to this, for example, any other suitable location information may be adopted to implement various implementations.

Referring to FIG. 13, in operation 1300, a UE may be in a CONNECTED state after accessing an NG-RAN node 131. For example, the UE may be in an RRC_CONNECTED state and a CM-CONNECTED state.

In operation 1304, a UE context release request procedure may be initiated by the NG-RAN node. For example, the UE context release request procedure may be initiated by the NG-RAN node for various reasons. In operation 1306, in response to a UE context release request from the NG-RAN node, an AMF 132 on the CN side transmits a UE context release command to the NG-RAN node 131. Or, the procedure of the UE context release command may be directly initiated by the AMF 132 on the CN side for various reasons.

In operation 1308, after receiving the UE context release command, the NG-RAN node 131 may initiate an RRC release procedure to the UE 130 to release radio resources of the UE 130, and at the same time release radio interface logical connections, related signaling and user plane resources of the UE 130.

After completion of the RRC release, in operation 1310, the NG-RAN node 131 may transmit a UE context release complete message confirming the completion of the RRC release to the AMF 132. For example, the context release complete message may indicate the completion of the release of the logical connections and related resources for the UE 130 on the NG-RAN node side.

After the completion of the RRC release, in operation 1312, the UE may enter an idle state. For example, the UE may be in an RRC_IDLE state and a CM-IDLE state.

In some implementations, when the UE is in the connected state, the NG-RAN node is capable of knowing which SSB beam or beams of a cell the UE has stayed in and corresponding stay time information. Therefore, the UE context release complete message in operation 1310 may include assistance information for paging the UE (for convenience of description, it may be referred to as "information for paging" or "paging assistance information" in the disclosure) and query assistance information. The paging assistance information may include information related to cells that have been visited by the UE and SSB beams. The query assistance information may include information related to a GNSS position of the UE or other assistance information (such as a UE type related to a motion capability, a motion direction or a motion speed of the UE).

In some examples, the paging assistance information may include one or more of the following information:
- ID information of one or more cells (such as NR Cell Identity or NR CGI, E-UTRA Cell Identity, or E-UTRA CGI)
- information related to time stayed in each of the one or more cells (which may be referred to as "information related to Time Stayed in Cell")
- ID information of one or more SSB beams that have been accessed in each of the one or more cells (such as SSB-Index) (which may be referred to as "ID information of SSB beams")
- information related to time stayed in each of the one or more accessed SSB beams (which may be referred to as "information related to Time Stayed in SSB Beam")

In some examples, the query assistance information may include one or more of the following information:
- GNSS location information of the UE (information such as a longitude, a latitude, or an altitude)
- other query assistance information (such as the UE type related to the motion capability, the motion direction or the motion speed of the UE, or a connected satellite ID, a satellite beam ID, among others)
- time stamp information In some examples, the ID information of one or more cells in the paging assistance information may include ID information of one or more cells of the current NG-RAN node that have been visited by the UE. In a case of handover from a source NG-RAN node to the current NG-RAN node, the ID information of one or more cells in the paging assistance information may include ID information of source cells (i.e., cells of the source NG-RAN node) reported by the source NG-RAN node to the current target NG-RAN node in a handover procedure. In this case, the target NG-RAN node may record or store the information and then report the information to a CN. In addition, in this case, it may also include reporting ID information of the source NG-RAN node (such as a Global RAN Node ID) to the CN, which will be described in detail later with reference to FIGS. 17 and 18.

In some examples, the ID information of SSB beams in the paging assistance information may include ID information of accessed SSB beams in visited cells of the current NG-RAN node. In a case of handover from the source NG-RAN node to the current NG-RAN node, the ID information of SSB beams in the paging assistance information may include ID information of accessed SSB beams of source cells reported by the source NG-RAN node to the current target NG-RAN node in a handover procedure. In this case, the target NG-RAN node may record or store the information and then report the information to the CN, which will be described in detail later with reference to FIGS. 17 and 18.

In addition, among the example information listed above, for example, the Time stayed in Cell may include at least one of a length of time to stay in a corresponding cell, or a starting and ending time of stay. For example, the Time Stayed in SSB beam may include at least one of a length of time to stay in a corresponding SSB beam, or a starting and ending time of the stay. In some examples, the time stamp information may be used to indicate a starting and ending time point of the stay in each cell of cells that have been accessed by the UE and a starting and ending time point of the stay in each of SSB beams of the each cell that have been accessed by the UE, or a time point when the UE is in a corresponding GNSS position and a corresponding state of the query assistance information. For example, the time stamp information may be information in a UTC format.

In some implementations, considering that the information related to the recommended cells for paging may be transmitted to a CN (such as an AMF) through a UE context release complete message (such as UE CONTEXT RELEASE COMPLETE message) in 5G communication systems, thus, the paging assistance information and the query assistance information may be transmitted to the CN (such as the AMF) by a newly added IE to the UE context release complete message (such as UE CONTEXT RELEASE COMPLETE message), thereby saving signaling overhead. However, the embodiments of the disclosure are not limited thereto. In some embodiments, the paging assistance information and query assistance information may be transmitted from the NG-RAN node 131 to the AMF 132 through separate messages. For example, the paging assistance information and query assistance information may be transmitted by newly added NG interface messages or other NG interface messages.

When the UE 130 is in the idle state (operation 1312), if there is downlink signaling or user plane data to be transmitted to the UE 130, the AMF 132 on the CN side may need to page the UE 130.

Referring to FIG. 13, before initiating an NG paging message, in operation 1314, the AMF 132 may interact with an OAM 133.

In some embodiments, the OAM 133 may be a local OAM or remote OAM. For example, the OAM 133 may store various configuration information, such as satellite ephemeris, information on mapping of satellite beams to a configuration of cells of a base station, and/or information on mapping of each satellite beam to a configuration of SSB beams of a cell, among others. For example, information on a geographic location area covered by the satellite beams and SSB beams of each cell may be calculated based on a preconfigured or preset array map and minimum elevation angle of satellite antennas, and the above stored configuration information.

In operation 1314, the AMF 132 may report all assistance information (including the paging assistance information and the query assistance information) with time stamps obtained before context release to the OAM 133, and can query ID information of recommended base stations, ID information of recommended cells, and ID information of recommended SSB beams for paging the UE at the current time from the OAM 133 based on all assistance information.

In operation 1316, the AMF 132 may transmit an NG interface paging message to the NG-RAN node 131 to page the UE 130. For example, the paging assistance information for paging the UE may be carried in the NG interface paging message, and includes at least one of information related to the recommended cells and information related to the recommended SSB beams.

In some examples, the paging assistance information carried in the NG interface paging message may include one or more of the following information:
  ID information of one or more cells (such as NR Cell Identity or NR CGI, E-UTRA Cell Identity, or E-UTRA CGI)
  ID information of one or more SSB beams in each of the one or more cells (such as SSB-Index) (which may be referred to as "ID information of SSB beams")

In some examples, the ID information of one or more cells in the paging assistance information carried in the NG interface paging message may be ID information of cells in the NG-RAN node serving the UE when the UE context is released or ID information of cells in a new NG-RAN node.

Since an LEO satellite has a feature of periodic mobility, for an on-board gNB satellite regenerative transmission system, when a CN pages a UE, one or more new NG-RAN nodes may be selected; or, the same NG-RAN node may also be selected. For LEO satellite transparent transmission systems, when a CN pages a UE, the same NG-RAN node is likely to be selected.

Continuing to refer to FIG. 13, in operation 1318, after receiving the paging assistance information for paging the UE 130, the NG-RAN node 131 may transmit an RRC paging message to the UE 130 based on the paging assistance information to page the UE 130. In some implementations, the NG-RAN node 131 may select a corresponding cell(s) and corresponding SSB beam(s) based on the paging assistance information.

In embodiments of the disclosure, when the CN pages the UE, by utilizing the paging assistance information, the NG-RAN node may page the UE on the one or more recommended cells and one or more recommended SSB beams in each of the one or more cells based on the paging assistance information, thereby paging the UE more accurately.

Continuing to refer to FIG. 13, when the UE 130 receives the RRC paging message, a random access procedure may be initiated in operation 1320 and an RRC setup procedure may be initiated in operation 1322. Through the random access procedure and RRC setup procedure, the UE 130 may resume to the connected state for transmission or reception of signaling and user plane data in operation 1324.

The method of paging the UE by the CN according to some embodiments of the disclosure has been described above in conjunction with FIG. 13. In the method of FIG. 13, if the paging by the NG-RAN node based on one or more recommended SSB beams in each recommended cell fails, the CN or NG-RAN node may expand the paging range. In embodiments of the disclosure, the following possible schemes, including at least one of scheme i-1, scheme i-2, scheme i-3 or scheme i-4, may be adopted.

Scheme i-1

Indication information (e.g., an IE including the indication information) is carried in an initial NG interface paging message, and is used to indicate to the NG-RAN node that if the first paging based on SSB beams of a cell fails, the paging range will be directly expanded. For example, the RRC paging message may be transmitted on all SSB beams in each of the one or more recommended cells to expand the paging range.

Scheme i-2

If the CN knows that the first paging based on SSB beams of a cell fails, the CN may decide to expand the paging range. For example, the CN may transmit the NG interface paging message again, where the NG interface paging message only carries the ID information of the one or more recommended cells for paging the UE. The NG-RAN node, after receiving the second NG interface paging message, pages the UE on all SSB beams in each of the one or more recommended cells.

Scheme i-3

If the CN knows that the first paging based on SSB beams of a cell fails, the CN may decide to expand the paging range. For example, the CN may utilize an existing CN paging mechanism to expand the paging range. Particularly, the CN may select an NG-RAN node of cells configured with a corresponding TAI to transmit the NG interface paging message (such as an NG PAGING message) on one TA or multiple TAs (such as a TA List) based on a configured Registration Area of the UE, and then the NG-RAN node selects cells configured with the corresponding TAI to transmit the RRC paging message (such as an RRC PAGING message) to page the UE.

Scheme i-4

For scheme i-1 or scheme i-2, if the paging of the UE based on recommended cells fails, the CN may continue to expand the paging range. For example, the existing CN paging mechanism described in scheme i-3 may be utilized to select to transmit the NG interface paging message (such as an NG PAGING message) to an NG-RAN node of cells configured with a corresponding TAI on one TA or multiple TAs (TA List) based on a configured Registration Area of the UE, and then the NG-RAN node may select cells configured with the corresponding TAI to transmit the RRC paging message (such as an RRC PAGING message) to page the UE.

With regard to example methods of selecting or combining paging the schemes i-1, i-2, i-3 or i-4, reference may be made to the embodiments described in conjunction with FIG. 9B.

Figure 14:
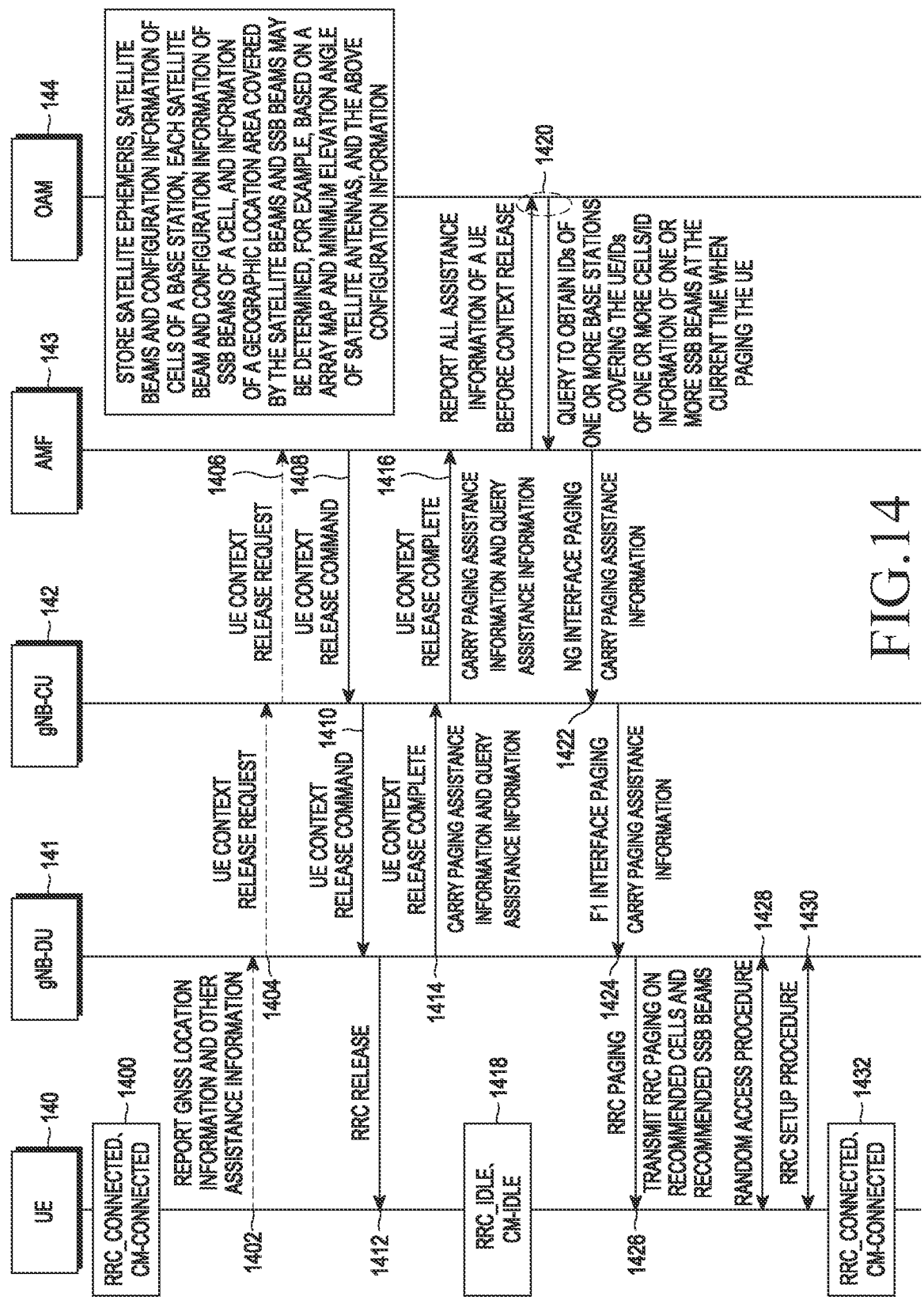
FIG. 14 illustrates a diagram of a method of paging a UE by a CN based on a UE location (where an AMF interacts with an OAM) according to some embodiments of the disclosure, where the method may be applicable to an NTN LEO satellite transparent transmission system in which a CU and a DU are split, an LEO on-board gNB-DU satellite regenerative transmission system, or a future new next-generation communication system.

FIG. 14 illustrates a diagram of a method of paging a UE by a CN based on a UE location (where an AMF interacts with an OAM) according to some embodiments of the disclosure. The embodiments of FIG. 14 describe a flow of paging the UE initiated by the CN based on the UE location. For example, these embodiments may be applicable to a CU-DU split NTN LEO satellite transparent transmission system (see FIG. 2), an LEO on-board gNB-DU satellite regenerative transmission system (see FIG. 4), or a future new next-generation communication system.

It should be noted that although the embodiments related to FIG. 14 will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, an AMF 143 may be responsible for interacting with a local or remote OAM 144 with respect to assistance information reported by a gNB-CU to obtain ID information of SSB beams of cells for paging the UE, where some of the assistance information may be reported to the gNB-CU through a gNB-DU. Then, the AMF 143 initiates a CN paging procedure, and transmits ID information of recommended cells and corresponding SSB beams for paging the UE to the gNB-CU through an NG PAGING message, then the gNB-CU transmits it to the gNB-DU through an F1 interface paging message, and then the gNB-DU transmits RRC paging on the corresponding cell(s) and SSB beam(s).

In some implementations, the UE itself has a positioning capability (e.g., GNSS positioning capability) and a capability to monitor other assistance information (such as a UE type related to a motion capability of the UE, a motion direction or a motion speed of the UE). In this case, the UE may obtain location information (e.g., GNSS location information and the other assistance information (such as the UE type related to the motion capability, the motion direction and the motion speed). Then, when the UE is in a connected state, through a new RRC message or by an existing RRC message carrying a new IE, the information is reported to the gNB-CU by means of a transparent container through the gNB-DU. Or, the UE may first report the information to the gNB-DU, and then the gNB-DU transmits the information to the gNB-CU through a UE context release complete message over an F1 interface when the UE context is released or a newly defined F1 interface message or other messages.

In some implementations, even if the UE does not have the GNSS positioning capability, the gNB-DU can acquire the GNSS location information and the other assistance information of the UE in the connected state through a positioning mechanism implemented by 3GPP, and then report it to the gNB-CU. Or the gNB-CU directly acquires the GNSS location information and the other assistance information of the UE in the connected state through the positioning mechanism implemented by 3GPP.

It should be noted that the reporting procedure (procedure 1402) of the UE GNSS and the other assistance information in FIG. 14 is an optional procedure, which is suitable for the UE having the GNSS positioning capability to report them to a gNB-DU 141. It may be assumed that the gNB-DU 141 already knows the GNSS location information and the other assistance information of the UE before the UE enters an idle state (IDLE state).

It should also be noted that although GNSS location information is used for description in some implementations, the implementations of the disclosure are not limited to this, for example, any other suitable location information may be adopted to implement various implementations.

Referring to FIG. 14, in operation 1400, the UE 140 may be in a connected state after accessing a RAN. For example, the UE 140 may be in an RRC_CONNECTED state and a CM-CONNECTED state.

In an implementation, in operation 1404, a UE context release request procedure may be initiated by the gNB-DU 141 through an F1 interface. Or, the UE context release request procedure may be initiated by a gNB-CU 142 through an NG interface in operation 1406. In operation 1408, in response to a UE context release request, a UE context release command procedure may be initiated by the AMF 143 through the NG interface. Accordingly, in operation 1410, the UE context release command procedure may be initiated by the gNB-CU 142 through the F1 interface.

In an implementation, the UE context release command procedure may be directly triggered by the AFM 143 in operation 1408 without any UE context release request. Accordingly, in operation 1410, the UE context release command procedure may be initiated by the gNB-CU 142 through the F1 interface.

No matter how the UE context release procedure is triggered, operations 1408 and 1410 and 1414 and 1416 in FIG. 14 are necessary processes for the whole UE context release procedure, and operations 1404 and 1406 are possible processes.

In some implementations, the gNB-DU 141 receives a UE context release command and carries an RRC release message by a container in operation 1410. Or, the gNB-CU may carry the RRC release message by a DL RRC MESSAGE TRANSFER.

Continuing to refer to FIG. 14, in operation 1412, after receiving the UE context release command, the gNB-DU 141 may initiate an RRC release procedure to the UE 140 to release radio resources of the UE 140, and at the same time release radio interface logical connections, related signaling and user plane resources of the UE 140.

After completion of the RRC release, in operation 1414, the gNB-DU 141 may transmit a UE context release complete message confirming the completion of the RRC release to the gNB-CU 142. In operation 1416, the gNB-CU 142 may transmit the UE context release complete message confirming the completion of the RRC release to the AMF 103. For example, the context release complete message may indicate the completion of the release of the logical connections and related resources for the UE 140 on the RAN node side.

After the completion of the RRC release, in operation 1418, the UE 140 may enter an idle state. For example, UE 140 may be in an RRC_IDLE state and a CM-IDLE state.

In some implementations, when the UE is in the connected state, the gNB-DU is capable of knowing information such as which SSB beam or beams of a cell the UE has stayed in and the stay durations. Therefore, the UE context release complete message in operation 1414 may include assistance information for paging the UE (for convenience of description, it may be referred to as "information for paging" or "paging assistance information" in the disclosure) and query assistance information. The paging assistance information may include information related to cells and SSB beams that have been visited by the UE. The query assistance information may include information related to a GNSS position of the UE or other assistance information (such as a UE type related to a motion capability, a motion direction or a motion speed of the UE).

In some examples, the paging assistance information may include one or more of the following information:
- ID information of one or more cells (such as NR Cell Identity or NR CGI, E-UTRA Cell Identity, or E-UTRA CGI)
- ID information of one or more SSB beams that have been accessed in each of the one or more cells (such as SSB-Index) (which may be referred to as "ID information of SSB beams")
- information related to time stayed in each of the one or more accessed SSB beams (which may be referred to as "information related to Time Stayed in SSB Beam")

In some examples, the query assistance information may include one or more of the following information:
- GNSS location information of the UE (information such as a longitude, a latitude, or an altitude)
- other query assistance information (such as the UE type related to the motion capability, the motion direction or the motion speed of the UE, or a connected satellite ID, a satellite beam ID, among others)
- time stamp information Among the example information listed above, for example, the Time Stayed in SSB beam may include at least one of a length of time stayed in a corresponding SSB beam or a starting and ending time of the stay.

In some examples, the ID information of one or more cells in the paging assistance information may include ID information of one or more cells of the current gNB-DU that have been visited by the UE. The gNB-DU may record or store the information and report it to the gNB-CU. Although the gNB-CU already knows the information, in order to establish a mapping relationship with the ID information of SSB beams, the information may be reported to the gNB-CU together with the ID information of SSB beams.

In some examples, the ID information of SSB beams in the paging assistance information may include ID information of SSB beams in the visited cells of the current gNB-DU that have been accessed. The gNB-DU may record or store the information and then report it to the gNB-CU.

In some implementations, the paging assistance information and query assistance information may be transmitted to the gNB-CU 142 through the UE context release complete message in operation 1414. However, the embodiments of the disclosure are not limited thereto. For example, the paging assistance information and query assistance information may be reported to the gNB-CU 142 by a newly added F1 interface message or other F1 interface messages.

In some examples, the time stamp information may be used to indicate a starting and ending time point of the stay in each of cells that have been accessed by the UE and a starting and ending time point of the stay in each of SSB beams of the each cell that have been accessed by the UE, or a time point when the UE is in a corresponding GNSS position and a corresponding state of the query assistance information. For example, the time stamp information may be information in a UTC format.

Because the gNB-CU already knows the information such as cells where the UE stays when it is in the connected state, the stay durations and a starting and ending time point of the stay, when the gNB-CU receives the paging assistance information and query assistance information reported from the gNB-DU, the paging assistance information and query assistance information may be combined with the known stayed cells and stay time information, and the combined information may be reported to the AMF through the UE context release complete (UE CONTEXT RELEASE COMPLETE) message over the NG interface. If the UE does not have the GNSS positioning capability, the gNB-CU can acquire the query assistance information, including the GNSS location information and the other assistance information of the UE in the connected state, through a positioning mechanism implemented by 3GPP. In this case, the gNB-CU may directly utilize the information. For example, it may be reported to the AMF through the UE context release complete (UE CONTEXT RELEASE COMPLETE) message over the NG interface.

In some implementations, the UE context release complete message in operation 1416 may include assistance information for paging the UE (for convenience of description, it may be referred to as "information for paging" or "paging assistance information" in the disclosure) and query assistance information. The paging assistance information may include information related to cells and SSB beams that have been visited by the UE. The query assistance information may include information related to a GNSS position of the UE or other assistance information (such as a UE type related to a motion capability, a motion direction or a motion speed of the UE).

In some examples, the paging assistance information may include one or more of the following information:
- ID information of one or more cells (such as NR Cell Identity or NR CGI, E-UTRA Cell Identity, or E-UTRA CGI)
- information related to time stayed in each of the one or more cells (which may be referred to as "information related to Time Stayed in Cell")
- ID information of one or more SSB beams that have been accessed in each of the one or more cells (such as SSB-Index) (which may be referred to as "ID information of SSB beams")
- information related to time stayed in each of the one or more accessed SSB beams (which may be referred to as "information related to Time Stayed in SSB Beam")

In some examples, the query assistance information may include one or more of the following information:
- GNSS location information of the UE (information such as a longitude, a latitude, or an altitude)
- other query assistance information (such as the UE type related to the motion capability, the motion direction or the motion speed of the UE, or a connected satellite ID, a satellite beam ID, among others)
- time stamp information In addition, among the example information listed above, for example, the Time stayed in Cell may include at least one of a length of time of the stay in a corresponding cell or a starting and ending time of the stay. For example, the Time Stayed in SSB beam may include at least one of a length of time to stay in a corresponding SSB beam or a starting and ending time of the stay.

In some examples, the ID information of one or more cells in the paging assistance information may include ID information on one or more cells of the gNB-DU that have been visited by the UE before the UE enters the idle state, the ID information on the one or more cells of the gNB-DU that are reported by the gNB-DU 141 to the gNB-CU 142 through the UE context release complete message in operation 1414 or by utilizing other F1 interface information. Or, in a case where the current target gNB-DU 141 is accessed due to inter-DU mobility, the paging assistance information may also include ID information of visited source cells and/or information related to time stayed in the source cells that is reported by a source gNB-DU to the gNB-CU 142 in an access procedure. In this case, the gNB-CU 142 may record and store the information, and then report it to the CN. The reporting procedure of the paging assistance information involving inter-DU mobility will be described in detail later with reference to FIG. 19.

In some examples, the ID information of SSB beams in the paging assistance information may include ID information on accessed SSB beams of cells on the gNB-DU that have been visited by the UE before the UE enters the idle state, the ID information on the accessed SSB beams being reported by the gNB-DU 141 to the gNB-CU 142 through the UE context release complete message in procedure 1414 or by utilizing other F1 interface information. Or, in a case where the current target gNB-DU is accessed due to inter-DU mobility, the paging assistance information may also include ID information of accessed SSB beams in source cells reported by the source gNB-DU to the gNB-CU in an access procedure. In this case, the gNB-CU may record and store the information, and then report it to the CN. The reporting procedure of the paging assistance information involving inter-DU mobility will be described in detail later with reference to FIG. 19.

In some examples, the time stamp information may be used to indicate a starting and ending time point of the stay in each cell of cells that have been accessed by the UE and a starting and ending time point of the stay in each of SSB beams of the each cell that have been accessed by the UE, or a time point when the UE is in a corresponding GNSS position and a corresponding state of the query assistance information. For example, the time stamp information may be information in a UTC format.

In some implementations, considering that the information related to the recommended cells for paging may be transmitted to a CN (such as an AMF) through a UE context release complete message (such as UE CONTEXT RELEASE COMPLETE message) in 5G communication systems, thus, the paging assistance information and the query assistance information may be transmitted to the CN (such as the AMF) by a newly added IE to the UE context release complete message (such as UE CONTEXT RELEASE COMPLETE message), thereby saving signaling overhead. However, the embodiments of the disclosure are not limited thereto. In some embodiments, the paging assistance information and query assistance information may be transmitted from the gNB-CU 142 to the AMF 143 through separate messages. For example, the paging assistance information and query assistance information may be transmitted by newly added NG interface messages or other NG interface messages.

Referring to FIG. 14, the AMF 143 receives the paging assistance information and query assistance information in operation 1416, and stores the information and uses it for subsequent paging of the UE.

When the UE 140 is in the idle state (operation 1418), if there is downlink signaling or user plane data to be transmitted to the UE 140, the AMF 143 on the CN side may need to page the UE 140.

Referring to FIG. 14, before transmitting the NG paging message, in operation 1420, the AMF 143 may interact with the OAM 144.

In some implementations, the OAM 144 may be a local OAM or remote OAM. For example, the OAM 143 may store various configuration information, such as satellite ephemeris, information on mapping of satellite beams to a configuration of cells of a base station, and/or information on mapping of each satellite beam to a configuration of SSB beams of a cell, among others. For example, information on a geographic location area covered by the satellite beams and SSB beams of each cell may be calculated based on a preconfigured or preset array map and minimum elevation angle of satellite antennas, and the above stored configuration information.

In operation 1420, the AMF 143 may report all assistance information (including the paging assistance information and the query assistance information) with time stamps obtained before context release to the OAM 144, and can query ID information of recommended base stations, ID information of recommended cells, and ID information of recommended SSB beams for paging the UE at the current time from the OAM 144 based on all assistance information.

In operation 1422, the AMF 143 may transmit an NG interface paging message to a selected corresponding base station (such as the gNB-CU) to page the UE 140. For example, the paging assistance information for paging the UE may be carried in the NG interface paging message, and includes at least one of information related to the recommended cells and information related to the recommended SSB beams. It should be noted that although FIG. 14 shows that the AMF 143 selects the gNB-CU 142 to transmit the interface paging message. However, the embodiments of the disclosure are not limited thereto. For example, the AMF 143 may select another gNB-CU to transmit the interface paging message.

In some examples, the paging assistance information carried in the NG interface paging message may include one or more of the following information:

ID information of one or more DUs (such as a gNB-DU ID)

ID information of one or more cells (such as NR Cell Identity or NR CGI, E-UTRA Cell Identity, or E-UTRA CGI) (cells in a DU serving the UE when the UE context is released before or cells in a new DU)

ID information of one or more SSB beams in each of the one or more cells (such as SSB-Index) (which may be referred to as "ID information of SSB beams")

In some examples, the ID information of one or more cells in the paging assistance information carried in the NG interface paging message may be ID information of cells in a DU serving the UE when the UE context is released or ID information of cells in a new DU.

Since an LEO satellite has a feature of periodic mobility, for an LEO on-board gNB-DU regenerative transmission system, one or more new gNB-DUs in the same gNB-CU may be selected when the CN pages the UE; or, the same gNB-DU may also be included. For a CU-DU split LEO satellite transparent transmission system, the same gNB-DU is likely to be selected when the CN pages the UE.

Continuing to refer to FIG. 14, in operation 1424, the gNB-CU 102 may transmit the paging assistance information to a new gNB-DU or the same gNB-DU (e.g., the gNB-DU 141) through the F1 interface paging message, where the paging assistance information carries information related to recommended cells (such as a Paging Cell List) and information related to recommended SSB beams.

In some examples, the paging assistance information carried in the F1 interface paging message may include one or more of the following information:
- ID information of one or more cells (such as NR Cell Identity or NR CGI, E-UTRA Cell Identity, or E-UTRA CGI)
- ID information of one or more SSB beams in each of the one or more cells (such as SSB-Index) (which may be referred to as "ID information of SSB beams")

In some examples, the ID information of one or more cells in the paging assistance information carried in the F1 interface paging message may include ID information of cells in a DU serving the UE when the UE context is released or ID information of cells in a new DU.

In some implementations, considering that the information related to the recommended cells for paging may be carried by the F1 interface paging message, including a Paging Cell List IE, in 5G communication systems, information related to recommended SSB beams for paging, including ID information of SSB beams, may be transmitted to the gNB-DU through the Paging Cell List IE. However, the embodiments of the disclosure are not limited thereto. In some implementations, the information related to the recommended SSB beams for paging may be transmitted to the gNB-DU by a newly added IE to the F1 interface paging message.

Continuing to refer to FIG. 14, after receiving the paging assistance information for paging the UE through the F1 interface paging message, the gNB-DU 141 may transmit an RRC paging message to the UE 140 based on the paging assistance information to page the UE 140. In some implementations, the gNB-DU 141 may select a corresponding cell(s) and corresponding SSB beam(s) based on the paging assistance information, and transmit the RRC paging messages on the corresponding cell(s) and corresponding SSB beam to page the UE 140.

In embodiments of the disclosure, when the CN pages the UE, by utilizing the paging assistance information, the gNB-DU may page the UE on the one or more recommended cells and one or more recommended SSB beams in each of the one or more cells based on the paging assistance information, thereby paging the UE more accurately.

Continuing to refer to FIG. 14, when the UE 140 receives the RRC paging message, a random access procedure may be initiated in operation 1428 and an RRC setup procedure may be initiated in operation 1430. Through the random access procedure and RRC setup procedure, the UE 140 may resume to the connected state for transmission or reception of signaling and user plane data in operation 1432.

The method of paging the UE by the CN according to some embodiments of the disclosure has been described above in conjunction with FIG. 14. In the method of FIG. 14, if the paging by the CN based on one or more SSB beams in each recommended cell fails, the CN, gNB-CU or gNB-DU may decide to expand the paging range. In embodiments of the disclosure, the following possible schemes, including at least one of scheme j-1, scheme j-2, scheme j-3, scheme j-4 or scheme j-5, may be adopted.

Scheme j-1

Indication information (e.g., an IE including the indication information) is carried in an initial F1 interface paging message, and is used to indicate to the gNB-DU that if the first paging based on SSB beams of a cell fails, the paging range will be directly expanded. For example, the paging message may be transmitted on all SSB beams in each of the one or more recommended cells to expand the paging range.

Scheme j-2

Indication information (e.g., an IE including the indication information) is carried in an initial NG interface paging message, and is used to indicate to the gNB-CU that if the first paging based on SSB beams of a cell fails, the paging range will be directly expanded. For example, the paging message may be transmitted on all SSB beams in each of the one or more recommended cells to expand the paging range. Based on the indication information, the gNB-CU may transmit the second F1 interface paging message to the gNB-DU, where the F1 interface paging message only carries ID information of one or more recommended cells for paging the UE. The gNB-DU may transmit the paging message based on all SSB beams in each of the one or more recommended cells.

Scheme j-3

If the CN knows that the first paging based on SSB beams of a cell fails, the CN may decide to expand the paging range. For example, the CN may transmit the NG interface paging message again, where the NG interface paging message only carries the ID information of the one or more recommended cells for paging the UE. The gNB-CU transmits the second F1 interface paging message to the gNB-DU after receiving the second NG interface paging message, where the F1 interface paging message only carries ID information of one or more recommended cells for paging the UE. The gNB-DU may transmit the paging message based on all SSB beams in each of the one or more recommended cells.

Scheme j-4

If the CN knows that the first paging based on SSB beams of a cell fails, the CN may decide to expand the paging range. For example, the CN may utilize an existing CN paging mechanism to expand the paging range. Particularly, the CN may select a gNB-CU of cells configured with a corresponding TAI to transmit the NG interface paging message (such as an NG PAGING message) on one TA or multiple TAs (such as a TA List) based on a configured Registration Area of the UE. In a case where the gNB-CU receives the second NG interface paging message, the gNB-CU may select the cells configured with a corresponding TAI to transmit the F1 interface paging message, where the F1 interface paging message carries ID information (such as a Paging Cell List IE) of target cells for paging the UE. Then, after receiving the F1 interface paging message, the gNB-DU may transmit the RRC paging message (such as an RRC PAGING message) on all SSB beams of the target cells based on the ID information of the target cells to page the UE.

Scheme j-5

For scheme j-1, scheme j-2 or scheme j-3, if the paging of the UE based on recommended cells fails, the CN may continue to expand the paging range. For example, the existing CN paging mechanism described in scheme j-4 may be utilized to select to transmit the NG interface paging message (such as an NG PAGING message) to a gNB-CU of cells configured with a corresponding TAI on one TA or multiple TAs (TA List) based on a configured Registration Area of the UE. In a case where the gNB-CU receives the NG interface paging message, the gNB-CU may select the cells configured with a corresponding TAI to transmit the F1 interface paging message, where the F1 interface paging message carries ID information (such as a Paging Cell List IE) of target cells for paging the UE. Then, after receiving the F1 interface paging message, the gNB-DU may transmit the RRC paging message (such as an RRC PAGING message) on all SSB beams of the target cells based on the ID information of the target cells to page the UE.

With regard to the example methods of selecting or combining the above paging scheme j-1, scheme j-2, scheme j-3, scheme j-4 or scheme j-5, reference may be made to the embodiments described in connection with FIG. 10B.

Figure 15:
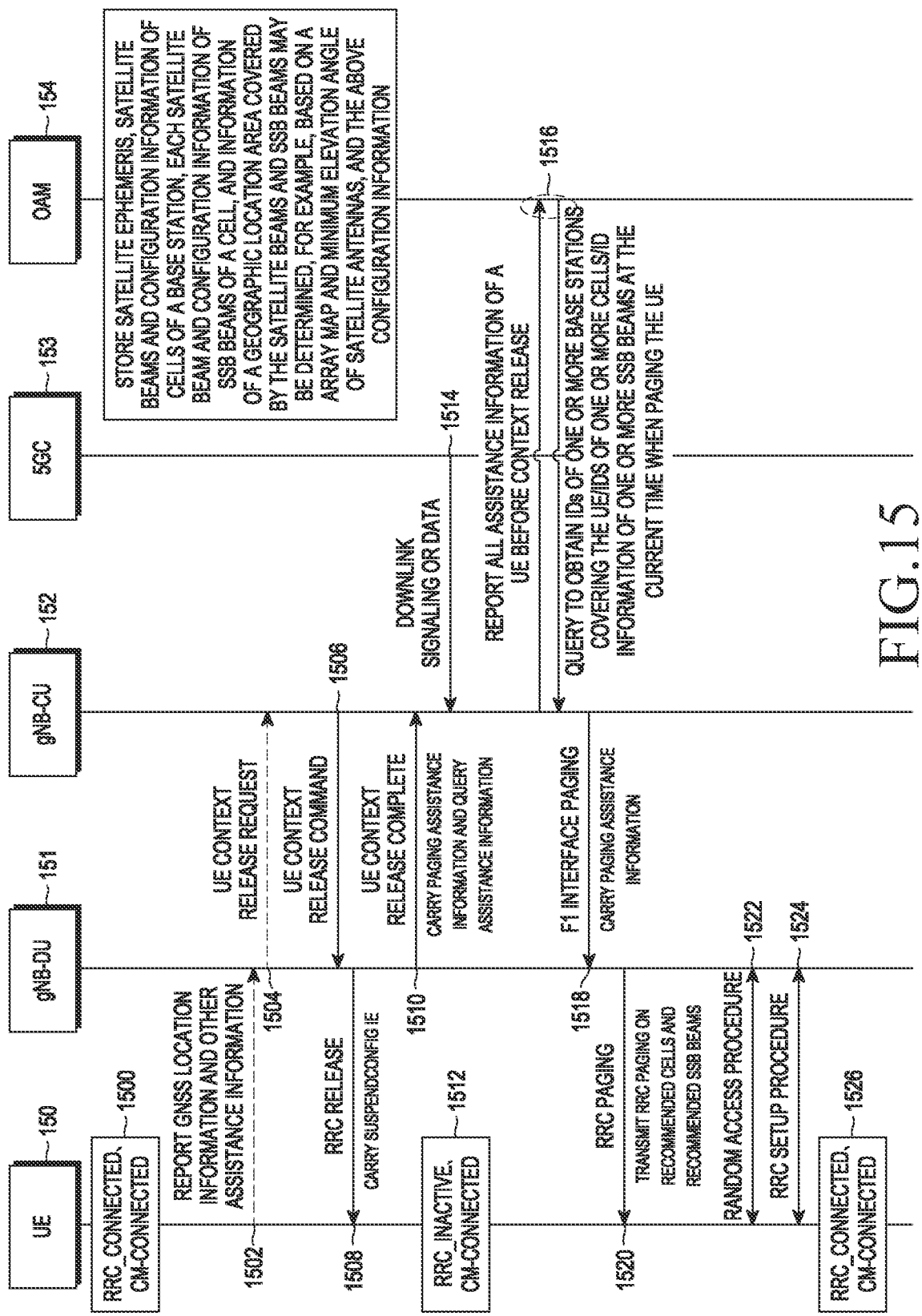
FIG. 15 illustrates a diagram of a method of paging a UE by a RAN based on a UE location (where a gNB-CU interacts with an OAM) according to some embodiments of the disclosure, where the method may be applicable to an NTN LEO satellite transparent transmission system in which a CU and a DU are split, an LEO on-board gNB-DU satellite regenerative transmission system, or a future new next-generation communication system.

FIG. 15 illustrates a diagram of a method of paging a UE by a RAN based on a UE location (where a gNB-CU interacts with an OAM) according to some embodiments of the disclosure. The embodiments of FIG. 15 describe a flow of paging the UE initiated by the RAN based on the UE location. For example, these embodiments may be applicable to a CU-DU split NTN LEO satellite transparent transmission system (see FIG. 2), an LEO on-board gNB-DU satellite regenerative transmission system (see FIG. 4), or a future new next-generation communication system.

It should be noted that although the embodiments related to FIG. 15 will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, the gNB-CU may be responsible for interacting with a local or remote OAM with respect to assistance information reported by the gNB-CU to acquire ID information of SSB beams of a cell for paging the UE, where some of the assistance information may be reported to the gNB-CU first through a gNB-DU. When the gNB-CU receives downlink signaling or data, a RAN paging procedure needs to be initiated, and ID information of recommended cells and corresponding SSB beams for paging the UE is transmitted to the gNB-DU through an F1 interface paging message, and then the gNB-DU transmits RRC paging on the corresponding cell(s) and SSB beam(s).

In some implementations, the UE itself has a positioning capability (e.g., GNSS positioning capability) and a capability to monitor other assistance information (such as a UE type related to a motion capability of the UE, a motion direction or a motion speed of the UE). In this case, the UE may obtain location information (e.g., GNSS location) information and the other assistance information (such as the UE type related to the motion capability, the motion direction and the motion speed) of the UE. Then, when the UE is in a connected state, through a new RRC message or by an existing RRC message carrying a new IE, the information is reported to the gNB-CU by means of a transparent container through the gNB-DU. Or, the UE may first report the information to the gNB-DU, and then the gNB-DU transmits the information to the gNB-CU through a UE context release complete message over an F1 interface when the UE context is released or a newly defined F1 interface message or other messages.

In some implementations, even if the UE does not have the GNSS positioning capability, the gNB-DU can acquire the GNSS location information and the other assistance information of the UE in the connected state through a positioning mechanism implemented by 3GPP, and then report it to the gNB-CU. Or the gNB-CU directly acquires the GNSS location information and the other assistance information of the UE in the connected state through the positioning mechanism implemented by 3GPP.

It should be noted that the reporting procedure (procedure 1502) of the UE GNSS and the other assistance information in FIG. 15 is an optional procedure, which is suitable for the UE having the GNSS positioning capability to report them to the gNB-DU. It may be assumed that the gNB-DU already knows the GNSS location information and the other assistance information of the UE before the UE enters an IDLE state.

It should also be noted that although GNSS location information is used for description in some implementations, the implementations of the disclosure are not limited to this, for example, any other suitable location information may be adopted to implement various implementations.

Referring to FIG. 15, in operation 1500, a UE 150 may be in a connected state after accessing a RAN. For example, the UE 150 may be in an RRC_CONNECTED state and a CM-CONNECTED state.

In embodiments, for various reasons, a gNB-DU 151 may initiate a UE context release request procedure through an F1 interface in operation 1504. In operation 1506, in response to a UE context release request, a gNB-CU 152 may initiate a UE context release command procedure through the F1 interface in operation 1506.

In an implementation, the gNB-CU 152 may directly initiate the UE context release command procedure through the F1 interface in operation 1506 without any UE context release request.

No matter how the UE context release procedure is triggered, if the gNB-CU 152 decides that the UE 150 enters an inactive (such as RRC_INACTIVE) state, suspend configuration information (such as SuspendConfig IE) may be carried in an RRC release procedure to indicate that the UE will enter the inactive (such as RRC_INACTIVE) state and apply its suspend configuration information. The suspend configuration information may include information such as a configured RNA (such as RAN-Based Notification Area) of the UE, ID information of cells included in an RNA, and a value of a periodic RNA update timer.

In operation 1508, after receiving a UE context release command, the gNB-DU 151 may initiate an RRC release procedure to the UE 150 to release radio resources between the UE 150 and the RAN.

After completion of the RRC release, in operation 1510, the gNB-DU 151 may transmit a UE context release complete message confirming the completion of the RRC release to the gNB-CU 152. For example, the context release complete message may indicate the completion of the release of the logical connections and related resources for the UE 150 on the RAN side.

In some implementations, when the UE is in the connected state, the gNB-DU is capable of knowing which SSB beam or beams of a cell the UE has stayed in and corresponding stay time information. Therefore, the UE context release complete message in operation 1510 may include assistance information for paging the UE (for convenience of description, it may be referred to as "information for paging" or "paging assistance information" in the disclosure) and query assistance information. The paging assistance information may include information related to SSB beams and cells that have been visited by the UE. The query assistance information may include information related to a GNSS position of the UE or other assistance information (such as a UE type related to a motion capability, a motion direction or a motion speed of the UE).

In some examples, the paging assistance information may include one or more of the following information:
- ID information of one or more cells (such as NR Cell Identity or NR CGI, E-UTRA Cell Identity, or E-UTRA CGI)
- ID information of one or more SSB beams that have been accessed in each of the one or more cells (such as SSB-Index) (which may be referred to as "ID information of SSB beams")
- information related to time stayed in each of the one or more accessed SSB beams (which may be referred to as "information related to Time Stayed in SSB Beam")

In some examples, the query assistance information may include one or more of the following information:
- GNSS location information of the UE (information such as a longitude, a latitude, or an altitude)
- other query assistance information (such as the UE type related to the motion capability, the motion direction or the motion speed of the UE, or a connected satellite ID, a satellite beam ID, among others)
- time stamp information In addition, among the example information listed above, for example, the Time Stayed in SSB beam may include at least one of a length of time stayed in a corresponding SSB beam or a starting and ending time of the stay.

In some examples, the ID information of one or more cells in the paging assistance information may include ID information of one or more cells of the current gNB-DU that have been visited by the UE. The gNB-DU may record or store the information and report it to the gNB-CU. Although the gNB-CU already knows the information, in order to establish a mapping relationship with the ID information of SSB beams, the information may be reported to the gNB-CU together with the ID information of SSB beams.

In some examples, the time stamp information may be used to indicate a starting and ending time point of the stay in each cell of cells that have been accessed by the UE and a starting and ending time point of the stay in each of SSB beams of the each cell that have been accessed by the UE, or a time point when the UE is in a corresponding GNSS position and a corresponding state of the query assistance information. For example, the time stamp information may be information in a UTC format.

In some implementations, the paging assistance information and query assistance information may be transmitted to the gNB-CU 152 through the UE context release complete message in operation 1510. However, the embodiments of the disclosure are not limited thereto. For example, the paging assistance information and query assistance information may be reported to the gNB-CU 152 by newly added F1 interface messages or other F1 interface messages.

In some implementations, the gNB-CU may know cells where the UE stays when it is in the connected state, the stay durations, and a starting and ending time point of the stay. Or, in a case where the current target gNB-DU is accessed due to inter-DU mobility, ID information of source cells, ID information of SSB beams that have been accessed by the UE and stay time information (e.g., information such as the stay durations and a starting and ending time point of the stay) is reported by a source gNB-DU to the gNB-CU, and the gNB-CU records and stores the information for subsequent paging of the UE, as will be described with reference to FIG. 19. Therefore, when the gNB-CU receives the paging assistance information and query assistance information reported from the current gNB-DU, the paging assistance information and query assistance information may be combined with the known stayed cells and stay time information, and the combined information is stored and used for subsequent paging of the UE.

When there is downlink signaling or user data to be transmitted to the UE, the gNB-CU needs to initiate a procedure of paging the UE. The gNB-CU interacts with the OAM before initiating an F1 PAGING message.

When the UE 150 is in the idle state (operation 1512), if there is downlink signaling or user plane data to be transmitted to the UE 150 (operation 1514), the gNB-CU 152 may need to page the UE 150.

Referring to FIG. 15, before transmitting an F1 interface paging message, in operation 1516, the gNB-CU 152 may interact with the OAM 154.

In some implementations, the OAM 154 may be a local OAM or remote OAM. For example, the OAM 154 may store various configuration information, such as satellite ephemeris, information on mapping of satellite beams to a configuration of cells of a base station, and/or information on mapping of each satellite beam to a configuration of SSB beams of a cell, among others. For example, information on a geographic location area covered by the satellite beams and SSB beams of each cell may be calculated based on a preconfigured or preset array map and minimum elevation angle of satellite antennas, and the above stored configuration information.

In operation 1516, the gNB-CU 152 may report all assistance information (including the paging assistance information and the query assistance information) with time stamps obtained before context release to the OAM 154, and can query ID information of recommended base stations, ID information of recommended cells, and ID information of recommended SSB beams for paging the UE at the current time from the OAM 154 based on all assistance information.

Since an LEO satellite has a feature of periodic mobility, for an on-board gNB-DU satellite regenerative transmission system, one or more new gNB-DUs in the same gNB-CU may be selected when the RAN pages the UE; or, the same gNB-DU may also be included. For a CU-DU split LEO satellite transparent transmission system, the same gNB-DU is likely to be selected when the RAN pages the UE.

Continuing to refer to FIG. 15, in operation 1518, the gNB-CU 152 may select a corresponding gNB-DU to transmit the paging assistance information through the F1 interface paging message, where the paging assistance information carries information related to recommended cells (such as a Paging Cell List) and information related to recommended SSB beams.

In some examples, the paging assistance information carried in the F1 interface paging message may include one or more of the following information:
- ID information of one or more cells (such as NR Cell Identity or NR CGI, E-UTRA Cell Identity, or E-UTRA CGI)
- ID information of one or more SSB beams in each of the one or more cells (such as SSB-Index) (which may be referred to as "ID information of SSB beams")

In some examples, the ID information of one or more cells in the paging assistance information carried in the F1 interface paging message may include ID information of cells in a DU serving the UE when the UE context is released or ID information of cells in a new DU.

In some implementations, considering that the information related to the recommended cells for paging, including a Paging Cell List IE, may be carried by the F1 interface paging message in 5G communication systems, information related to recommended SSB beams, including ID information of SSB beams, for paging may be transmitted to the gNB-DU through the Paging Cell List IE. However, the embodiments of the disclosure are not limited thereto. In some implementations, the information related to the recommended SSB beams for paging may be transmitted to the gNB-DU by a newly added IE to the F1 interface paging message.

Continuing to refer to FIG. 15, after receiving the paging assistance information for paging the UE through the F1 interface paging message, the gNB-DU 151 may transmit an RRC paging message to the UE 150 based on the paging assistance information to page the UE 150. In some implementations, the gNB-DU 151 may select a corresponding cell(s) and corresponding SSB beam(s) based on the paging assistance information, and transmit the RRC paging message on the corresponding cell(s) and corresponding SSB beam to page the UE 150.

In embodiments of the disclosure, when the RAN pages the UE, by utilizing the paging assistance information, the gNB-DU may page the UE on the one or more recommended cells and one or more recommended SSB beams in each of the one or more cells based on the paging assistance information, thereby paging the UE more accurately.

Continuing to refer to FIG. 15, when the UE 150 receives the RRC paging message, a random access procedure may be initiated in operation 1522 and an RRC setup procedure may be initiated in operation 1524. Through the random access procedure and RRC setup procedure, the UE 150 may resume to the connected state for transmission or reception of signaling and user plane data in operation 1526.

The method of paging the UE by the RAN according to some embodiments of the disclosure has been described above in conjunction with FIG. 15. In the method of FIG. 15, if the paging by the RAN based on one or more SSB beams in each recommended cell fails, the RAN may decide to expand the paging range. In embodiments of the disclosure, the following possible schemes, including at least one of scheme k-1, scheme k-2, scheme k-3, scheme k-4 or scheme k-5, may be adopted.

Scheme k-1

Indication information (e.g., an IE including the indication information) is carried in an initial F1 interface paging message, and is used to indicate to the gNB-DU that if the first paging based on SSB beams of a cell fails, the paging range will be directly expanded. For example, the RRC paging message may be transmitted on all SSB beams in each of the one or more recommended cells to expand the paging range.

Scheme k-2

If the gNB-CU knows that the first paging based on SSB beams of a cell fails, the gNB-CU may decide to expand the paging range. For example, the gNB-CU may transmit the F1 interface paging message again, where the F1 interface paging message only carries ID information (such as a Paging Cell List IE) of one or more recommended cells for paging the UE. Then, after receiving the second F1 interface paging message, the gNB-DU pages the UE on all SSB beams in each of the one or more recommended cells.

Scheme k-3

If the gNB-CU knows that the first paging based on SSB beams of a cell fails, the gNB-CU may decide to expand the paging range. For example, the gNB-CU may utilize an existing paging mechanism of the RAN to expand the paging range.

For example, the gNB-CU may select to transmit an F1 interface paging message to a gNB-DU of cells configured with the same RNA, where the F1 interface paging message carries ID information (such as a Paging Cell List IE) of target cells for paging the UE, and then the gNB-CU selects a corresponding cell to transmit the RRC paging message (such as an RRC PAGING message) to page the UE.

In addition, the gNB-CU may select to transmit an Xn interface paging message (such as an Xn RAN PAGING message) to a neighboring gNB-CU of cells configured with the same RNA, and then the neighboring gNB-CU selects a gNB-DU of cells configured with the same RNA to transmit the F1 interface paging message, where the F1 interface paging message carries target cell ID information (such as a Paging Cell List IE) for paging the UE, and then the gNB-DU selects a corresponding cell to transmit the RRC paging message (such as an RRC PAGING message) to page the UE. If a neighboring node of the gNB-CU is a non-split gNB, that is, an NG-RAN node, the NG-RAN node may select cells configured with the same RNA to transmit the RRC paging messages after receiving the Xn RAN PAGING message.

Scheme k-4

For scheme k-1 or scheme k-2, if the paging of the UE based on recommended cells fails, the gNB-CU may continue to expand the paging range. For example, the existing RAN paging mechanism described in scheme k-3 may be utilized to page the UE on all cells of an RNA (such as RAN-Based Notification Area) configured for the UE.

With regard to the example methods of selecting or combining the above paging scheme k-1, scheme k-2, scheme k-3, or scheme k-4, reference may be made to the embodiments described with reference to FIG. 11B.

Figure 16:
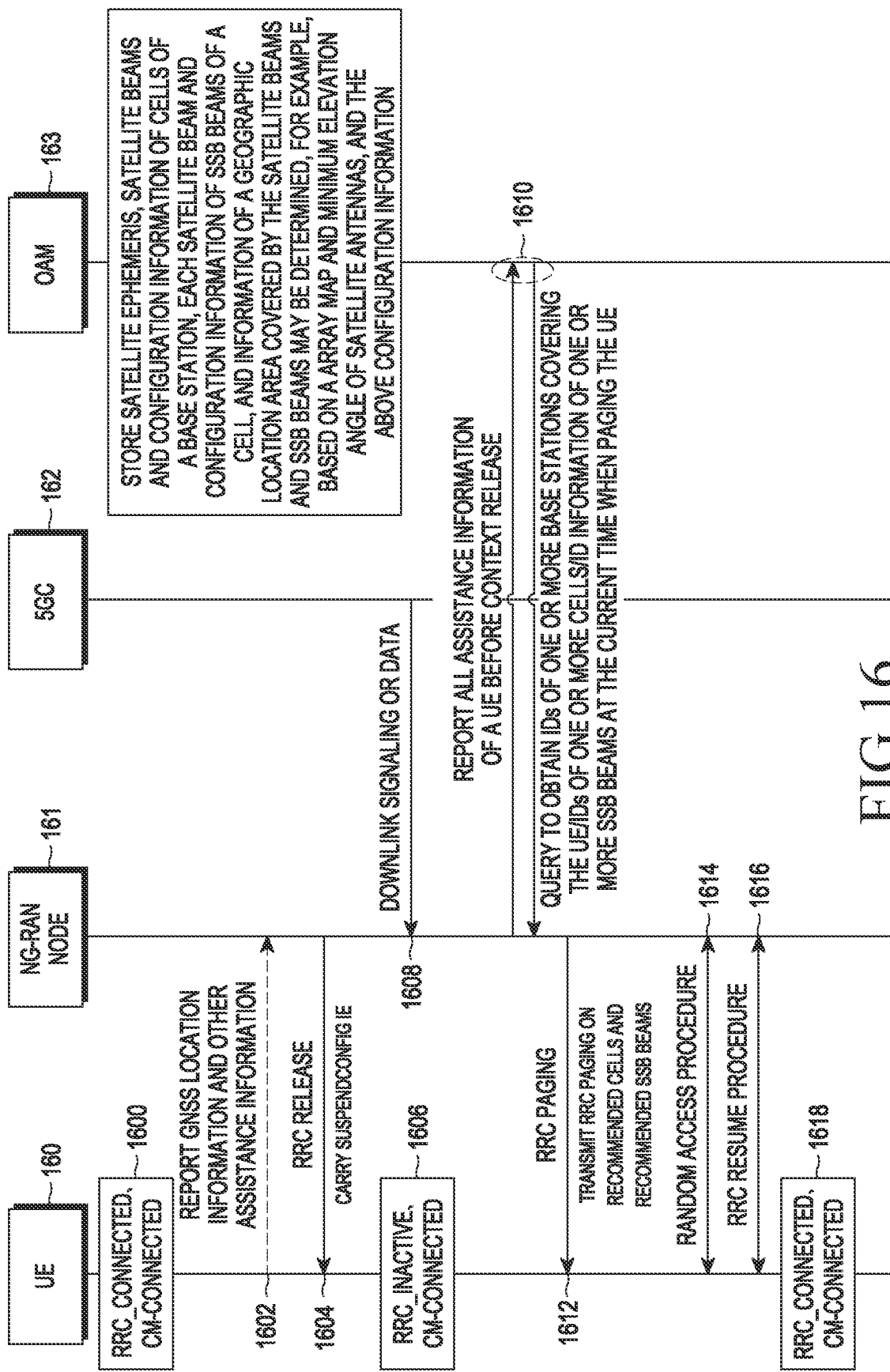
FIG. 16 illustrates a diagram of a method of paging a UE by a RAN based on a UE location (where an NG-RAN node interact with an OAM) according to some embodiments of the disclosure, where the method may be applicable to an NTN LEO satellite transparent transmission system, an LEO on-board gNB regenerative transmission system, or a future new next-generation communication system.

FIG. 16 illustrates a diagram of a method of paging a UE by a RAN based on a UE location (where an NG-RAN node interacts with an OAM) according to some embodiments of the disclosure. The embodiments in FIG. 16 describe a flow of paging the UE initiated by the RAN based on the UE location, for example, these embodiments may be applicable to an NTN LEO satellite transparent transmission system (see FIG. 1), an LEO on-board gNB satellite regenerative transmission system (see FIG. 3), or a future new next-generation communication system.

It should be noted that although the embodiments related to FIG. 16 will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, the NG-RAN node may be responsible for interacting with a local or remote OAM with respect to assistance information for paging the UE reported by the NG-RAN node, to acquire ID information of recommended base stations, ID information of recommended cells and ID information of recommended SSB beams for paging the UE.

In the embodiments described with reference to FIG. 16, interaction of new information between F1 and NG interfaces may not be involved, but the behavior description of the NG-RAN node with respect to the paging by the RAN may be defined. Therefore, these embodiments may be particularly applicable to the following situations: for a fixed-position immobile UE, it should always be in the coverage of a certain SSB beam in a cell; even if the UE moves, it is not out of the coverage of the SSB beam; or even if the UE moves, it is in the coverage of certain SSB beams, or even if the UE moves, it is in the coverage of one or more SSB beams in one or more neighboring cells.

In some implementations, the UE itself has a positioning capability (e.g., GNSS positioning capability) and a capability to monitor other assistance information (such as a UE type related to a motion capability of the UE, a motion direction or a motion speed of the UE). In this case, the UE may obtain location information (e.g., GNSS location information) and the other assistance information (such as the UE type related to the motion capability, the motion direction and the motion speed) of the UE, and may report the GNSS location information and the other assistance information to the NG-RAN node through a new RRC message or an existing RRC message carrying a new IE in a connected state. A flow of UE reporting will be described in detail with reference to FIGS. 20 and 21.

In some implementations, if the UE does not have the GNSS positioning capability, the NG-RAN node may obtain the GNSS position information and the other assistance information (such as the UE type related to the motion capability, the motion direction or the motion speed of the UE) when the UE is in a connected state through a positioning mechanism implemented by 3GPP.

In embodiments of the disclosure, for convenience of description, the GNSS location information or the other assistance information (such as the UE type related to the motion capability, the motion direction or the motion speed of the UE) may be referred to as query assistance information.

It should be noted that although GNSS location information is used for description in some implementations, the implementations of the disclosure are not limited to this, for example, any other suitable location information may be adopted to implement various implementations.

The reporting procedure (operation 1602) of the query assistance information (such as the UE GNSS and the other assistance information) in FIG. 16 is an optional procedure, which is suitable for a case that the UE has the GNSS positioning capability and may report the query assistance information to the NG-RAN node. No matter which mechanism is adopted, it may be assumed that before the UE enters the INACTIVE state, the NG-RAN node already knows the GNSS location information (such as a longitude, a latitude, or an altitude), the time stamp information, and the other assistance information (such as the UE type related to the motion capability, the motion direction or the motion speed of the UE).

For various reasons, if the NG-RAN node decides that the UE enters the inactive (such as RRC_INACTIVE) state, suspend configuration information (SuspendConfig IE) will be carried in an RRC release procedure to indicate that the UE will enter the RRC_INACTIVE state and apply its suspend configuration information. The suspend configuration information may include information such as a configured RNA (such as RAN-Based Notification Area) of the UE, ID information of cells included in an RNA, and a value of a periodic RNA update timer.

After completion of the RRC release, in operation 1606, the UE 160 may enter an inactive state. For example, the UE 160 may be in an RRC_INACTIVE state and a CM-CONNECTED state.

When the UE is in the inactive (such as RRC_INACTIVE) state, if there is downlink signaling or user plane data transmitted from a 5GC to the UE and the downlink signaling or user plane data arrives at an NG-RAN node 161 by operation 1608, the NG-RAN node 161 needs to page the UE. Because the NG-RAN node knows IDs of cells where the UE stays when it is in the connected state and stay time information (which may refer to ID information of visited cells and SSB beams in the current NG-RAN node, and information such as the stay durations and a starting and ending time point of the stay; or it may refer to ID information of source cells of a source NG-RAN node from which UE accesses the current NG-RAN node due to handover, ID information of SSB beams that have been accessed by the UE and stay time information (e.g., the information such as the stay durations and a starting and ending time point of the stay) stored by the NG-RAN node; a specific mechanism of how to obtain the information will be described in detail later with reference to FIGS. 17 and 18), and the GNSS location information (such as a longitude, a latitude, or an altitude), the time stamp information, and the other assistance information (such as the UE type related to the motion capability, the motion direction or the motion speed of the UE) of the UE are known by means of the UE report or other means, the NG-RAN node stores the information and uses it for subsequent paging of the UE.

When there is downlink signaling or user data to be transmitted to the UE, the NG-RAN node needs to initiate a procedure of paging the UE. The NG-RAN node interacts with the OAM before initiating an RRC paging message.

In some embodiments, an OAM 163 may be a local OAM or remote OAM. For example, the OAM 163 may store various configuration information, such as satellite ephemeris, information on mapping of satellite beams to a configuration of cells of a base station, and/or information on mapping of each satellite beam to a configuration of SSB beams of a cell, among others. For example, information on a geographic location area covered by the satellite beams and SSB beams of each cell may be calculated based on a preconfigured or preset array map and minimum elevation angle of satellite antennas, and the above stored configuration information.

Procedure 1610 is an interactive procedure between the NG-RAN node and the OAM, the NG-RAN node may report to the OAM all assistance information (including the paging assistance information and the query assistance information) with time stamps obtained before a UE context is released, and can query ID information of recommended base stations, ID information of recommended cells, and ID information of recommended SSB beams for paging the UE at the current time from the OAM based on all assistance information.

Since an LEO satellite has a feature of periodic mobility, for an on-board gNB satellite regenerative transmission system, one or more new NG-RAN nodes may be selected when the RAN pages the UE; or, the same NG-RAN node may also be included. For an LEO satellite transparent transmission system, the same NG-RAN node is likely to be selected when the RAN pages the UE.

Referring to FIG. 16, after acquiring the paging assistance information for paging the UE, in operation 1612, the NG-RAN node may transmit an RRC paging message on the corresponding cell(s) and SSB beam(s) to page the UE. After receiving the paging message, the UE may initiate random access in operation 1614 and an RRC setup procedure in operation 1616, so that the UE resumes to the CONNECTED state for transmission and reception of signaling and user plane data.

In some implementations, for an on-board gNB satellite regenerative transmission system, an on-board gNB that can cover the UE may also change due to movement of the LEO satellite. Therefore, when the RAN pages the UE, a target gNB queried from the OAM may be one or more new gNBs; since the UE does not initiate RNA (RAN-Based Notification Area) update, the new gNBs are neighboring nodes and have an Xn interface relationship with a gNB originally serving the UE, where neighboring cells are configured in one RNA. Therefore, the gNB originally serving the UE will initiate an Xn RAN PAGING message through an Xn interface to inform one or more neighboring gNBs covering the UE that the UE need to be paged. In this case, if the gNB originally serving the UE can query an ID of a corresponding base station, an ID of a corresponding cell and ID information of SSB beams through the OAM, the Xn RAN PAGING message may further include assistance information of recommended cells and SSB beams.

In an example, one or more of the following information may be included in the Xn RAN PAGING message.
  ID information of one or more cells (such as NR Cell Identity or NR CGI, E-UTRA Cell Identity or E-UTRA CGI)
  ID information of one or more SSB beams in each of the one or more cells (such as SSB-Index) (which may be referred to as "ID information of SSB beams")

After receiving the assistance information for paging the UE through the Xn RAN PAGING message, one or more new gNBs covering the UE transmit the RRC paging message on the corresponding cell(s) and SSB beam(s) to page the UE in operation 1612. After receiving the paging message, the UE may initiate random access in operation 1614 and an RRC setup procedure in operation 1616, so that the UE resumes to the CONNECTED state for transmission and reception of signaling and user plane data.

In some embodiments, if the first paging by the RAN based on one or more SSB beams in a cell fails, the RAN may decide to expand the paging range. In embodiments of the disclosure, the following possible schemes, including at least one of scheme 1-1 or scheme 1-2, may be adopted.

Scheme 1-1

The RAN may transmit the RRC paging message again, and page the UE on all SSB beams in each cell visited by the UE which are stored before.

Scheme 1-2

For scheme 1-1, if the paging based on cells fails, the RAN will continue to expand the paging range. For example, the RAN may utilize an existing RAN paging mechanism to expand the paging range.

For example, based on an RNA (RAN-Based Notification Area) configured for the UE, the RAN may select cells configured with the same RNA to transmit the RRC paging message.

For example, if there are cells of a neighboring NG-RAN node configured in the same RNA, it may be necessary to transmit the Xn RAN PAGING message to a neighboring NG-RAN node, and then the neighboring NG-RAN node continues to initiate RRC paging on the corresponding cell(s).

With regard to the example methods of selecting or combining the above paging schemes 1-1 or 1-1, reference may be made to the embodiments described in connection with FIG. 12B.

Figure 17:
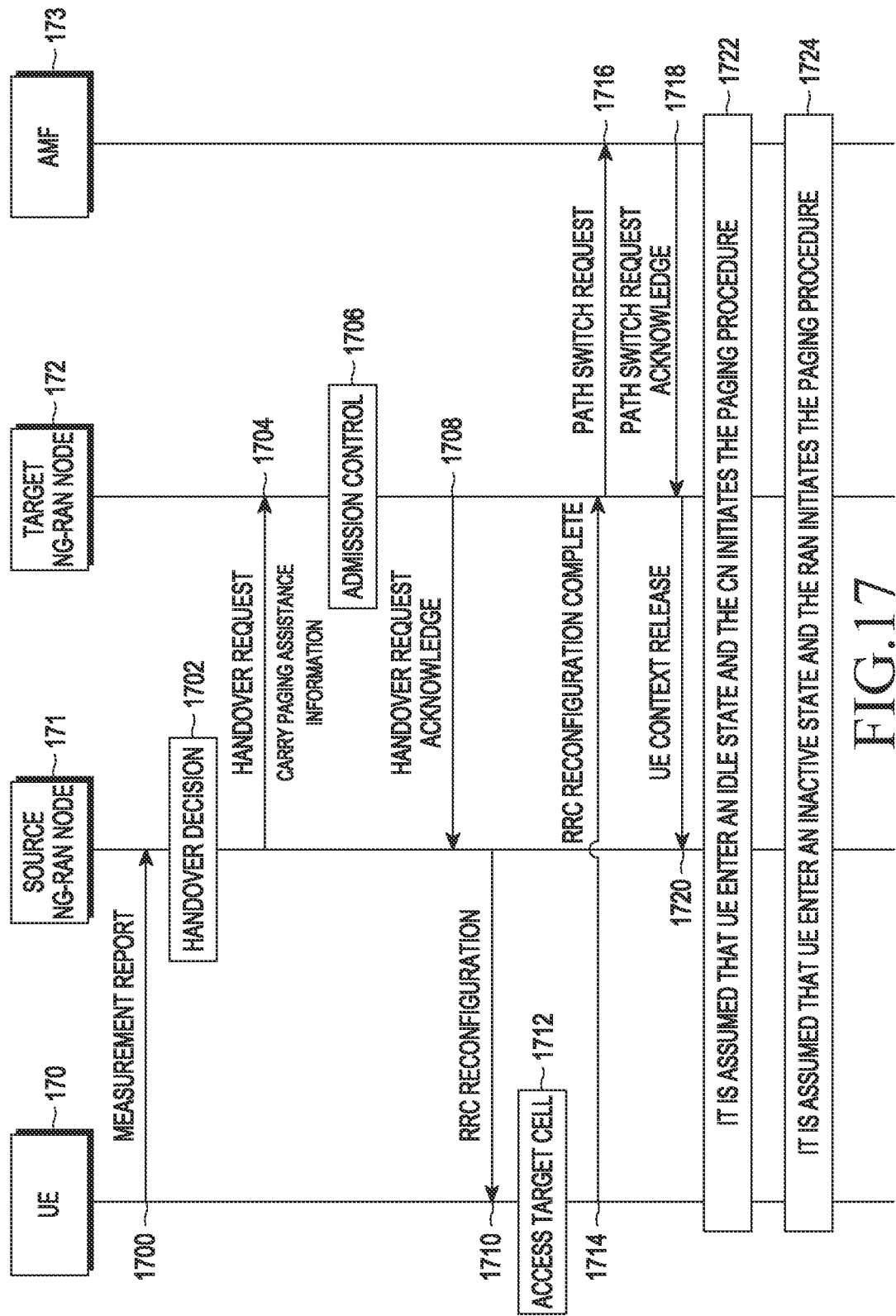
FIG. 17 illustrates a diagram of a method for an NG-RAN node to handover based on an Xn interface according to some embodiments of the disclosure, where the method may be applicable to a non-split RAN node.

FIG. 17 illustrates a diagram of a method for an NG-RAN node to handover based on an Xn interface according to some embodiments of the disclosure, where the method may be applicable to a non-split RAN node. For example, the embodiments of FIG. 17 may be applicable to a current NR communication system, an NTN GEO or LEO satellite transparent transmission system (see FIG. 1), a GEO or LEO on-board gNB satellite regenerative transmission system (see FIG. 3), or a future new next-generation communication system.

It should be noted that although the following embodiments will be described for NTN networks and 5G communication systems, the embodiments of the disclosure are not limited thereto. The embodiments of the disclosure are not limited to current 5G NR communication systems and 5G communication systems with an NTN architecture, and may also be applicable to next-generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, assistance information on a source cell visited by the UE last time and SSB beams that have been accessed by the UE in a procedure of handover for the NG-RAN node based on the Xn interface may be used by the target NG-RAN node as assistance information for paging the UE (where the UE enters an idle or inactive state after handing over to a target NG-RAN node).

The procedure of handover for the NG-RAN node based on the Xn interface is briefly described in conjunction with FIG. 17.

The UE 170 is in a connected state in a cell of a source NG-RAN node 171.

When the UE 170 moves, or moves in cells for an NTN LEO satellite, such that the signal quality of a serving cell measured by the UE is reduced and the signal quality of a neighboring cell is improved, the UE 170 may report a measurement report message to the source NG-RAN node 171 and carry ID information of target cells in operation 1700 when conditions that a measurement event is triggered are met.

In operation 1702, the source NG-RAN node 171 performs a handover decision. If a conditions of the handover decision is met, in operation 1704, it transmits a handover request message (Handover Request message) to a target NG-RAN node 172 to which the target cells belong, and requests to establish control plane and user plane resources related to the UE.

In operation 1706, the target NG-RAN node 172 performs admission control. If the target NG-RAN node 172 determines that the requested related resources can be satisfied, the related resources are established, and in operation 1708, a Handover Request Acknowledge message is transmitted to the source NG-RAN node 171, and a Handover Command message is carried by a container, for example.

In operation 1710, the source NG-RAN node transmits an RRC reconfiguration message to the UE 170. For example, the RRC reconfiguration message may be included in the Handover Command message.

After the UE 170 leaves the serving cell and successfully accesses a target cell (operation 1712), the UE 170 transmits an RRC reconfiguration complete message to the target NG-RAN node 172. Then, in operation 1716, the target NG-RAN node 1705 transmits a Path Switch Request to an AMF 173 to inform the AMF 173 that the UE 170 successfully accesses the target cell; after the AMF 173 successfully configures control plane and user plane resources of the UE by interacting with other core network elements on the CN side when receiving the Path Switch Request message, in an operation 1718, a Path Switch Request Acknowledge message is transmitted to the target NG-RAN node 172. Then, in operation 1720, the target NG-RAN node 172 transmits a UE context release message to the source NG-RAN node, informing the source NG-RAN node 171 that the handover procedure of the UE 170 is successful and releasing the control plane and user plane resources of the UE 170.

After the UE successfully hands over to the target cell, if there is no signaling and user data for which the UE interacts with the CN in a certain period of time, the target NG-RAN node or the AMF decides that the context of the UE may be released to enable the UE to enter an idle state. When the UE is in the idle state, if there is signaling or downlink user plane data to be transmitted to the UE in the CN, the CN needs to page the UE; or, the target NG-RAN node decides that an RRC release procedure may be initiated and suspend configuration information (SuspendConfig IE) is carried to enable the UE to enter an inactive state, and when the UE is in the inactive state, if there is signaling or downlink user plane data to be transmitted to the UE in the CN, the NG-RAN node will receive the signaling or downlink user plane data, and then the NG-RAN node will initiate paging of the UE.

For a case that the UE hands over from a source cell of a different NG-RAN node to access a target cell of a target NG-RAN node, in order to take the source cell that has been visited by the UE and SSB beams that have been accessed as paging assistance information recommended for paging the UE (considering that the UE is very likely to move between the source cell and the target cell after entering the idle or inactive state), it may be considered to transmit the ID of the source cell, IDs of the accessed SSB beams and information related to stay time to the target NG-RAN node in the handover procedure, and then the target NG-RAN node stores the information and uses it for subsequent paging of the UE. Therefore, in some implementations, in the handover procedure, the source NG-RAN node may transmit assistance information for paging the UE (for convenience of description, it may be referred to as "information for paging" or "paging assistance information" in the disclosure) to the target NG-RAN node, where the paging assistance information includes at least one of information related to recommended cells and information related to recommended SSB beams. For example, the paging assistance information may be included in the Handover Request message in the handover procedure.

In some examples, the paging assistance information transmitted by the source NG-RAN node to the target NG-RAN node in the handover procedure may include one or more of the following information:
  ID information of source cells (i.e., ID information of a cell visited last time) (such as NR Cell Identity or NR CGI, E-UTRA Cell Identity or E-UTRA CGI)
  Information related to time stayed in the source cells
  ID information of one or more SSB beams that have been accessed in the source cells (which may be referred to as "ID information of SSB beams")
  information related to time stayed in each of the one or more accessed SSB beams (which may be referred to as "information related to Time Stayed in SSB Beam")

In addition, among the example information listed above, for example, the information related to time stayed in the source cells may include at least one of a length of time stayed in a corresponding source cell or a starting and ending time of the stay. For example, the Time Stayed in SSB beam may include at least one of a length of time stayed in a corresponding SSB beam or a starting and ending time of the stay.

In some embodiments, considering that a UE History Information IE carried in the Handover Request message in 5G communication systems includes IDs of source cells and the stay time information, Therefore, the ID information of one or more SSB beams that have been accessed in the source cells and information related to time stayed in each of the one or more accessed SSB beams may be further carried in the UE History Information IE, thereby saving signaling overhead. However, the embodiments of the disclosure are not limited thereto. In some embodiments, the information related to the recommended SSB beams in the paging assistance information may be transmitted by an added IE to the Handover Request message or utilizing other IEs.

After receiving the above paging assistance information, the target NG-RAN node stores the information and ID information of the associated source NG-RAN node (such as a Global RAN Node ID) as the paging assistance information for subsequent paging of the UE.

To explain the application of carrying the paging assistance information in the Handover Request message, procedures 1722 and 1724 will be described respectively. Procedure 1722 is a paging procedure initiated by the CN when the UE enters the idle state, and procedure 1724 is a paging procedure initiated by a RAN when the UE enters the inactive state.

Procedure 1722

With regard to procedure 1722, the optimization mechanism of how to utilize SSB beams based on a cell to page the UE has been set forth in detail in the embodiments described in connection with FIG. 5A.

After the UE successfully accesses the target cell, the target NG-RAN node knows SSB beams of the cell accessed by the UE and the stay time information. Therefore, when the UE is about to enter the idle state to release a context, the target NG-RAN node may transmit the paging assistance information to the AMP by utilizing a UE context release complete message over an NG interface, where the paging assistance information includes ID information of source cells in the source NG-RAN node, ID information of SSB beams stayed in the source cells and corresponding stay time information, and ID information of target cells in the target NG-RAN node. In addition, the target NG-RAN node may also transmit a source NG-RAN node ID (such as a Global RAN Node ID) as a recommended RAN node to the AMF. Then, the AMF stores the information and uses it for subsequent paging of the UE as assistance information.

When the CN pages the UE subsequently, the CN may select the target NG-RAN node and transmit an NG interface paging message carrying ID information of recommended target cells and ID information of recommended SSB beams. In addition, the CN may also select the source NG-RAN node to transmit the NG interface paging message carrying the ID information of recommended source cells and the ID information of recommended SSB beams.

In some implementations, in order to comply with a current mechanism of paging the UE by the CN, the following condition need to be met: a TAI configured by a source cell exists in one TAI or multiple TAIs (such as a TAI List) included in a Registration Area configured for the UE.

Procedure 1724

With regard to procedure 1724, the optimization mechanism of how to utilize SSB beams based on a cell to page the UE has been set forth in detail in the embodiments described in connection with FIG. 8A.

After the UE successfully accesses the target cell, the target NG-RAN node may know SSB beams of cells accessed by the UE and stay time information. Therefore, when a UE RRC release (carrying a SuspendConfig IE)

occurs, the target NG-RAN node stores ID information of cells and SSB beams that have been visited by the UE, and stay time information, which may be used as assistance information for subsequent paging of the UE.

In the handover procedure as described above, the target NG-RAN node receives ID information of source cells, ID information of accessed SSB beams and corresponding stay time information, and stores the information and uses it for subsequent paging of the UE as assistance information.

When the RAN pages the UE subsequently, the target NG-RAN node selects the previously stored cells and SSB beams in the current NG-RAN node to transmit an RRC paging message to page the UE. In addition, the target NG-RAN node also transmits an Xn RAN PAGING message to the source NG-RAN node, where the Xn RAN PAGING message carries the paging assistance information, including ID information of recommended source cells and ID information of recommended SSB beams for paging the UE.

In some examples, the paging assistance information included in the Xn RAN PAGING message may include one or more of the following information:
  ID information of source cells (i.e., ID information of a cell visited last time) (such as NR Cell Identity or NR CGI, E-UTRA Cell Identity or E-UTRA CGI)
  information related to time stayed in source cells
  ID information of one or more SSB beams that have been accessed in the source cells (which may be referred to as "ID information of SSB beams")
  information related to time stayed in each of the one or more accessed SSB beams (which may be referred to as "information related to Time Stayed in SSB Beam")

In addition, among the example information listed above, for example, the information related to time stayed in source cells may include at least one of a length of time stayed in a corresponding source cell or a starting and ending time of the stay. For example, the Time Stayed in SSB beam may include at least one of a length of time stayed in a corresponding SSB beam or a starting and ending time of the stay.

After receiving the Xn RAN PAGING message carrying the above paging assistance information, the source NG-RAN node may initiate the RRC paging message on recommended source cell(s) and SSB beam(s).

In some implementations, in order to comply with the current mechanism of paging the UE by the CN, the following condition need to be met: the source cells are located in an RNA configured for the UE.

Procedures 1722 and 1724 have been described above, respectively. For details about procedure 1722 and procedure 1724, reference may be made to the embodiments described in connection with FIGS. 5A and 8A.

For an LEO satellite transparent transmission system (see FIG. 1) or an on-board gNB satellite regenerative transmission system (see FIG. 3), after the AMF stores all assistance information related to paging the UE, the AMF needs to interact with an OAM at a time when the CN needs to page the UE, and subsequent specific procedures may refer to the embodiments described in conjunction with FIG. 13; when the NG-RAN node stores all assistance information related to paging the UE, the NG-RAN node needs to interact with the OAM at a time when the RAN needs to page the UE, and subsequent specific procedures may refer to the embodiments described with reference to FIG. 16.

In some implementations, for the source NG-RAN node being a CU-DU split RAN node, the following enhancement processing may be considered. For example, the CU-DU split RAN node may be applicable to a current NR communication system, a CU-DU split NTN GEO or LEO satellite transparent transmission system (see FIG. 2), or an on-board gNB-DU satellite regenerative transmission system (see FIG. 4).

In a current communication mechanism, for a case that the source NG-RAN node is a split RAN node, when the Handover Request message is triggered (operation 1704), the CU does not know ID information of SSB beams having been accessed in source cells that have been visited by the UE, and although the DU knows the information, it has not reported ID information of cells and SSB beams that have been visited by the UE to the CU at this time, so the following enhanced processing scheme may be further considered.

Scheme 17-1

An optional IE is added to the measurement report in operation 1700, where the optional IE carries the paging assistance information, including ID information of source cells that have been visited by the UE, ID information of one or more SSB beams that have been visited by the UE and information related to stay time. In this case, the source DU may transmit the paging assistance information to the source CU by carrying the measurement report and including the paging assistance information in a UL RRC Message Transfer message. Next, the source CU may transmit the paging assistance information to a target RAN node or a target CU through the Handover Request message in operation 1704 (in a case where the target RAN node is also a CU-DU split RAN node). The implementation premise of this scheme is that the UE has a capability to record an ID of a cell being visited, IDs of one or more SSB beam in the cell that have been accessed and information related to stay time, so the UE may inform the target RAN node by utilizing the measurement report message to carry the paging assistance information.

Scheme 17-2

When the UE successfully hands over to the target cell, the paging assistance information, including ID information of source cells that have been visited by the UE, ID information of one or more SSB beams that have been visited by the UE and information related to stay time, is reported to the target RAN node through the RRC reconfiguration complete message in operation 1714 or a newly defined RRC message or other existing RRC messages (such as UEAssistanceInformation message) carrying a new IE, if the target RAN node is also a CU-DU split RAN node, the target DU may transmit to the target CU through a UL RRC Message Transfer message carrying a corresponding RRC message. This scheme is not only applicable to a case where the source RAN node is a split RAN node, but also applicable to a case where the source RAN node is a non-split NG-RAN node. The premise is that the UE has a capability to record ID information of a cell being visited and ID information of one or more SSB beams that have been accessed in the cell. Thus, it may notify the target RAN node through the RRC message described in this scheme after successfully handing over to the target cell.

Scheme 17-3

After the UE successfully hands over to the target cell, the source DU and the source CU will release a logical connection of an F1 interface of the UE, the source DU carries ID information of source cells that have been visited by the UE, ID information of one or more SSB beams that have been accessed by the UE and information related to stay time to the source CU, and then the source CU transmits the information to the target RAN node or the target CU (which is also a CU-DU split RAN node for the target RAN node) by a new Xn interface message or an existing Xn interface message carrying a new E.

After receiving IDs of source cells that have been visited by the UE, the ID information of one or more SSB beams that have been accessed by the UE and the information related to stay time, the target RAN node or the target CU stores the information and associated ID information of the source NG-RAN node, which serves as assistance information for subsequent paging of the UE.

The above has described various enhanced processing schemes of how the RAN node that is CU-DU split for the source NG-RAN node transmits the IDs of source cells, the ID information of accessed SSB beam and the information related to stay time to the target RAN node or the target CU in the handover procedure based on the Xn interface.

Figure 18:
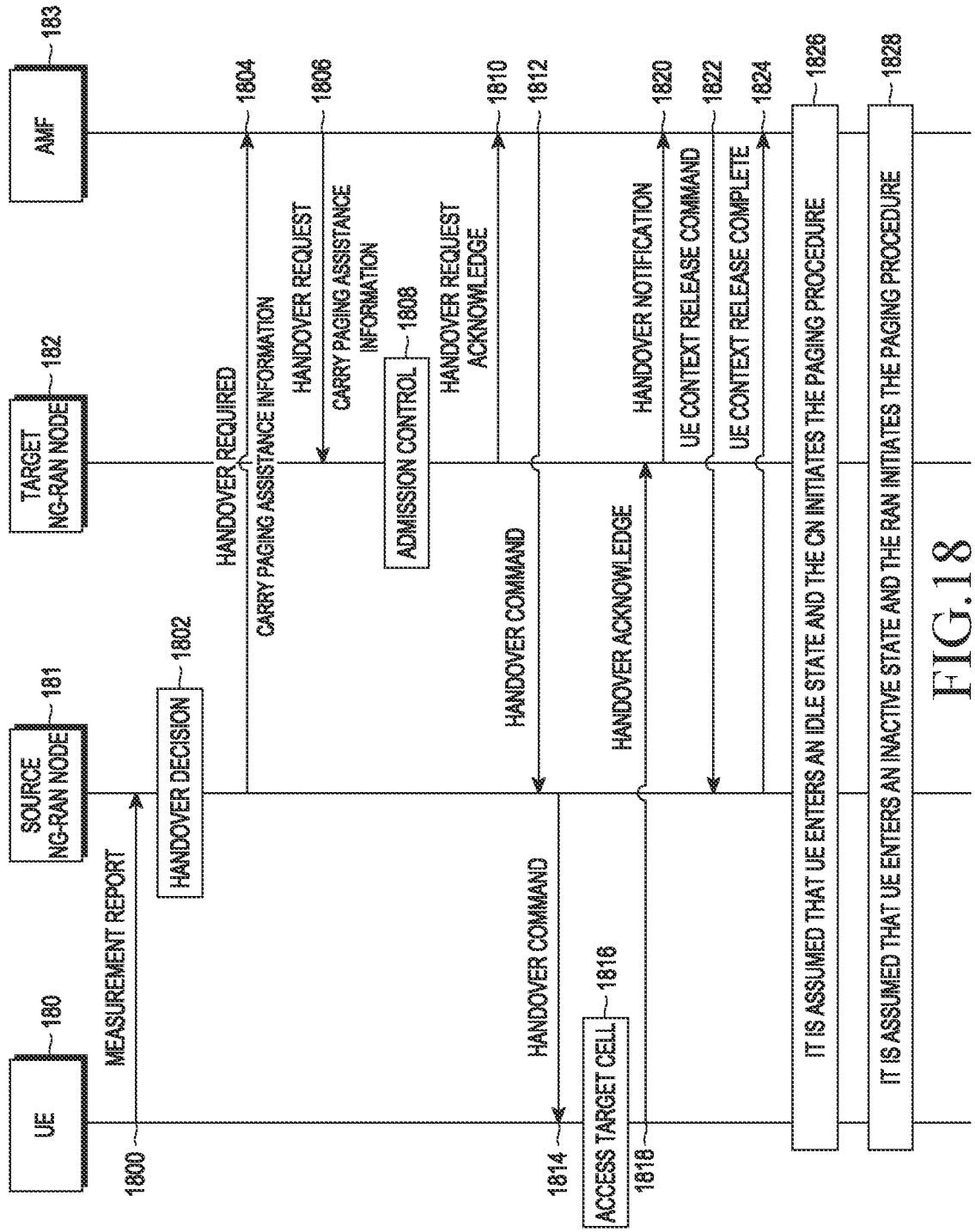
FIG. 18 illustrates a diagram of a method for an NG-RAN node to handover based on an NG interface according to some embodiments of the disclosure, where the method may be applicable to a non-split RAN node.

FIG. 18 illustrates a diagram of a method of handover for an NG-RAN node based on an NG interface according to some embodiments of the disclosure. For example, the method may be applicable to a non-split RAN node. For example, the embodiments of FIG. 18 may be applicable to a current NR communication system, an NTN GEO or NTN LEO satellite transparent transmission system (see FIG. 1), a GEO or LEO on-board gNB satellite regenerative transmission system (see FIG. 3), or a future new next-generation communication system.

It should be noted that although the following embodiments will be described for NTN networks and 5G communication systems, the embodiments of the disclosure are not limited thereto. The embodiments of the disclosure are not limited to current 5G NR communication systems and 5G communication systems with an NTN architecture, and may also be applicable to next generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

In some implementations, assistance information on the source cell that have been visited by the UE last time and SSB beams that have been accessed by the UE may be used by a target NG-RAN node as assistance information for paging the UE (the UE enters an IDLE or INACTIVE state after handing over to the target NG-RAN node).

A procedure of handover for an NG-RAN node based on an NG interface will be briefly described below in conjunction with FIG. 18.

A UE 180 is in a connected state in a cell of a source NG-RAN node 181.

When the UE 180 moves, or moves in cells for an NTN LEO satellite, such that the signal quality of the serving cell measured by the UE is reduced and the signal quality of a neighboring cell is improved, the UE 180 may report a measurement report message to the source NG-RAN node 181 and carry ID information of target cells in operation 1800 when conditions that a measurement event is triggered are met. s In operation 1802, the source NG-RAN node 181 performs a handover decision. If a condition of the handover decision is met, in operation 1804, a Handover Required message is transmitted to an AMF 183.

In operation 1806, the AMF 183 transmits a Handover Request message to a target NG-RAN node 182 to request to establish control plane and user plane resources related to the UE.

In operation 1808, the target NG-RAN node 182 performs admission control. If the target NG-RAN node 182 determines that the requested related resources can be satisfied, the related resources are established, and in operation 810, a Handover Request Acknowledge message is transmitted to the AMF 183.

In operation 1812, the AMF 183 transmits a Handover Command message to the source NG-RAN node 182. In operation 1814, the source NG-RAN node 182 transmits the Handover Command message to the UE 180.

In operation 1816, the UE 180 accesses a target cell and transmits a handover confirm message (Handover Confirm message) to the target NG-RAN node 182 in operation 1818. In operation 1820, the target NG-RAN node 182 transmits a handover notify message (Handover Notify message) to the AMF 183.

In operation 1822, since the AMF knows that the UE 180 successfully accesses the target cell by operation 1820, the AMF 183 initiates a procedure of UE context release command to the source NG-RAN node 181.

In operation 1824, after receiving the UE context release command, the source NG-RAN node 181 may release NG and radio interface logical connections, related signaling, and user plane resources of the UE 180 at the source NG-RAN node.

After the release of the above resources of the UE 180 is completed, the source NG-RAN node 181 may transmit an acknowledgement message to the AMF 183 in operation 1824, to indicate the completion of the release of logical connections and related resources for the UE 180 on an RAN node side through a context release complete message.

After the UE successfully hands over to the target cell, if there is no signaling and user data for which the UE interacts with the CN in a certain time period, the target NG-RAN node or the AMF decides that the context of the UE may be released to enable the UE to enter an idle state. When the UE is in the idle state, if there is signaling or downlink user plane data to be transmitted to the UE in the CN, the CN needs to page the UE; or, the target NG-RAN node decides that an RRC release procedure may be initiated and suspend configuration information (SuspendConfig IE) is carried to enable the UE to enter an inactive state, and when the UE is in the inactive state, if there is signaling or downlink user plane data to be transmitted to the UE in the CN, the NG-RAN node will receive the signaling or downlink user plane data, and then the NG-RAN node will initiate paging of the UE.

For a case that the UE 180 hands over from a source cell of a different NG-RAN node (such as the NG-RAN node 181) to access a target cell of the target NG-RAN node 182, in order to take the source cell that has been visited by the UE and SSB beams that have been accessed by the UE as assistance information recommended for paging the UE (considering that the UE is very likely to move between the source cell and the target cell after entering the IDLE or INACTIVE state), it is further enhanced to consider transmitting the ID of the source cell, ID information of SSB beams that have been accessed by the UE and information related to stay time to the target NG-RAN node in the handover procedure. Compared with the embodiments described in FIG. 17, the embodiments of FIG. 18 also includes a procedure of how assistance information, such as the ID of the source cell that has been visited by the UE last time, ID information of SSB beams that have been accessed by the UE, and information related to stay time, are transmitted to the target NG-RAN node in the handover based on the NG interface. In the handover procedure based on the NG interface, information related to handover is carried through the Handover Required message and the Handover Request message, and is transmitted to the target NG-RAN node through the AMF, and information required for handover preparation is carried in the Handover Required message and Handover Request message by a Source to Target Transparent Container. Therefore, in some implementations, the Handover Required message (operation 1804) and Handover Request message (operation 1806) in the handover procedure based on the NG interface may include the assistance information for paging the UE (for convenience of description, it may be referred to as "information for paging" or "paging assistance information" in the disclosure), which includes at least one of information related to recommended cells and information related to recommended SSB beams.

In some examples, the paging assistance information included in the Handover Required message and the Handover Request message may include one or more of the following information:
 ID information of source cells (i.e., ID information of a cell visited last time) (such as NR Cell Identity or NR CGI, E-UTRA Cell Identity or E-UTRA CGI)
 information related to time stayed in the source cells
 ID information of one or more SSB beams that have been accessed in the source cells (which may be referred to as "ID information of SSB beams")
 information related to time stayed in each of the one or more accessed SSB beams (which may be referred to as "information related to Time Stayed in SSB Beam")

In addition, among the example information listed above, for example, the information related to time stayed in source cells may include at least one of a length of time stayed in a corresponding source cell or a starting and ending time of the stay. For example, Time Stayed in SSB beam may include at least one of a length of time stayed in a corresponding SSB beam or a starting and ending time of the stay.

In some implementations, considering that a UE History Information IE included in a Source NG-RAN Node to Target NG-RAN Node Transparent Container carried in the Handover Required message and the Handover Request message in 5G communication systems includes IDs of source cells and stay time information, so ID information of one or more SSB beams that have been accessed in source cells and information related to time stayed in each of the one or more accessed SSB beams may be further carried in the UE History Information IE, thus saving signaling overhead. However, the embodiments of the disclosure are not limited thereto. In some implementations, the paging assistance information may be transmitted by an added IE in the Source NG-RAN Node to Target NG-RAN Node Transparent Container or utilizing other IEs, or by an added IE in the Handover Required message and Handover Request message or utilizing other IEs.

After receiving the paging assistance information, the target NG-RAN node stores the information and associated ID information of the source NG-RAN node. And serves as assistance information for subsequent paging of the UE.

To explain the application of carrying the paging assistance information in the Handover Required message and the Handover Request message, procedures 1826 and 1828 will be described respectively. Procedure 1826 is a paging procedure initiated by the CN when the UE enters the idle state, and procedure 1826 is a paging procedure initiated by the RAN when the UE enters the inactive state.

Procedure 1826

With regard to procedure 1826, the optimization mechanism of how to utilize SSB beams based on a cell to page the UE has been set forth in detail in the embodiments described in connection with FIG. 5A.

When the UE is about to enter the IDLE state to release a context, the current NG-RAN node transmits the paging assistance information to the AMF by utilizing a UE context release complete message over an NG interface, where the paging assistance information includes IDs of source cells in the source NG-RAN node, ID information of stayed SSB beams and information related to stay time, and ID information of target cells in the target NG-RAN node, ID information of SSB beams and information related to stay time. In addition, the target NG-RAN node may also transmit a source NG-RAN node ID (Global RAN Node ID) as a recommended RAN node to the AMF. Then, the AMF stores the information and uses it for subsequent paging of the UE as assistance information.

When the CN pages the UE subsequently, the CN may select the target NG-RAN node to transmit an NG interface paging message carrying IDs of recommended target cells and ID information of recommended SSB beams. In addition, the CN may also select the source NG-RAN node to transmit an NG interface paging message carrying the ID information of recommended source cells and the ID information of SSB beams.

In some implementations, in order to comply with a current mechanism of paging the UE by the CN, the following condition need to be met: A TAI configured by the source cell exists in one TAI or multiple TAIs (such as a TAI List) included in a Registration Area configured based on the UE.

Procedure 1828

With regard to procedure 1828, the optimization mechanism of how to utilize SSB beams based on a cell to page the UE has been set forth in detail in the embodiments described in connection with FIG. 8A.

After the UE successfully accesses the target cell, the target NG-RAN node may know SSB beams of a cell accessed by the UE and information related to stay time. Therefore, when a UE RRC release (carrying a SuspendConfig IE) occurs, the target NG-RAN node stores IDs of cells that have been visited by the UE, ID information of SSB beams that have been accessed by the UE and information related to stay time, which may be used as assistance information for subsequent paging of the UE.

In the handover procedure as described above, the target NG-RAN node receives IDs of source cells, ID information of stayed SSB beams, and information related to stay time, and stores the information and uses it for subsequent paging of the UE as assistance information.

When the RAN pages the UE subsequently, the target NG-RAN node selects the previously stored cells and SSB beams in the current NG-RAN node to transmit an RRC paging messages to page the UE. In addition, the target NG-RAN node also transmits an Xn RAN PAGING message to the source NG-RAN node, where the Xn RAN PAGING message carries the paging assistance information, including ID information of recommended source cells and ID information of recommended SSB beams for paging the UE.

In some examples, the paging assistance information included in the Xn RAN PAGING message may include one or more of the following information:
 ID information of source cells (i.e., ID information of a cell visited last time) (such as NR Cell Identity or NR CGI, E-UTRA Cell Identity or E-UTRA CGI)

Information related to time stayed in the source cells

ID information of one or more SSB beams that have been accessed in the source cells (which may be referred to as "ID information of SSB beams")

information related to time stayed in each of the one or more accessed SSB beams (which may be referred to as "information related to Time Stayed in SSB Beam")

In addition, among the example information listed above, for example, the information related to time stayed in the source cells may include at least one of a length of time stayed in a corresponding source cell or a starting and ending time of the stay. For example, the Time Stayed in SSB beam may include at least one of a length of time stayed in a corresponding SSB beam or a starting and ending time of the stay.

After receiving the Xn RAN PAGING message carrying the above paging assistance information, the source NG-RAN node may initiate the RRC paging message on recommended source cell(s) and recommended SSB beam(s).

In some implementations, in order to comply with the current mechanism of paging the UE by the CN, the following condition need to be met: the source cells are located in an RNA (RAN-Based Notification Area) configured based on the UE.

Procedure 1826 and procedure 1828 have been described above, respectively. For details about procedure 1826 and procedure 1828, reference may be made to the embodiments described in connection with FIGS. 5A and 8A.

For an LEO satellite transparent transmission system (see FIG. 1) or an on-board gNB satellite regenerative transmission system (see FIG. 3), after the AMF 183 stores all assistance information related to paging the UE, the AMF 183 needs to interact with an OAM at a time when the CN needs to page the UE, and subsequent specific procedures may refer to the embodiments described in conjunction with FIG. 13; when the NG-RAN node stores all assistance information related to paging the UE, the NG-RAN node needs to interact with the OAM at a time when the RAN needs to page the UE, and subsequent specific procedures may refer to the embodiments described with reference to FIG. 16.

In some implementations, for the source NG-RAN node being a CU-DU split RAN node, the following enhancement processing may be considered. For example, the CU-DU split RAN node may be applicable to a current NR communication system, a CU-DU split NTN GEO or LEO satellite transparent transmission system (see FIG. 2), or a GEO or LEO on-board gNB-DU satellite regenerative transmission system (see FIG. 4).

In a current communication mechanism, for a case that the source NG-RAN node is a split RAN node, when the Handover Required message is triggered (operation 1804), the CU does not know ID information of accessed SSB beams in source cells that have been visited by the UE, and although the DU knows the information, it has not reported ID information of SSB beams of cells that have been visited by the UE to the CU at this time, so the following enhanced processing scheme may be further considered.

Scheme 18-1

An optional IE is added to the measurement report in operation 1800, where the optional IE carries the paging assistance information, including ID information of source cells that have been accessed by the UE, ID information of one or more SSB beams that have been accessed by the UE and information related to stay time. In this case, a source DU may transmit the paging assistance information to a source CU by carrying the measurement report and including the paging assistance information in a UL RRC Message Transfer message. Next, the source CU may transmit the paging assistance information to a target RAN node or a target CU through the Handover Required message in operation 1804 and the Handover Request message in operation 1806 (in a case where the target RAN node is also a CU-DU split RAN node). The implementation premise of this scheme is that the UE has a capability to record ID information of a cell being visited, ID information of one or more SSB beams that have been accessed in the cell, and information related to stay time, and utilize the measurement report message to carry the paging assistance information to inform the target RAN node.

Scheme 18-2

When the UE successfully hands over to the target cell, IDs of source cells that have been visited by the UE, ID information of one or more SSB beams that have been accessed by the UE and information related to stay time is reported to target RAN node through an RRC reconfiguration complete message (carrying a handover confirm message) in operation 1818 or a newly defined RRC message or other existing RRC messages (such as a UEAssistanceInformation message) carrying a new IE; if the target RAN node is also a CU-DU split RAN node, the target DU may carry a corresponding RRC message to the target CU through a UL RRC Message Transfer message. This scheme is not only applicable to a case where the source RAN node is split RAN node, but also applicable to a case where the source RAN node is non-split NG-RAN node. The premise is that the UE has a capability to record an ID of a source cell being visited, ID information of one or more accessed SSB beams in the source cell, and information related to stay time, and carry the paging assistance information through the RRC message described in this scheme to inform the target RAN node after successfully handing over to the target cell.

Scheme 18-3

After the UE successfully hands over to the target cell, the source DU and the source CU will release a logical connection of an F1 interface of the UE, the source DU carries IDs of source cells that have been visited by the UE, ID information of one or more SSB beams that have been accessed by the UE and information related to stay time to the source CU in a UE context release complete message over the F1 interface, and then the source CU transmits it to the target RAN node or the target CU (which is also a CU-DU split RAN node for the target RAN node) by a new Xn interface message or an existing Xn interface message (if an Xn interface relationship exists, but Xn-Based Handover may not be supported through configuration) carrying a new IE.

In some implementations, if there is no Xn interface relationship between the source CU and the target RAN node or the target CU, it needs to be transmitted to the AMF 183 by completion of release of UE context in operation 1824, and then the AMF may not record and store the information, but forward the information to the target RAN node or the target CU again (in a case where the target RAN node is also a CU-DU split RAN node).

After receiving IDs of source cells that have been visited by the UE and the ID information of one or more SSB beams that have been accessed by the UE, the target RAN node or the target CU stores the information and associated ID information of the source NG-RAN node (Global RAN Node ID), which serve as assistance information for subsequent paging of the UE.

The above describes various enhanced processing schemes of how the RAN node that is CU-DU split for the source NG-RAN node transmits the IDs of source cells, the ID information of accessed SSB beams and the information related to stay time to the target RAN node or the target CU in the handover procedure based on the NG interface.

Figure 19:
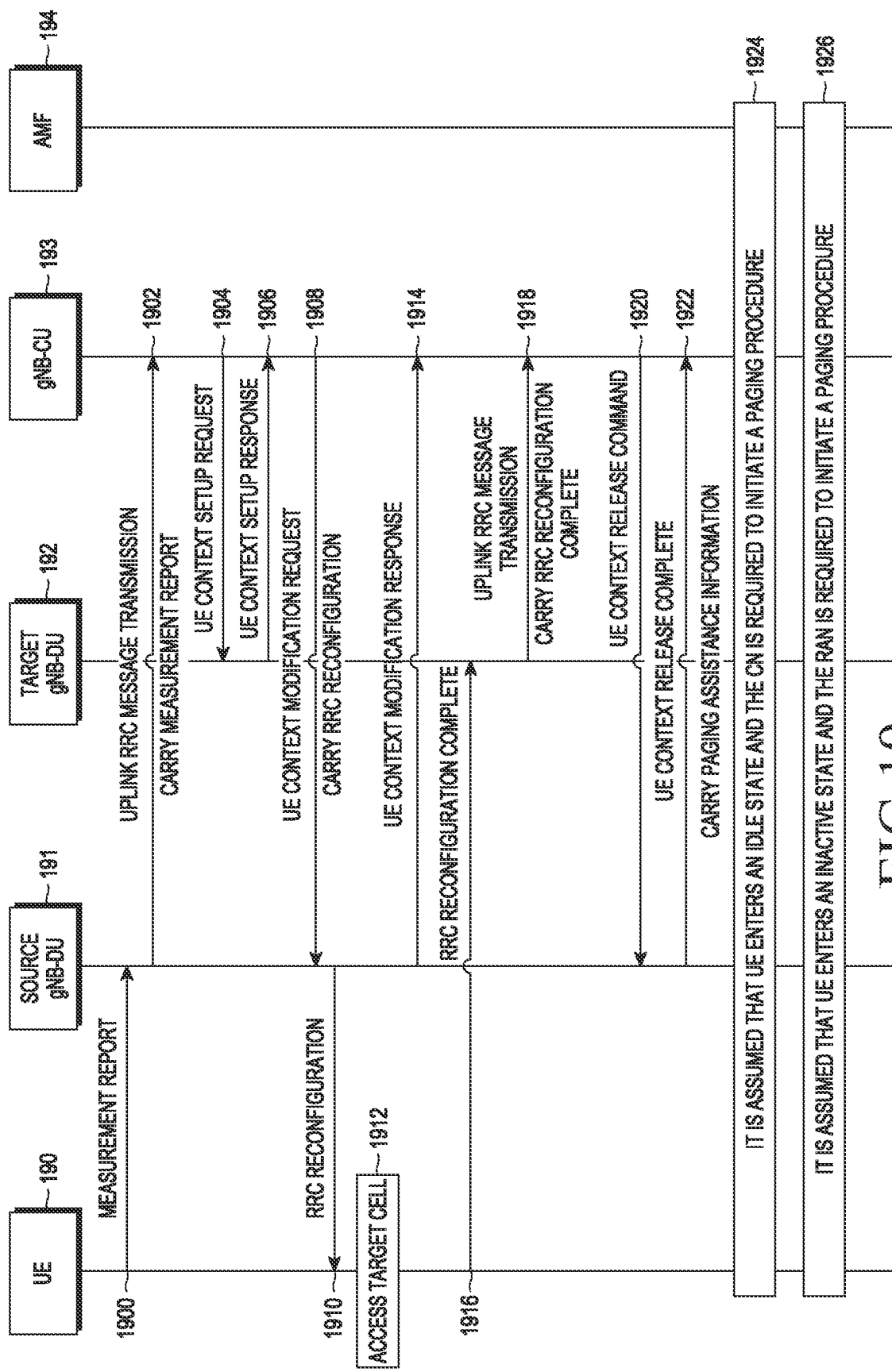
FIG. 19 illustrates a diagram of a method of inter-gNB-DU mobility within the same gNB-CU according to some embodiments of the disclosure.

FIG. 19 illustrates a diagram of a method of inter-gNB-DU mobility within the same gNB-CU according to some embodiments of the disclosure. For example, the embodiments of FIG. 19 may be applicable to a current NR communication system, a CU-DU split NTN GEO or LEO satellite transparent transmission system (see FIG. 2), a GEO or LEO on-board gNB-DU satellite regenerative transmission system (see FIG. 4), or a future new next-generation communication system.

It should be noted that although the following embodiments will be described for NTN networks and 5G communication systems, the embodiments of the disclosure are not limited thereto. The embodiments of the disclosure are not limited to current 5G NR communication systems and 5G communication systems with an NTN architecture, and may also be applicable to next generation or future new mobile communication systems (e.g., B5G, or 6G communication systems). Even though names of network elements may change, the principle of their applications is similar or the same as that of the embodiments of the disclosure. Therefore, the embodiments of the disclosure may be applicable to any suitable communication systems.

For a CU-DU split gNB, a UE initially accesses a cell in the current gNB-DU, and as the optimized paging mechanism described above in conjunction with FIGS. 6 and 7, when the UE enters an IDLE or INACTIVE state in the currently serving gNB-DU, paging assistance information, including information on IDs of cells that have been visited by the UE in the current gNB-DU, ID information of SSB beams that have been accessed by the UE and stay time information, may be reported to the gNB-CU through a UE context release complete message (UE CONTEXT RELEASE COMPLETE message) over an F1 interface or other F1 interface messages or a new F1 interface message.

If the UE initially accesses a source cell in the source gNB-DU, it may hand over to a target cell in the target gNB-DU due to movement or movement in cells for an NTN LEO satellite, then, after the UE enters the IDLE or INACTIVE state at the target gNB-DU, a procedure of paging the UE initiated by an CN or paging the UE initiated by an RAN will occur. In this scenario, the UE hands over from the source cell of the different gNB-DU to the target cell of the target gNB-DU, in order to take the source cell that has been visited by the UE and the SSB beams that has been accessed as recommended assistance information for paging the UE (considering that the UE is very likely to move between the source cell and the target cell after entering the IDLE or INACTIVE state), the following enhancement processing may be adopted: in a procedure of Inter-gNB-DU Mobility with the same gNB-CU, the ID of the source cell that have been visited by the UE last time and the ID information of the SSB beams that have been accessed by the UE are also reported to the gNB-CU.

Considering the whole flow of Inter-gNB-DU Mobility within the same gNB-CU in FIG. 19, in operation 1922, the UE context release complete message over the F1 interface carries the assistance information for paging the UE (for convenience of description, it may be referred to as "information for paging" or "paging assistance information" in the disclosure), which includes information related to recommended cells and information related to recommended SSB beams.

In some examples, the paging assistance information included in the UE context release complete message over the F1 interface may include:
  ID information of source cells (i.e., ID information of a cell visited last time) (such as NR Cell Identity or NR CGI, E-UTRA Cell Identity or E-UTRA CGI)
  information related to time stayed in the source cells
  ID information of one or more SSB beams that have been accessed in the source cells (which may be referred to as "ID information of SSB beams")
  information related to time stayed in each of the one or more accessed SSB beams (which may be referred to as "information related to Time Stayed in SSB Beam")

In addition, among the example information listed above, for example, the information related to time stayed in source cells may include at least one of a length of time stayed in a corresponding source cell or a starting and ending time of the stay. For example, the Time Stayed in SSB beam may include at least one of a length of time stayed in a corresponding SSB beam or a starting and ending time of the stay.

In some implementations, the paging assistance information may be transmitted through other existing F1 interface messages or by defining a new F1 interface message.

For example, continuing to refer to the whole flow of Inter-gNB-DU Mobility within the same gNB-CU in FIG. 19, the above paging assistance information may also be carried in a measurement report message transmitted by the UE in operation 1900. Then, the measurement report message carrying the information is transmitted to the gNB-CU by operation 1902; or in operation 1916, the above paging assistance information may be carried in an RRC reconfiguration complete message transmitted by the UE. Then, the RRC reconfiguration complete message carrying the information is transmitted to the gNB-CU by operation 1918. The premise is that the UE has a capability to record an ID of a cell being visited, ID information on one or more SSB beams that have been accessed in the cell, and information related to the stay time, and then transmits it to the gNB-CU by utilizing the measurement report message or the RRC reconfiguration complete message carrying the above paging assistance information.

After receiving the above information, the gNB-CU 193 may store the information as recommended assistance information for subsequent paging of the UE.

In order to explain the application of carrying the paging assistance information in the UE context release complete message, procedures 1924 and 1926 will be described respectively. Procedure 1924 is a paging procedure initiated by the CN when the UE enters the idle state, and procedure 1926 is a paging procedure initiated by the RAN when the UE enters the inactive state.

Procedure 1924

With regard to procedure 1924, the optimization mechanism of how to utilize SSB beams based on a cell to page the UE has been set forth in detail in the embodiments described in connection with FIG. 6A.

After the UE successfully hands over to the target cell in a target DU, if there is no signaling and user data for which the UE interacts with the CN in a certain time period, the gNB-CU or gNB-DU or AMF decides that it is possible to release the context of the UE to enable the UE to enter an IDLE state. In a procedure of releasing the context by the UE, the current gNB-DU may carry IDs of cells that have been visited by the UE at the current gNB-DU and ID information of SSB beams that have been accessed by the UE and the stay time information through the UE context release complete message over the F1 interface, and report the information to the gNB-CU. After receiving the information, the gNB-CU combines an ID of a source cell having been visited by the UE last time and ID information of SSB beams having been accessed by the UE and stay time information that are reported and stored previously by the source gNB-DU with the information, and transmits the combined information to the AMF through the UE context release complete message over the NG interface. Then, the AMF stores the information and uses it for subsequent paging of the UE as assistance information.

When the CN pages the UE subsequently, the AMF transmits an NG interface paging message to the gNB-CU and carries IDs of recommended source cells and target cells ID, and ID information of recommended SSB beams in each cell and stay time information. Then, the gNB-CU transmits an F1 interface paging message to a source gNB-DU and carries IDs of source cells and ID information of SSB beams for paging the UE, while the gNB-CU transmits the F1 interface paging message to a target gNB-DU and carries IDs of target cell and ID information of SSB beams for paging the UE. Then, the source gNB-DU and the target gNB-DU transmit RRC paging messages on the recommended cell(s) and the recommended SSB beam(s), respectively.

In some implementations, in order to comply with a current mechanism of paging the UE by the CN, the following condition need to be met: a TAI configured by the source cell exists in one TAI or multiple TAIs (such as a TAI List) included in a Registration Area configured based on the UE.

Procedure 1926

With regard to the procedure 1926, the optimization mechanism of how to utilize SSB beams based on a cell to page the UE has been set forth in detail in the embodiments described in connection with FIG. 7A.

The UE is in a connected state after successfully handing over to a target cell in the target gNB-DU. The target gNB-DU may know information such as which SSB beam or beams of a cell the UE has stayed in and the stay durations. When the UE is about to enter the INACTIVE state after a RRC release (carrying a SuspendConfig IE) occurs at the target gNB-DU, the target gNB-DU may report to the gNB-CU IDs of cells that have been visited by the UE in the current gNB-DU, ID information of SSB beams that have been accessed by the UE and stay time information in a procedure of release of the UE context over the F1 interface. In the previous procedure of Inter-gNB-DU Mobility, the gNB-CU stores IDs of source cells that have been visited by the UE, ID information of SSB beams that have been accessed by the UE and the stay time information reported by the source gNB-DU. The gNB-CU combines the information reported by the target gNB-DU and the information stored in the previous procedure of Inter-gNB-DU Mobility, and stores the combined information as recommended assistance information for subsequent paging of the UE.

When the RAN pages the UE subsequently, the gNB-CU transmits the F1 interface paging message to the source gNB-DU and carries IDs of source cells and ID information of SSB beams for paging the UE, at the same time, the gNB-CU transmits the F1 interface paging message to the target gNB-DU and carries ID information of target cells and ID information of SSB beams for paging the UE. Then the source gNB-DU and the target gNB-DU transmit RRC paging messages on the recommended cell(s) and the recommended SSB beam(s) respectively.

In some implementations, in order to comply with a current mechanism of paging the UE by the RAN, the following condition need to be met: the source cells are located in an RNA (RAN-Based Notification Area) configured based on UE.

Procedures 1924 and 1926 have been described above, respectively. For details about procedure 1924 and procedure 1926, reference may be made to the embodiments described in connection with FIGS. 6A and 7A.

For an LEO satellite transparent transmission CU-DU split network architecture (FIG. 2) or on-board gNB-DU satellite regenerative transmission system (see FIG. 4), after the AMF stores all the assistance information related to paging the UE, the AMF needs to interact with an OAM at a time when the CN needs to page the UE, and subsequent specific procedures may refer to the embodiments described in conjunction with FIG. 14; when the gNB-CU stores all the assistance information related to paging the UE, the gNB-CU needs to interact with the OAM at a time when the RAN needs to page the UE, and subsequent specific procedures may refer to the embodiments described with reference to FIG. 15.

Figure 20:
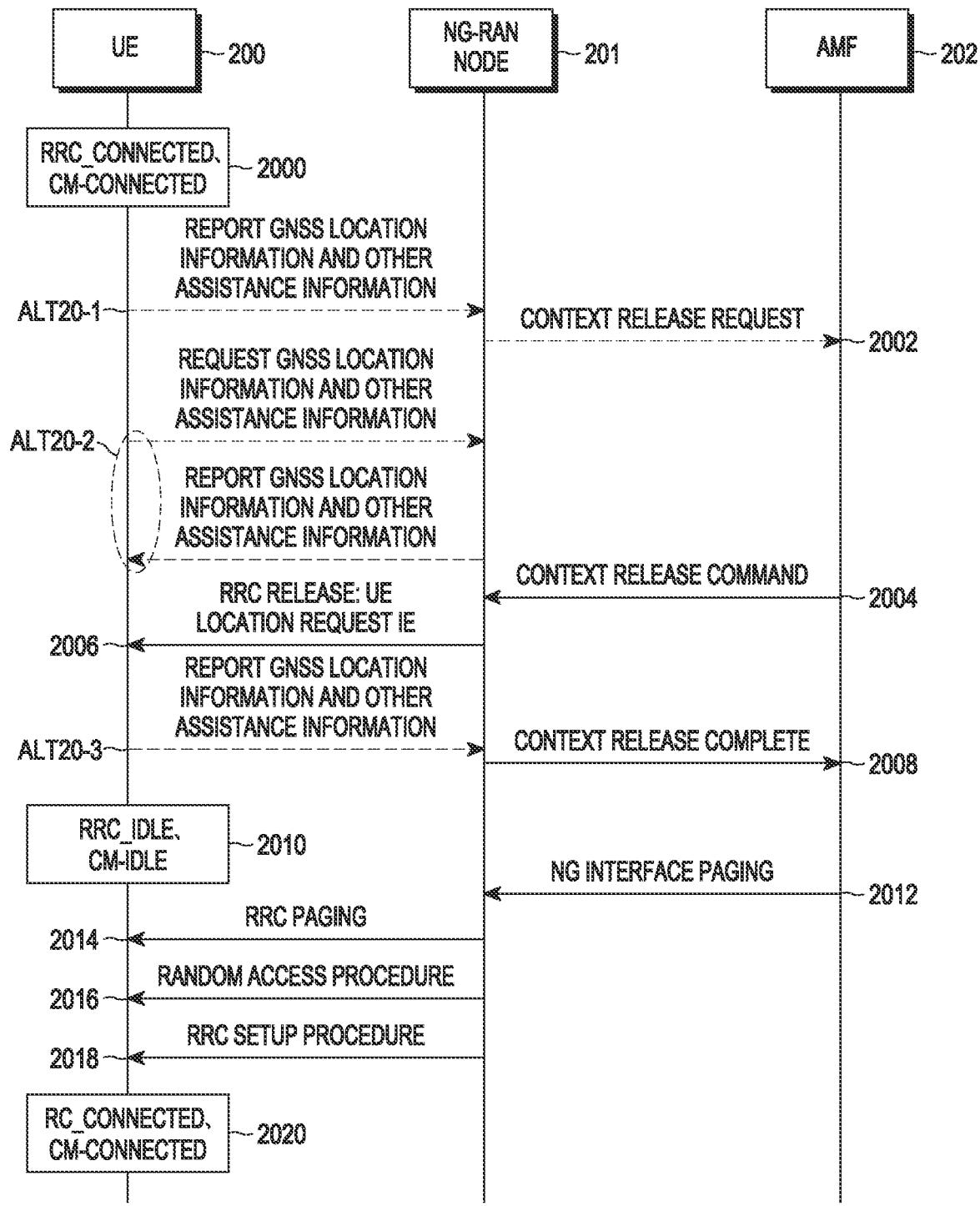
FIG. 20 illustrates a diagram of a method of UE geographic location reporting according to some embodiments of the disclosure, where the method may be applicable to a non-split RAN node.

FIG. 20 illustrates a diagram of a method of UE geographic location reporting according to some embodiments of the disclosure. For example, the embodiments of FIG. 20 may be applicable to the above various methods for paging by utilizing a geographical location of a UE, such as the embodiments described in connection with FIGS. 9A, 12A, 13 and 16.

In some implementations, the UE itself has a positioning capability (e.g., a GNSS positioning capability) and a capability to monitor other assistance information (such as a UE type related to a motion capability of the UE, a motion direction or a motion speed of the UE). In this case, the UE may obtain location information (e.g., GNSS location information) and the other assistance information (such as the UE type related to the motion capability, the motion direction and the motion speed) of the UE, and may report the GNSS location information and the other assistance information to the NG-RAN node through a new RRC message or an existing RRC message carrying a new IE when the UE is in a connected state.

In embodiments of the disclosure, the GNSS location information may refer to location information of the UE obtained through GNSS, including, for example, geographic location information (such as a longitude, a latitude, or an altitude).

It should be noted that although the GNSS location information is used for description in some implementations, the implementations of the disclosure are not limited to this, for example, any other suitable location information may be adopted to implement various implementations.

In embodiments of the disclosure, the UE type related to the motion capability may include a static UE (e.g., some of the IoT UEs described above), a low mobility UE (e.g., a handheld terminal), and a high mobility UE (e.g., a vehicle-mounted terminal, a ship-borne terminal, or an airborne terminal).

In some implementations, even if the UE does not have the GNSS positioning capability, the gNB-DU can acquire the GNSS position information and the other assistance information of the UE in the connected state through a positioning mechanism implemented by 3GPP, and then report the GNSS position information and the other assistance information to the gNB-CU. Or the gNB-CU directly acquires the GNSS location information and the other assistance information of the UE in the connected state through the positioning mechanism implemented by 3GPP. The embodiments of FIG. 20 mainly involve the following possible reporting schemes.

Scheme 20-1

After the UE 200 enters an RRC CONNECTED state in operation 2000, in a case where position accuracy obtained by the UE 200 through a GNSS system meets a certain condition, the UE 200 may immediately report position information of the UE (for example, GNSS position information) and other assistance information (such as a UE type related to a motion capability, a motion direction, and/or a motion speed, among others) in operation Alt.20-1.

For example, the condition may be that the number of connected GNSS satellites is greater than a certain number to ensure the positioning accuracy.

For example, the location information and the other assistance information may be reported to an NG-RAN node 201 by utilizing a new RRC message, or by utilizing an existing RRC message (such as UEAssistanceInformation message) to carry a new IE.

Scheme 20-2

At the latest time before the UE 200 is about to enter an RRC IDLE or INACTIVE state, the UE reports location information and other assistance information (such as a UE type related to a motion capability, a motion direction, and/or a motion speed, among others.)

On a network side, the location information of the UE at the latest time before the UE 200 is about to enter the RRC IDLE or INACTIVE state may have the best reference value.

In this way, it may be determined at the NG-RAN node 201 that the UE context release request over the NG interface is initiated by the NG-RAN node 201 due to the User Inactivity of the UE, that is, there being no control plane signaling and user plane data transmission, for a long time. In this case, the NG-RAN node 201 may request the UE to report its location and assistance information by utilizing a new RRC message or an existing RRC message (such as a UEInformationRequest message) carrying a new IE. Referring to FIG. 20, in operation Alt20-2, the UE 200 is requested to report its location and assistance information. After receiving the request, the UE 200 reports its location and assistance information before receiving an RRC release message. Or, even if the UE 200 receives the RRC release message, it may release radio signaling plane and user plane resources of the UE 200 after reporting the GNSS location information and the other assistance information of the UE 200 by utilizing a new RRC message or an existing RRC message (such as a UEInformationResponse message) carrying a new IE.

Scheme 20-3

The NG-RAN node 201 determines that the AMF 202 directly triggers the UE context release command to the NG-RAN node 201 in operation 2004 due to the User Inactivity of the UE, that is, there being no control plane signaling and user plane data transmission (or possibly due to other reasons), for a long time. In operation 2006, the NG-RAN node 201 may carry a new E in the RRC release message to instruct the UE 200 to report GNSS and assistance information. After receiving the RRC release message, the UE 200 transmits the GNSS location information and the other assistance information of the UE to the NG-RAN node in operation Alt20-3 by a new RRC message or an existing RRC message (such as a UEAssistanceInformation message) carrying a new E. The radio control plane and user plane resources of the UE 200 are released after operation Alt20-3.

The above describes the method of reporting the GNSS location information and the other assistance information of the UE to the NG-RAN node by one of operations Alt20-1, Alt20-2 or Alt20-3, and the following describes the method of reporting to the AMF 202 with various operations.

With operation Alt.20-1, the NG-RAN node 201 obtains the GNSS location information and the other assistance information of the UE before triggering the UE context release over the NG interface. Therefore, the GNSS location information and the other assistance information of UE may be reported to the AMF 202 through the UE context release request message in operation 2002, or reported to the AMF 202 through the UE context release complete message in operation 2008, or reported to the AMF 202 by utilizing a new NG interface message before the UE context release complete message (operation 2008).

With operation Alt.20-2, the NG-RAN node 201 may report the GNSS location information and the other assistance information of the UE to the AMF 202 through the UE context release complete message in operation 2008, or utilize a new NG interface message to report the GNSS location information and the other assistance information of the UE to the AMF 202 before the UE context release complete message (operation 2008).

With operation Alt.20-3, it is required that the NG-RAN node 201 cannot release radio control plane resources of the NG-RAN node until it receives the report of the GNSS location information and the other assistance information for the UE if an IE requesting the GNSS and assistance information for the UE is included in the transmitted RRC release message, in order to ensure that the NG-RAN node can receive the GNSS location information and the other assistance information for the UE that are reported by the UE. Then, the information may be reported to the AMF 202 by utilizing the UE context release complete message in operation 2008, or by utilizing a new NG interface message before the UE context release complete message (operation 2008).

It should be noted that the NG-RAN node 201 maintains the UE context of the NG interface, and the release procedure will not occur, when the UE is about to enter the INACTIVE state. In this case, the NG-RAN node 201 does not need to report the GNSS location information and the other assistance information for the UE to the AMF.

In addition, with respect to various operations shown in FIG. 20 (e.g., operations 2002 to 2020), various embodiments described above may be referred to, and detailed description thereof is omitted here.

Figure 21A:
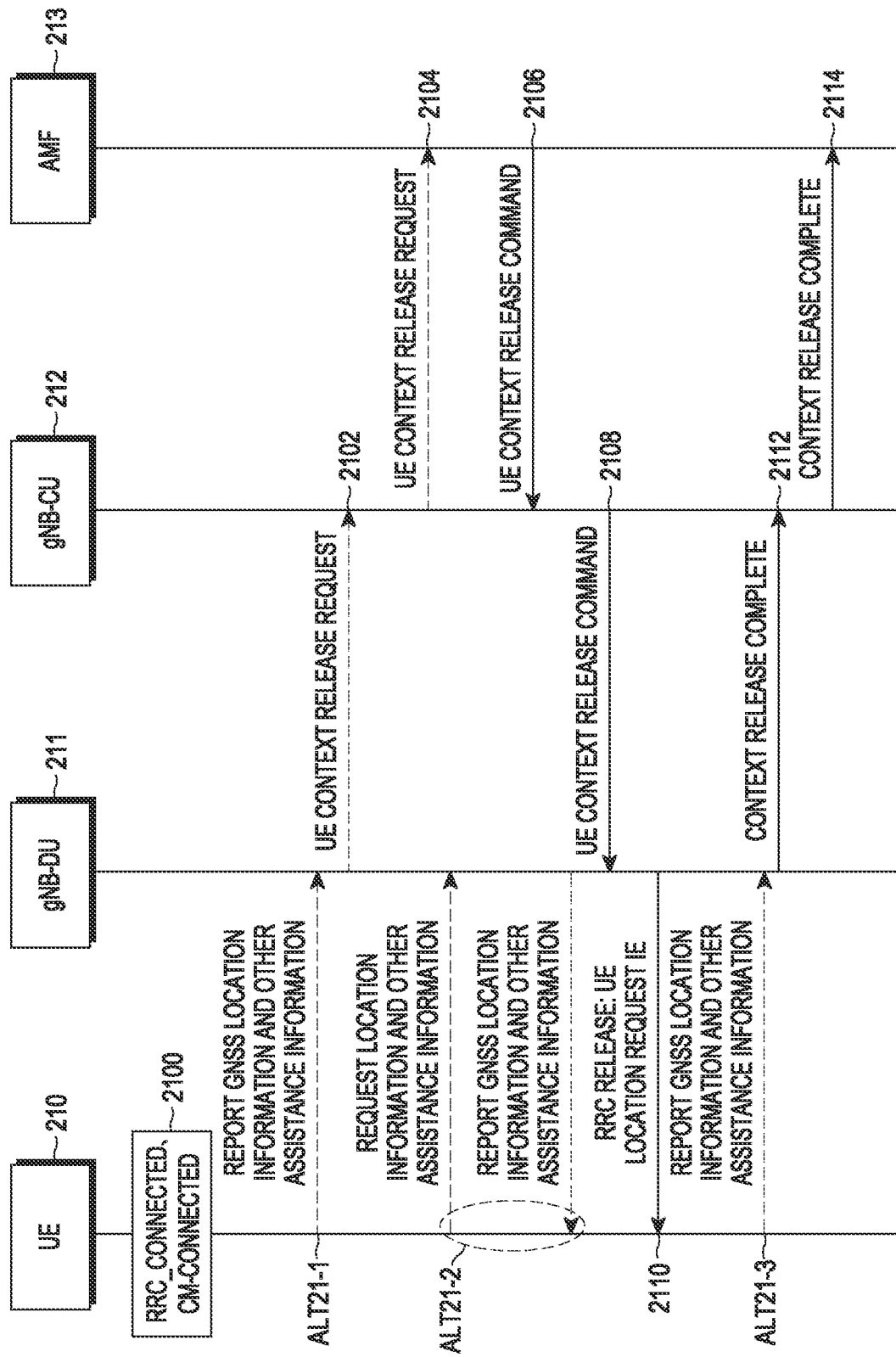
FIG. 21A and FIG. 21B illustrate diagrams of a method of UE geographic location reporting according to some embodiments of the disclosure, where the method may be applicable to a split gNB.
Figure 21B:
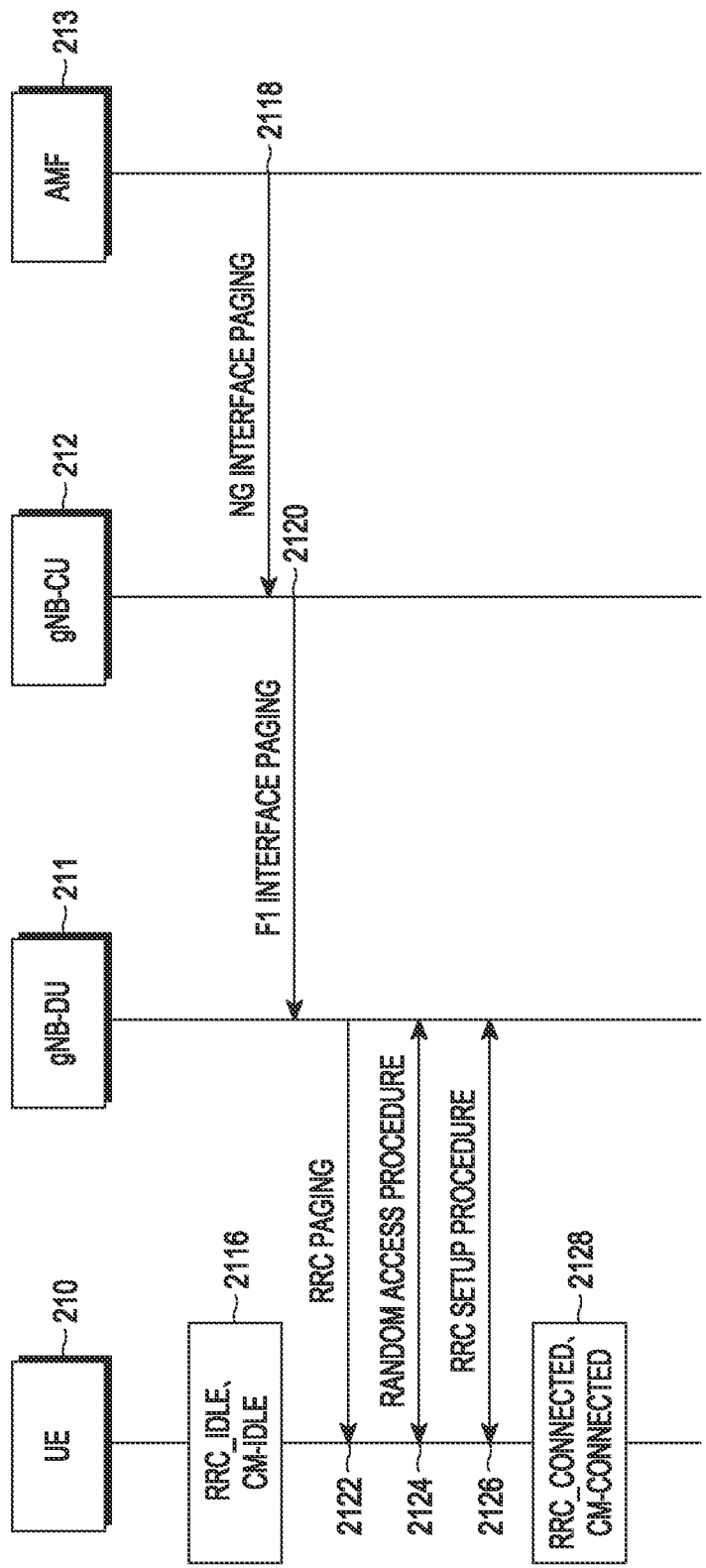

FIG. 21A and FIG. 21B illustrate diagrams of a method of UE geographic location reporting according to some embodiments of the disclosure. For example, the procedure may be applicable to a CU-DU split gNB. For example, the embodiments of FIG. 21A and FIG. 21B may be applicable to the above-mentioned various methods for paging by utilizing a geographical location of a UE, such as the embodiments described in connection with FIGS. 10A, 11A, 14 and 15.

In some implementations, the UE itself has a positioning capability (e.g., GNSS positioning capability) and a capability to monitor other assistance information (such as a UE type related to a motion capability of the UE, a motion direction or a motion speed of the UE). In this case, the UE may obtain location information (e.g., GNSS location information) and the other assistance information (such as the UE type related to the motion capability, the motion direction and the motion speed) of the UE, and may report the GNSS location information and the other assistance information to the NG-RAN node through a new RRC message or an existing RRC message carrying a new IE in a connected state.

In embodiments of the disclosure, the GNSS location information may refer to location information of the UE obtained through GNSS, including, for example, geographic location information (such as a longitude, a latitude, or an altitude).

It should be noted that although GNSS location information is used for description in some implementations, the implementations of the disclosure are not limited to this, for example, any other suitable location information may be adopted to implement various implementations.

In embodiments of the disclosure, the UE type related to the motion capability may include a static UE (e.g., some of the IoT UEs described above), a low mobility UE (e.g., a handheld terminal), and a high mobility UE (e.g., a vehicle-mounted terminal, a ship-borne terminal, or an airborne terminal).

In some implementations, if the UE does not have the GNSS positioning capability, the NG-RAN node may obtain the GNSS position information and the other assistance information (such as the UE type related to the motion capability, the motion direction or the motion speed of the UE) when the UE is in a connected state through a positioning mechanism implemented by 3GPP.

In embodiments of the disclosure, for convenience of description, the GNSS location information or the other assistance information (such as the UE type related to the motion capability, the motion direction or the motion speed of the UE) may be referred to as query assistance information.

The embodiments of FIG. 21A and FIG. 21B mainly involve the following possible reporting schemes.

Scheme 21-1

After the UE 210 enters the RRC CONNECTED state in operation 2100, if position accuracy obtained by the UE 210 through a GNSS system meets a certain condition, the UE 210 may immediately report position information and other assistance information (such as a UE type related to a motion capability, a motion direction, and/or a motion speed, among others) in operation Alt.21-1.

For example, the condition may be that a number of connected GNSS satellites is greater than a certain number to ensure positioning accuracy.

For example, the GNSS location information and/or the other assistance information may be reported to the gNB-CU through the gNB-DU by utilizing a new RRC message, or by utilizing an existing RRC message (such as UEAssistanceInformation message) to carry a new IE.

Over the F1 interface, the gNB-DU 211 may transmit the GNSS location information and/or the other assistance information to the gNB-CU 212 by utilizing an RRC message carried by the UL RRC Message Transfer message, or report the GNSS location information and/or the other assistance information to the gNB-CU 212 in operation 2102 by carrying an RRC message containing UE location information and the other assistance information in the UE context release procedure, or report the GNSS location information and/or the other assistance information to the gNB-CU 212 by carrying the location information and the other assistance information in the UE context release complete message in operation 2114 in the UE context release procedure.

Scheme 21-2

At the latest time before the UE 210 is about to enter the RRC IDLE or INACTIVE state, the UE 210 reports the location information and other assistance information (such as a UE type related to a motion capability, a motion direction, and/or a motion speed, among others).

For a network side, the location information of UE at the latest time may have the best reference value.

In this way, it may be determined at the gNB-CU 211 that the UE context release request over the NG interface is initiated by the gNB-CU 212 due to User Inactivity of the UE, that is, there being no control plane signaling and user plane data transmission, for a long time. In this case, the gNB-CU 212 may request the UE to report its location and assistance information by utilizing a new RRC message or an existing RRC message (such as a UEInformationRequest message) carrying a new IE. Referring to FIG. 21A and FIG. 21B, as indicated by Alt.21-2, the UE 210 is requested to report its location and assistance information. After receiving the request, the UE 210 reports its location and assistance information before receiving an RRC release message. Or, even if the UE 210 receives the RRC release message, it may release the radio signaling plane and user plane resources of the UE after reporting the GNSS location information and assistance information of the UE by utilizing a new RRC message or an existing RRC message (such as the UEInformationResponse message) carrying a new IE.

Over the F1 interface, the gNB-CU 212 may carry a new RRC message or an existing RRC message (such as UEInformationRequest message) to the gNB-DU 211 by utilizing a DL RRC Message Transfer message, or may transmit the new RRC message or the existing RRC message (such as UEInformationRequest message) to the gNB-DU 211 by utilizing the UE context release command in operation 2108. Then, the gNB-DU 211 transmits a new RRC message or an existing RRC message (such as a UEInformationRequest message) to the UE 210 to request the UE to report the geographic location information and the other assistance information. The UE 210 reports the GNSS location information and the other assistance information of the UE to the gNB-DU through a new RRC message or an existing RRC message (such as a UEInformationResponse message). Then, the gNB-DU 211 may report the GNSS location information and the other assistance information of the UE to the gNB-CU 212 by utilizing the UL RRC Message Transfer message carrying a new RRC message or an existing RRC message (such as a UEInformationResponse message), or report the GNSS location information and the other assistance information of the UE to the gNB-CU 212 by utilizing the UE context release complete message to carry a new RRC message or an existing RRC message (such as a UEInformationResponse message) in operation 2112.

Scheme 21-3

The gNB-CU 212 determines that the AMF 213 directly triggers the UE context release command to the gNB-CU 212 in operation 2106 due to User Inactivity of the UE, that is, there being no control plane signaling and user plane data transmission, for a long time. In this case, the gNB-CU 212 may carry the RRC release message and include an IE requesting the UE to report GNSS and assistance information by utilizing the UE context release command in operation 2108, and transmit the UE context release command to the gNB-DU 211. Since the RRC release message carries a new IE instructing the UE to report the GNSS and assistance information, after the UE receives the RRC release message, in operation Alt.21-3, the GNSS location information and the other assistance information of the UE are first transmitted to the gNB-DU 211 by a new RRC message or an existing RRC message (such as the UEAssistanceInformation message) carrying a new IE, and then the radio control plane resources of the UE are released. Next, the gNB-DU 211 transmits the GNSS location information and the other assistance information of the UE to the gNB-CU 212 by utilizing the UE context release complete message in operation 2112 or by utilizing the UL RRC Message Transfer message before the UE context release complete message (operation 2112).

The above describes the method of reporting the GNSS location information and the other assistance information of the UE to the gNB by one of operations Alt21-1, Alt21-2 or Alt21-3, and the following describes the method of reporting to the AMF 213 with various operations.

With operation Alt.21-1, the gNB-CU 212 obtains the GNSS location information and the other assistance information of the UE before triggering the UE context release over the NG interface. The GNSS location information and the other assistance information of the UE may be reported to the AMF 213 through the UE context release request message in operation 2104, or reported to the AMF 213 through the UE context release complete message in operation 2114, or reported to the AMF 213 before the UE context release complete message (operation 2114) by utilizing a new NG interface message.

With operation Alt.21-2, the gNB-CU 212 may report the GNSS location information and the other assistance information of the UE to the AMF 213 through the UE context release complete message in operation 2114, or report the GNSS location information and the other assistance information of the UE to the AMF 213 before the UE context release complete message (operation 2114) by utilizing a new NG interface message.

With operation Alt.21-2, it is required that the gNB-CU 212 cannot release radio control plane resources of the UE until it receives the report of the GNSS location information and the other assistance information of the UE if an IE requesting the GNSS and assistance information of the UE is included in the transmitted RRC release message, in order to ensure that the gNB-CU can receive the GNSS location information and the other assistance information of the UE reported by the UE. Then, the GNSS location information and the other assistance information may be reported to the AMF 213 by utilizing the UE context release complete message in operation 2114, or by utilizing a new NG interface message before the UE context release complete message (operation 2114).

It should be noted that the gNB-CU 212 maintains the UE context of the NG interface, and the release procedure will not occur, when the UE 210 is about to enter the INACTIVE state. For this case, the gNB-CU 212 does not need to report the GNSS location information and the other assistance information of the UE to the AMF 213.

In addition, with respect to various operations shown in FIG. 21A and FIG. 21B (for example, operations 2102 to 2128), various embodiments described above may be referred to, and detailed description thereof is omitted here.

In some implementations, the method of the UE reporting the ID information of cells that have been visited by the UE and the ID information of SSB beams that have been accessed by the UE to the RAN node or the gNB-CU (via the gNB-DU) may be the same as the method described in the embodiments of FIG. 20 (for a non-split RAN node) and the embodiments of FIG. 21A and FIG. 21B (for a split gNB).

In some implementations, the method of using the ID information of cell that have been visited by the UE and the ID information of SSB beams that have been accessed by the UE as the paging assistance information for paging the UE (the UE being in the IDLE state) by the CN or paging the UE (the UE being in the INACTIVE state) by the RAN may be the same as the methods in some previously described embodiments (for example, the embodiments of FIGS. 5A-8B and the embodiments of FIGS. 13-16).

Figure 22:
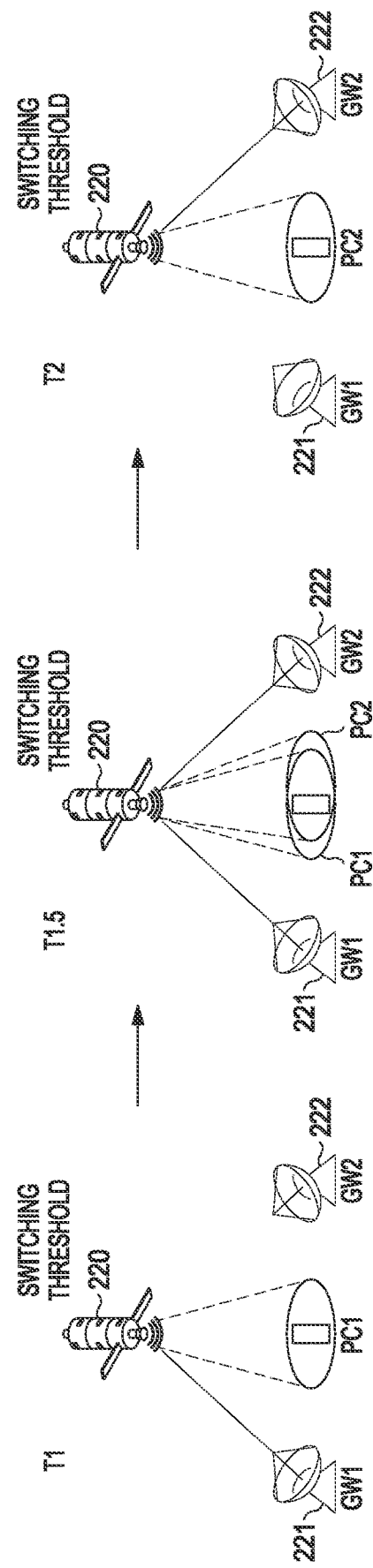
FIG. 22 illustrates a diagram of a feeder link switch-over procedure according to some embodiments of the disclosure, where the method may be applicable to an NTN LEO satellite transparent transmission system, a CU-DU split NTN LEO satellite transparent transmission system, an LEO on-board gNB satellite regenerative transmission system, an LEO on-board gNB-DU satellite regenerative transmission system, or a future new next-generation communication systems.

FIG. 22 illustrates a diagram of a method of feeder link switch over according to an embodiment of the disclosure. The embodiments of FIG. 22 may be applicable to an NTN LEO satellite transparent transmission system (refer to FIG. 1), a CU-DU split NTN LEO satellite transparent transmission system (refer to FIG. 2), an LEO on-board gNB satellite regenerative transmission system (refer to FIG. 3), an LEO on-board gNB-DU satellite regenerative transmission system (refer to FIG. 4), or a future new next-generation communication system.

Since an LEO satellite moves periodically relative to the ground, it is inevitable that a link connection between a satellite and a Ground Station (which may be referred to as "NTN GateWay (GW)") deployed on the ground may need to perform a conversion procedure. That is, it may be necessary to disconnect a radio connection from a currently serving NTN GW (hereinafter referred to as a "source GW") and establish a wireless connection with another NTN GW (hereinafter referred to as a "target GW") to continue providing services.

In order to avoid service interruption of UE in feeder link switch over, a current mechanism is that one satellite is enabled to establish connection with two NTN GWs at the same time in feeder link switch over. In this case, there are two cells with the same coverage, in which a source cell is served by a source GW link and a target cell is served by a target GW link. Then, the UE in a connected state in the source cell accesses to the target cell in a handover procedure where an uninterrupted service occurs.

Referring to FIG. 22, at time T1, a satellite 220 establishes a connection with an NTN GW (GW1) 221.

At time T1.5, when the satellite meets a switching condition (for example, meeting a switching threshold), a procedure of feeder link switch over occurs. In this procedure, all UEs in connected state need to be handed over to a target cell. In this procedure, the NTN GW (GW1) 221 may be a source GW, and an NTN GW (GW2) 222 may be a target GW.

When arriving at time T2, the link between the satellite 220 and the source GW (i.e., the NTN GW (GW1) 221) is disconnected, a source cell (a cell served by the source GW, i.e., cell PC1) disappears, and only the target cell (cell PC2) served in a link of the target GW (i.e., the NTN GW (GW2) 222) is in service. Therefore, in the feeder link switch over procedure, the uninterrupted service is successfully realized for the UE in the connected state. In addition, for the UE in other states, new mechanisms need to be further considered to improve service experience. The following description will take into account scenario 12-1 (where the UE is unregistered), scenario 12-2 (where the UE in the idle or inactive state actively initiates an uplink access) and scenario 12-3 (where the UE in the idle or inactive state passively initiates a paging access).

Scenario 12-1: UE is unregistered

For a UE in an unregistered network, if the UE is covered by both the source cell and the target cell during the feeder link switch over procedure, the UE may be enabled to directly select the target cell for registration access through a suitable mechanism.

Scenario 12-2: UE in the idle state or inactive state actively initiates uplink access For a UE in the idle state or inactive state, if the UE is covered by both the source cell and the target cell in the feeder link switch over procedure, when there is uplink data or signaling to be transmitted, the UE may actively initiate uplink access, and the UE is enabled to directly reselect the target cell and access it through a suitable mechanism.

Scenario 12-3: UE in the idle state or inactive state passively initiates paging access For a UE in the idle state or inactive state, if the UE is covered by both the source cell and the target cell in the feeder link switch over procedure, when there is downlink data or signaling to be transmitted, the UE may passively initiate paging access (that is, the UE may be paged by an RAN node or CN node), and the UE may be enabled to directly reselect the target cell and access it through a suitable mechanism.

In some implementations, for scenarios 12-1 and 12-2, one of the mechanisms described below may be adopted.

In an example mechanism, quality of a radio signal of the source cell may be reduced (for example, reducing a Reference Signal Receiving Power (RSRP), a Received Signal Strength Indication (RSSI) or a Signal to Interference plus Noise Ratio (SINR)), and quality of a radio signal of the target cell may be improved (for example, improving a RSRP, a RSSI or an SINR); or a threshold for selecting or reselecting the source cell and/or the target cell may be further adjusted, so that the UE selects or reselects the target cell for access.

In another example mechanism, the source cell and the target cell may be configured as a neighboring cell relationship, and an appropriate cell reselection priority (CellReselectionPriority) and/or cell reselection subpriority (CellReselectionSubPriority) of an intra- or inter-frequency carrier may be set, so that the UE reselects the target cell for access.

In still another example mechanism, mechanisms defined by 3GPP RAN WG2 may be adopted; for example, an access type of the source cell is configured as "Barred", which indicates that the UE cannot access the source cell, thus avoiding an unregistered UE or idle UE or inactive UE from accessing the source cell.

In yet another example mechanism, when or before the UE enters the idle or inactive state in source cell, a period of time for feeder link switch over is indicated to UE by an RRC Release message carrying a new IE or other RRC messages (e.g., a period of time t0~t1; i.e., from or at the time t0, a target GW link is connected and a source GW link is still maintained, and from or at the time t1, the source GW link is disconnected and the target GW link is still maintained). In this case, if the UE initiates uplink active access in the period of time, it may be defined that a UE behavior is to select the target cell for access instead of selecting the source cell.

In some implementations, for scenario 12-3, one of the mechanisms described below may be adopted.

In an example mechanism, when or before the UE enters the idle or inactive state in source cell, a period of time for feeder link switch over is indicated to UE by the RRC Release message carrying a new IE or other RRC messages (e.g., a period of time t0~t1; form or at the time t0, the target GW link is connected and the source GW link is still maintained, and from or at the time t1, the source GW link is disconnected and the target GW link is still maintained), then, if the UE performs passive paging access in the period of time, a UE behavior is defined as follows: even if an RRC paging message is successfully received at the source cell, the source cell is not selected for the UE to access, but the target cell is reselected for random access and an RRC connection is established; and if the RRC PAGING message is successfully received at the target cell, random access is performed and the RRC connection is established at the target cell.

In another example mechanism, in the RRC paging message, a new IE may be carried to indicate the UE behavior as follows: even if the RRC paging message is successfully received at the source cell, the source cell is not selected for the UE to access, but the target cell is reselected for random access and the RRC connection is established; and if the RRC paging message is successfully received at the target cell, random access is performed and the RRC connection is established at the target cell.

The above mechanisms may enable the UE to directly access the target cell, and moreover it can prevent the UE in the connected state from continuing the handover procedure to access the target cell after the UE firstly accesses the source cell, thereby avoiding unnecessary procedures and saving signaling overhead.

In some cases, it is necessary to determine a period and area where feeder link switch over occurs. In some implementations, an OAM may predict cells in which areas on a base station will perform the feeder link switch over procedure in a certain time period through ephemeris, a satellite coverage, a geographic location of NTN GW, and a mapping relationship between the NTN GW and a configuration of base station cells. For different NTN network architectures (e.g., the NTN networks in FIG. 1 to FIG. 4), one or more of an AMF and a gNB (for example, a gNB-CU and/or a gNB-DU) may know cells and information of a period of time when feeder link switch over will occurs by interacting with the OAM (a local or remote OAM). Then, for different scenarios (scenario 12-1, scenario 12-2 or scenario 12-3), the UE in these cells and time periods may utilize the above possible optimization mechanisms for access. The following describes some specific examples for different NTN networks.

In some examples, for the NTN LEO satellite transparent transmission system (FIG. 1), at least one of the gNB and the AMF may interact with the OAM. For a mode in which only the AMF interacts with the OAM, an NG interface message (such as a UE context release command) may be utilized to carry a new IE to inform the gNB of information of a period of time (e.g., a period of time t0~t1) in which feeder link switch over will be performed for the UE, in or before UE context release, and then the gNB informs the UE of the information of the period of time through an RRC release message or other RRC messages. Or, in a procedure of paging the UE, the AMF may instruct the UE to access the target cell by carrying a new IE in the NG paging message. As for an interaction mode between the gNB and the OAM, no matter for paging initiated by the CN or paging initiated by the RAN, the possible mechanisms described in the above scenario 12-3 may be directly utilized, and there is no need to carry a new IE in the NG interface message for notification, so it has no influence on the NG interface.

In some examples, in the CU-DU split NTN LEO satellite transparent transmission system (see FIG. 2), at least one of the gNB-CU, gNB-DU and AMF may interact with the OAM. However, for an interaction mode between the gNB-CU and the OAM, no matter for paging initiated by the CN or paging initiated by the RAN, the possible mechanisms described above for scenario 12-3 may be directly utilized, and it is not required to carry a new IE by the NG interface message for notification or indication, so it has no influence on the NG interface.

In some examples, for the NTN LEO on-board gNB satellite regenerative transmission system (see FIG. 3), at least one of the gNB-CU, gNB-DU and OAM may interact with the OAM. In a case where the gNB-CU interacts with the OAM, no matter for paging initiated by the CN or paging initiated by the RAN, the possible mechanisms described in the above scenario 12-3 may be directly utilized, and it is not required to carry a new IE in the NG interface message for notification or indication, so it has no influence on the NG interface. For a procedure of feeder link switch over, a scenario in which an on-board gNB is connected to different AMF through the source GW and the target GW, it may be realized by appropriate technology that two different logical gNBs on a satellite are connected to different AMFs through the source GW and the target GW respectively. If an on-board gNB is connected to the same AMF through the source GW and the target GW, since there is only one cell, there is no such problem.

In some examples, for the NTN LEO on-board gNB-DU satellite regenerative transmission system (see FIG. 4), at least one of the gNB-CU, gNB-DU, or AMF may interact with the OAM. In a case where there is interaction between the gNB-CU and the OAM, no matter for paging initiated by the CN or paging initiated by the RAN, the possible mechanisms described above for scenario 12-3 may be directly utilized, and it is not required to carry a new IE by the NG interface message for notification or indication, so it has no influence on the NG interface. Since a DU can only be connected to a CU at the same time, for a scenario where an on-board DU is connected to different CUs through the source GW and the target GW in a procedure of feeder link switch over, it may be realized by appropriate technology that two different logical DUs on a satellite are connected to different CUs through the source GW and the target GW respectively. If an on-board DU is connected to the same CU through the source GW and the target GW, since there is only one cell, there is no such problem.

Figure 23:
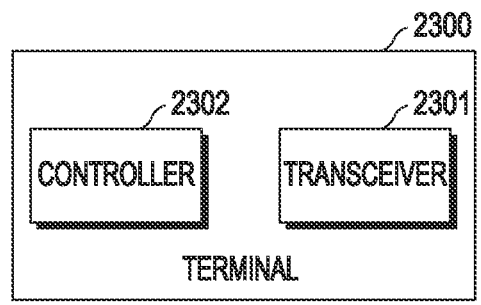
FIG. 23 illustrates a block diagram of a configuration of a terminal according to some embodiments of the disclosure.

FIG. 23 illustrates a block diagram of a configuration of a terminal according to an embodiment of the disclosure.

Referring to FIG. 23, a terminal 2300 according to some embodiments of the disclosure may include a transceiver 2301 and a controller 2302.

For example, the controller 2302 may be coupled to the transceiver 2301.

For example, the transceiver 2301 may be configured to transmit and receive signals.

For example, the controller 2302 may be configured to perform some operations according to some embodiments described above (such as the operations of a UE).

Figure 24:
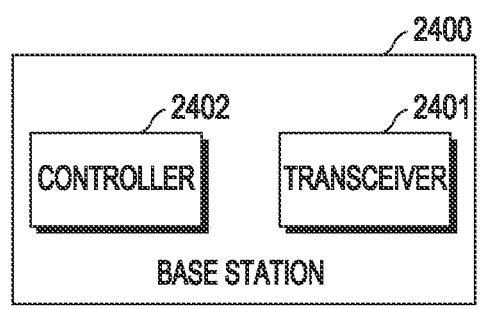
FIG. 24 illustrates a block diagram of a configuration of a base station according to some embodiments of the disclosure.

FIG. 24 illustrates a block diagram of a configuration of a base station according to an embodiment of the disclosure.

Referring to FIG. 24, a base station 2400 according to various embodiments of the disclosure may include a transceiver 2401 and a controller 2402.

For example, the controller 2402 may be coupled to the transceiver 2401.

For example, the transceiver 2401 may be configured to transmit and receive signals.

For example, the controller 2402 may be configured to perform some operations according to some embodiments described above (such as some of the operations of an RAN node, an NG-RAN node, a gNB-CU, or a gNB-DU).

Figure 25:
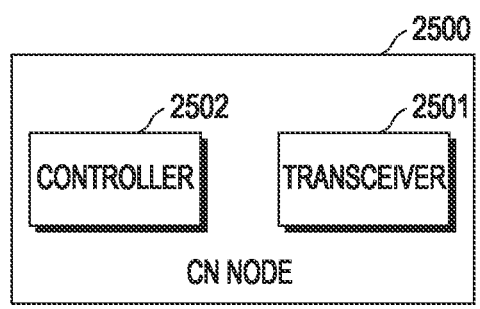
FIG. 25 illustrates a block diagram of a configuration of a CN node according to some embodiments of the disclosure.

FIG. 25 illustrates a block diagram of a configuration of a CN node according to an embodiment of the disclosure.

Referring to FIG. 25, a CN node 2500 according to some embodiments of the disclosure may include a transceiver 2501 and a controller 2502.

For example, the controller 2502 may be coupled to the transceiver 2501.

For example, the transceiver 2501 may be configured to transmit and receive signals.

For example, the controller 2502 may be configured to perform some operations according to some embodiments described above (such as the operations of an AMF or a 5GC).

At least a part of an apparatus (e.g., a module or a function thereof) or a method (e.g., an operation or a step) according to an embodiment of the disclosure may be implemented as, for example, instructions stored in a computer-readable storage medium (e.g., a memory) in a form of a program module. When executed by a processor or controller, the instructions may enable the processor or controller to perform corresponding functions. Computer readable media may include, for example, hard disks, floppy disks, magnetic media, optical recording media, DVDs, magneto-optical media. The instructions may include code created by a compiler or code executable by an interpreter. The module or apparatus according to various embodiments of the disclosure may include at least one or more of the above components, some of which may be omitted, or other additional components may also be included. Operations performed by modules, programming modules or other components according to various embodiments of the disclosure may be performed sequentially, in parallel, repeatedly or heuristically, or at least some operations may be performed in a different order or omitted, or other operations may be added.

What has been described above are only exemplary implementations of the invention, and is not intended to limit the protection scope of the invention, which is determined by the appended claims.

The invention claimed is:

1. A method performed by a gNode B-distributed unit (gNB-DU) in a wireless communication system, the method comprising:
   receiving, from a gNode B-central unit (gNB-CU), a user equipment (UE) context release command message;
   generating a UE context release complete message including information related to recommended synchronization signal blocks (SSBs) as assistance information for paging a UE, wherein the information includes identification information of one or more SSB beams that have been accessed by the UE in each of a plurality of cells;
   transmitting, to the gNB-CU, the UE context release complete message; and
   receiving, from the gNB-CU, a paging message including a paging cell list, wherein the paging cell list includes the information related to the recommended SSBs.

2. A gNode B-distributed unit (gNB-DU) in a wireless communication system, the gNB-DU comprising:
   a transceiver; and
   a controller configured to:
      receive a user equipment (UE) context release command message from a gNode B-central unit (gNB-CU),
      generate a UE context release complete message including information related to recommended synchronization signal blocks (SSBs) as assistance information for paging a UE, wherein the information includes identification information of one or more SSB beams that have been accessed by the UE in each of a plurality of cells;

transmit the UE context release complete message to the gNB-CU; and receive a paging message from the gNB-CU including a paging cell list, wherein the paging cell list includes the information related to the recommended SSBs.

3. The method of claim 1, wherein the paging message is transmitted to the UE based on the information related to the recommended SSBs.

4. The method of claim 1, wherein the information related to the recommended SSBs is stored in the gNB-CU.

5. The gNB-DU of claim 2, wherein the information related to the recommended SSBs further includes identification information of one or more SSB beams that have been accessed by the UE in each of a plurality of cells.

6. The gNB-DU of claim 2, wherein the paging message includes a paging cell list, and wherein the paging cell list includes the information related to the recommended SSBs.

7. The gNB-DU of claim 2, wherein the paging message is transmitted to the UE based on the information related to the recommended SSBs.

8. The gNB-DU of claim 2, wherein the information related to the recommended SSBs is stored in the gNB-CU.

* * * * *